United States Patent
Ge et al.

(10) Patent No.: US 11,798,107 B2
(45) Date of Patent: Oct. 24, 2023

(54) SCENARIO-BASED APPLICATION RECOMMENDATION METHOD AND APPARATUS

(71) Applicant: Huawei Technologies Co., Ltd., Shenzhen (CN)

(72) Inventors: Lu Ge, Nanjing (CN); Jianfeng Wang, Shenzhen (CN); Xiaoyun Yang, Beijing (CN); Aihua Zheng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/041,400

(22) PCT Filed: Mar. 27, 2018

(86) PCT No.: PCT/CN2018/080596
§ 371 (c)(1),
(2) Date: Sep. 24, 2020

(87) PCT Pub. No.: WO2019/183788
PCT Pub. Date: Oct. 3, 2019

(65) Prior Publication Data
US 2021/0035244 A1 Feb. 4, 2021

(51) Int. Cl.
*G06Q 50/14* (2012.01)
*H04M 1/72469* (2021.01)
(Continued)

(52) U.S. Cl.
CPC ........ *G06Q 50/14* (2013.01); *H04M 1/72454* (2021.01); *H04M 1/72457* (2021.01); *H04M 1/72469* (2021.01)

(58) Field of Classification Search
CPC .............. G06Q 50/14; H04M 1/72469; H04M 1/72457; H04M 1/72454
See application file for complete search history.

(56) References Cited

U.S. PATENT DOCUMENTS

2013/0290898 A1  10/2013  Lu et al.
2013/0339345 A1*  12/2013  Soto Matamala .... G06F 16/248
707/722
(Continued)

FOREIGN PATENT DOCUMENTS

CN    106528252 A    3/2017
CN    106681767 A    5/2017
(Continued)

*Primary Examiner* — Sherrod L Keaton
(74) *Attorney, Agent, or Firm* — Slater Matsil, LLP

(57) ABSTRACT

A specific solution includes: obtaining, by a terminal, current scenario information; matching the current scenario information against one or more prompt rules; and when determining that the current scenario information matches a first prompt rule, displaying a first prompt message corresponding to the first prompt rule, to prompt that there is a recommended application in a scenario corresponding to the current scenario information; displaying, in response to a first operation performed by a user on the first prompt message, a first recommendation interface that includes a recommendation item of an application prompted by the first prompt message; and displaying an interface of a first application in response to a selection operation performed by the user on a first recommendation item in the first recommendation interface.

6 Claims, 34 Drawing Sheets

(51) Int. Cl.
*H04M 1/72457* (2021.01)
*H04M 1/72454* (2021.01)

(56) References Cited

U.S. PATENT DOCUMENTS

| | | | |
|---|---|---|---|
| 2015/0106801 A1* | 4/2015 | Agrawal | G06F 8/60 |
| | | | 717/177 |
| 2015/0324358 A1* | 11/2015 | Gilady | G06F 16/2465 |
| | | | 707/767 |
| 2017/0215024 A1 | 7/2017 | Pang | |
| 2017/0351388 A1* | 12/2017 | Grunewald | H04M 1/72406 |
| 2018/0165105 A1 | 6/2018 | Lu et al. | |
| 2019/0311401 A1* | 10/2019 | Kim | G06F 3/0481 |

FOREIGN PATENT DOCUMENTS

| | | | | |
|---|---|---|---|---|
| CN | 107590245 A | 1/2018 | | |
| EP | 2523436 A1 | 11/2012 | | |
| WO | WO-2018226456 A1 * | 12/2018 | | G06F 3/04817 |

\* cited by examiner

TO

TO

TO

SCENARIO-BASED APPLICATION RECOMMENDATION METHOD AND APPARATUS

CROSS-REFERENCE TO RELATED APPLICATIONS

This application is a national stage application of International Application No. PCT/CN2018/080596 filed on Mar. 27, 2018, which application is hereby incorporated herein by reference.

TECHNICAL FIELD

This application relates to the field of communications technologies, and in particular, to a scenario-based application recommendation method and an apparatus.

BACKGROUND

With popularization of an intelligent terminal and performance improvement of the intelligent terminal, an increasing quantity of applications (Application, APP) may be installed in the intelligent terminal. The intelligent terminal may recommend popular APPs to a user. The user may select, from the APPs recommended by the intelligent terminal, an APP needed by the user, and then download and install a client of the APP, to use the APP in the intelligent terminal and enjoy various services provided by the APP.

However, a problem is that the popular APPs recommended by the intelligent terminal to the user may not meet a current requirement of the user. In other words, the APP recommendation performed by the intelligent terminal may be invalid recommendation.

In addition, after the user selects the APP needed by the user, the intelligent terminal 104 needs to download and install the client of the APP, and then in response to a user operation, enables the client of the APP and enters a service item needed by the user, to provide a corresponding service for the user. A process of providing a service for the user by the intelligent terminal is complex, and human-computer interaction performance of the intelligent terminal is relatively low.

SUMMARY

Embodiments of this application provide a scenario-based application recommendation method and an apparatus, so as to improve a degree of matching between a service recommended by a terminal to a user and a user requirement, and reduce complexity of a process of providing a service for the user by the terminal, thereby improving human-computer interaction performance of the terminal.

According to a first aspect, an embodiment of this application provides a scenario-based application recommendation method. The method includes: A terminal obtains current scenario information, and matches the current scenario information against one or more prompt rules. Then, when determining that the current scenario information matches a first prompt rule, the terminal displays a first prompt message corresponding to the first prompt rule, to prompt that there is a recommended application in a scenario corresponding to the current scenario information. Next, the terminal may display, in response to a first operation performed by a user on the first prompt message, a first recommendation interface that includes a recommendation item of an application prompted by the first prompt message. Finally, the terminal may display an interface of a first application in response to a selection operation performed by the user on a first recommendation item in the first recommendation interface.

In this embodiment of this application, because the current scenario information may reflect a current status of the user, it is prompted that the application recommended in the scenario corresponding to the current scenario information may meet a current requirement of the user. It can be learned that, by using this solution, a degree of matching between a service recommended by the terminal to the user and a user requirement can be improved.

In addition, in response to the selection operation performed by the user on the first recommendation item in the first recommendation interface, the terminal may directly display the interface of the first application corresponding to the first recommendation item. In other words, an application recommended by the terminal may provide a tap-to-use direct service for the user, and there is no need to download and install a client of the APP for the terminal. Therefore, according to the method in this embodiment of this application, a user operation in a process of providing a service for the user by the terminal can be simplified, and a case in which memory of the terminal is occupied when the client of the APP is downloaded and installed for the terminal can be avoided. In conclusion, according to the method in this embodiment of this application, human-computer interaction performance of the terminal can be improved, so as to improve user experience.

In a possible design manner of the first aspect, the one or more prompt rules may be obtained by the terminal from a network device. Before the terminal matches the current scenario information against the one or more prompt rules, the terminal may receive and store the one or more prompt rules that are pushed by the network device and that include the first prompt rule. The network device may send the one or more prompt rules to the terminal after receiving the one or more prompt rules configured by operation personnel.

In another possible design manner of the first aspect, the first prompt message may also be obtained by the terminal from the network device. For example, after receiving the first prompt message that is configured by the operation personnel and that corresponds to the first prompt rule, the network device may push the first prompt message to the terminal. Alternatively, when determining that the current scenario information matches the first prompt rule, the terminal may actively obtain, from the network device, the first prompt message corresponding to the first prompt rule.

In another possible design manner of the first aspect, the terminal may not only obtain the first prompt rule and the first prompt message from the network device, but also may receive a first user interface (User Interface, UI) element that is sent by the network device and that includes an interface element of the first recommendation interface, and a first interface file used to invoke the first UI element to display the first recommendation interface.

In an implementation, the terminal may receive and store the first UI element and the first interface file that are pushed by the network device. After receiving the first UI element and the first interface file that are configured by the operation personnel, the network device may push the first UI element and the first interface file to the terminal.

In this implementation, the terminal may directly run, in response to the first operation performed by the user on the first prompt message, the first interface file stored in the terminal to invoke the first UI element to display the first recommendation interface. However, after the terminal displays the first prompt message, the user does not necessarily perform the first operation on the first prompt message, in other words, the user does not necessarily view an application in a first scenario package. In this case, even if the terminal receives and stores the first UI element and the first interface file, the first UI element and the first interface file are not used, but memory of the terminal is occupied instead.

Based on this, in another implementation, when receiving the first operation performed by the user on the first prompt message, the terminal may obtain the first UI element and the first interface file from the network device, and run the obtained first interface file to invoke the first UI element to display the first recommendation interface. Specifically, the terminal may send a first obtaining request to the network device in response to the first operation performed by the user on the first prompt message, to request to obtain the first UI element and the first interface file. Then, the terminal receives a first obtaining response that is sent by the network device and that includes the first UI element and the first interface file. The terminal obtains the first UI element and the first interface file from the network device only in response to the first operation performed by the user on the first prompt message. In this way, the first UI element and the first interface file can be prevented from occupying memory of the terminal when the user does not necessarily view the application prompted by the first prompt message, but the first UI element and the first interface file are prestored.

In another possible design manner of the first aspect, after displaying the first recommendation interface, the terminal may further receive a modification performed by the user on the first prompt rule, so that an application can be recommended to the user based on a modified first prompt rule, thereby improving a degree of matching between an occasion on which the terminal recommends an application to the user and a user requirement. Specifically, after the terminal displays, in response to the first operation performed by the user on the first prompt message, the first recommendation interface corresponding to the first prompt message, the method in this embodiment of this application may further include: The terminal displays, in response to a second operation performed by the user in the first recommendation interface, a rule modification interface that includes the first prompt rule. The terminal receives a modification performed by the user on the first prompt rule in the rule modification interface, and stores a modified first prompt rule.

In another possible design manner of the first aspect, after receiving the modification performed by the user on the first prompt rule in the rule modification interface, to update the first prompt rule, the terminal may further send a rule modification message that includes the modified first prompt rule to the network device, to instruct the network device to store the modified first prompt rule for a user account of the terminal. It is assumed that the terminal is currently logged in with a first user account. When the user logs in to another terminal with the first user account, the another terminal may obtain, from the network device, the modified first prompt rule stored for the first user account, so that an application can be recommended to the user based on the modified first prompt rule.

In another possible design manner of the first aspect, after displaying the first recommendation interface, the terminal may further receive an addition operation or a deletion operation that is performed by the user on the application prompted by the first prompt message, so that the first prompt message can prompt an application that better meets a user requirement. Specifically, the terminal may delete a second recommendation item from the first recommendation interface in response to a deletion operation performed by the user on the second recommendation item in the first recommendation interface, to display a second recommendation interface.

In another possible design manner of the first aspect, after receiving the deletion operation performed by the user on the second recommendation item in the first recommendation interface, the terminal may further send a first notification message to the network device, to instruct the network device to: modify the first interface file and the first UI element for the user account of the terminal, so that a modified first interface file is run to invoke a modified first UI element to display the second recommendation interface; and store the modified first interface file and the modified first UI element for the user account of the terminal. In this way, it is assumed that the terminal is currently logged in to with a first user account. When the user logs in to another terminal with the first user account, the another terminal may obtain, from the network device, the modified first interface file and the modified first UI element that are stored for the first user account, so that the modified first interface file can be run to invoke the modified first UI element, to display a second recommendation interface that does not include the second recommendation item.

In another possible design manner of the first aspect, in response to an operation performed by the user, the terminal may not only delete a recommendation item from the first recommendation interface, but also may add a recommendation item to the first recommendation interface. Specifically, the terminal may display, in response to a third operation performed by the user in the first recommendation interface, a service addition interface that includes one or more recommendation items. Each of the one or more recommendation items corresponds to one application. Then, the terminal adds a third recommendation item in the one or more recommendation items to the first recommendation interface in response to a selection operation performed by the user on the third recommendation item, to display a third recommendation interface that includes the third recommendation item.

In another possible design manner of the first aspect, the terminal may further send a second notification message to the network device in response to the selection operation performed by the user on the third recommendation item, to instruct the network device to: modify the first interface file and the first UI element for the user account of the terminal, so that a modified first interface file is run to invoke a modified first UI element to display the third recommendation interface; and store the modified first interface file and the modified first UI element for the user account of the terminal.

In another possible design manner of the first aspect, it is assumed that the terminal is currently logged in to with a first user account. When the first user account is switched to a second user account for the terminal, the terminal may send a rule query message that includes the second user account to the network device. Then, the terminal receives a rule query response that is sent by the network device and that includes a second prompt rule, and the second prompt rule is a prompt rule stored by the network device for the second user account. Next, the terminal obtains, from the network device, a second prompt message used to prompt that there is a recommended application in the scenario corresponding to the current scenario information, to display the second prompt message when the current scenario information matches the second prompt rule.

In another possible design manner of the first aspect, that the terminal obtains the one or more prompt rules from a network device includes: The terminal receives the one or more prompt rules sent by the network device. Alternatively, the terminal sends a rule query message that includes a user account of the terminal to the network device, and receives a rule query response sent by the network device. The rule query response includes the one or more prompt rules stored by the network device for the user account, and the network device stores, for each user account, a prompt rule reported by a terminal that is logged in to with the corresponding user account.

According to a second aspect, an embodiment of this application provides a scenario-based application recommendation method. The method includes: A network device obtains a first prompt rule and a first prompt message. The network device sends the first prompt message and the first prompt rule to a terminal, so that the terminal displays the first prompt message when current scenario information matches the first prompt rule. For detailed descriptions of the first prompt message and the first prompt rule, refer to the descriptions in the first aspect and the possible design manners of the first aspect in the embodiments of this application. Details are not described again in this embodiment of this application.

In this embodiment of this application, because the current scenario information may reflect a current status of the user, it is prompted that the application recommended in the scenario corresponding to the current scenario information may meet a current requirement of the user. It can be learned that, by using this solution, a degree of matching between a service recommended by the terminal to the user and a user requirement can be improved. In addition, an application recommended by the terminal provides a tap-to-use direct service for the user, and there is no need to download and install a client of the APP for the terminal. To be specific, according to the method in this embodiment of this application, a user operation in a process of providing a service for the user by the terminal can be simplified, and a case in which memory of the terminal is occupied when the client of the APP is downloaded and installed for the terminal can be avoided. In conclusion, according to the method in this embodiment of this application, human-computer interaction performance of the terminal can be improved, so as to improve user experience.

In a possible design manner of the second aspect, a first interface file and a first user interface UI element are configured for one or more applications on the network device; and the first UI element includes an interface element of a first recommendation interface, the first interface file is used to invoke the first UI element to display the first recommendation interface when being run, and the first recommendation interface includes recommendation items of the one or more applications. The network device may receive the first interface file and the first UI element that are configured by operation personnel for the one or more applications.

In an implementation, after receiving the first interface file and the first UI element that are configured by the operation personnel, the network device may push the first interface file and the first UI element to the terminal. In this implementation, the terminal may directly run, in response to a first operation performed by the user on the first prompt message, the first interface file stored in the terminal to invoke the first UI element to display the first recommendation interface. However, after the terminal displays the first prompt message, the user does not necessarily perform the first operation on the first prompt message, in other words, the user does not necessarily view an application in a first scenario package. In this case, even if the terminal receives and stores the first UI element and the first interface file, the first UI element and the first interface file are not used, but memory of the terminal is occupied instead.

Based on this, in another implementation, after sending the first prompt rule to the terminal, if receiving a first obtaining request sent by the terminal, the network device may send a first obtaining response that includes the first interface file and the first UI element to the terminal. In this way, the first UI element and the first interface file can be prevented from occupying memory of the terminal when the user does not necessarily view the application prompted by the first prompt message, but the first UI element and the first interface file are prestored.

In another possible design manner of the second aspect, after the network device sends the first obtaining response to the terminal, the terminal may modify the first prompt rule in the first recommendation interface. The method in this embodiment of this application further includes: The network device receives a rule modification message that is sent by the terminal and that includes a modified first prompt rule and a user account of the terminal. The network device stores the modified first prompt rule for the user account in response to the rule modification message. In this way, the network device may also update the first prompt rule. It is assumed that the terminal is currently logged in to with a first user account. When the user logs in to another terminal with the first user account, the another terminal may obtain, from the network device, the modified first prompt rule stored for the first user account, so that an application can be recommended to the user based on the modified first prompt rule.

In another possible design manner of the second aspect, after the network device sends the first obtaining response to the terminal, the terminal may delete a recommendation item from the first recommendation interface or add a recommendation item to the first recommendation interface. The method in this embodiment of this application further includes: The network device receives a notification message sent by the terminal, and the notification message is used to instruct the network device to modify the first interface file and the first UI element for the user account of the terminal. The network device modifies the first interface file and the first UI element for the user account of the terminal in response to the notification message, so that a second recommendation interface is displayed when a modified first interface file is run to invoke a modified first UI element; and stores the modified first interface file and the modified first UI element for the user account of the terminal. Compared with the first recommendation interface, recommendation items of one or more applications are added to or deducted from the second recommendation interface.

The notification message in this embodiment of this application may be the foregoing first notification message or the foregoing second notification message. For specific content of the first notification message and the second notification message, and a specific manner in which the network device modifies the first interface file and the first UI element in response to the first notification message or the second notification message, refer to the detailed descriptions in the possible design manners of the first aspect in the embodiments of this application. Details are not described again in this embodiment of this application.

In another possible design manner of the second aspect, the method for sending the first prompt message to the terminal by the network device may include: In response to receiving a second obtaining request sent by the terminal, the network device sends the first prompt message to the terminal based on the second obtaining request.

According to a third aspect, an embodiment of this application provides a scenario-based application recommendation method. The method includes: A network device receives current scenario information sent by a terminal. The network device matches the current scenario information against one or more prompt rules. When determining that the current scenario information matches a first prompt rule in the one or more prompt rules, the network device sends a first prompt message corresponding to the first prompt rule to the terminal, or instructs the terminal to display a first prompt message corresponding to the first prompt rule. The terminal stores the first prompt message. The first prompt message is used to prompt that there is a recommended application in a scenario corresponding to the current scenario information.

The network device may receive the current scenario information reported by the terminal, and when the first prompt rule matches the current scenario information, instruct the terminal to display the first prompt message corresponding to the first prompt rule, to prompt that there is a recommended application in the scenario corresponding to the current scenario information. Because the current scenario information may reflect a current status of the user, it is prompted that the application recommended in the scenario corresponding to the current scenario information may meet a current requirement of the user. It can be learned that, by using the method in this embodiment of this application, a degree of matching between a service recommended by the terminal to the user and a user requirement can be improved.

In a possible design manner of the third aspect, after sending the first prompt message to the terminal or instructing the terminal to display the first prompt message, the network device may receive a first obtaining request sent by the terminal, and send a first interface file and a first UI element to the terminal based on the first obtaining request. For detailed descriptions of the first interface file and the first UI element, refer to the related content in the first aspect and the possible design manners of the first aspect. Details are not described again in this embodiment of this application.

In another possible design manner of the third aspect, the first interface file and the first UI element may be received by the network device and configured by operation personnel.

According to a fourth aspect, an embodiment of this application provides a terminal. The terminal includes an obtaining unit, a matching unit, and a display unit. The obtaining unit is configured to obtain current scenario information. The matching unit is configured to match the current scenario information obtained by the obtaining unit against one or more prompt rules. The display unit is configured to: when the matching unit determines that the current scenario information matches a first prompt rule in the one or more prompt rules, display a first prompt message corresponding to the first prompt rule, where the first prompt message is used to prompt that there is a recommended application in a scenario corresponding to the current scenario information; display, in response to a first operation performed by a user on the first prompt message, a first recommendation interface corresponding to the first prompt message, where the first recommendation interface includes recommendation items of one or more applications; and display an interface of a first application in response to a selection operation performed by the user on a first recommendation item in the first recommendation interface displayed by the display unit.

In a possible design manner of the fourth aspect, the terminal further includes a receiving unit. The receiving unit is configured to: before the matching unit matches the current scenario information against the one or more prompt rules, receive and store the one or more prompt rules sent by a network device. The one or more prompt rules include the first prompt rule.

In another possible design manner of the fourth aspect, that a display unit is configured to display, in response to a first operation performed by a user on the first prompt message, a first recommendation interface corresponding to the first prompt message includes: The display unit is specifically configured to: obtain a first interface file and a first UI element from the network device in response to the first operation, where the first UI element includes an interface element of the first recommendation interface; and run the first interface file to invoke the first UI element to display the first recommendation interface.

In another possible design manner of the fourth aspect, the terminal further includes a receiving unit and a storage unit. The receiving unit is configured to: before the display unit displays the first recommendation interface, receive a first interface file and a first UI element that are sent by the network device. The first UI element includes an interface element of the first recommendation interface. The storage unit is configured to store the first interface file and the first UI element that are received by the receiving unit. That a display unit is configured to display, in response to a first operation performed by a user on the first prompt message, a first recommendation interface corresponding to the first prompt message includes: The display unit is specifically configured to run, in response to the first operation, the first interface file to invoke the first UI element to display the first recommendation interface.

In another possible design of the fourth aspect, the obtaining unit is further configured to obtain the first prompt message from the network device before the display unit displays the first prompt message corresponding to the first prompt rule.

In another possible design manner of the fourth aspect, the display unit is further configured to: after displaying the first recommendation interface, display a rule modification interface in response to a second operation performed by the user in the first recommendation interface. The storage unit is configured to: receive a modification performed by the user on the first prompt rule in the rule modification interface displayed by the display unit, and store a modified first prompt rule.

In another possible design manner of the fourth aspect, the terminal further includes a sending unit. The sending unit is configured to send a rule modification message to the network device after the storage unit stores the modified first prompt rule. The rule modification message includes the modified first prompt rule and a user account of the terminal, and the rule modification message is used to instruct the network device to store the modified first prompt rule for the user account.

In another possible design manner of the fourth aspect, the display unit is further configured to: after displaying the first recommendation interface, delete a second recommendation item from the first recommendation interface in response to a deletion operation performed by the user on the second recommendation item in the first recommendation interface, to display a second recommendation interface that does not include the second recommendation item.

In another possible design manner of the fourth aspect, the terminal further includes the sending unit. The sending unit is configured to send a first notification message to the network device in response to the deletion operation performed by the user on the second recommendation item in the first recommendation interface displayed by the display unit. The first notification message is used to instruct the network device to: modify the first interface file and the first UI element for the user account of the terminal, so that a modified first interface file is run to invoke a modified first UI element to display the second recommendation interface; and store the modified first interface file and the modified first UI element for the user account of the terminal.

In another possible design manner of the fourth aspect, the display unit is further configured to: after displaying the first recommendation interface, display a service addition interface in response to a third operation performed by the user in the first recommendation interface, where the service addition interface includes one or more recommendation items, and each of the one or more recommendation items corresponds to one application; and add a third recommendation item in the one or more recommendation items to the first recommendation interface in response to a selection operation performed by the user on the third recommendation item, to display a third recommendation interface that includes the third recommendation item.

In another possible design manner of the fourth aspect, the terminal further includes the sending unit. The sending unit is further configured to send a second notification message to the network device in response to the selection operation performed by the user on the third recommendation item. The second notification message is used to instruct the network device to: modify the first interface file and the first UI element for the user account of the terminal, so that a modified first interface file is run to invoke a modified first UI element to display the third recommendation interface; and store the modified first interface file and the modified first UI element for the user account of the terminal.

In another possible design manner of the fourth aspect, that the obtaining unit is configured to obtain the one or more prompt rules from a network device includes: The obtaining unit is configured to: receive the one or more prompt rules sent by the network device; or send a rule query message to the network device, where the rule query message includes a user account of the terminal; and receive a rule query response sent by the network device, where the rule query response includes the one or more prompt rules stored by the network device for the user account, and the network device stores, for each user account, a prompt rule reported by a terminal that is logged in to with the corresponding user account.

According to a fifth aspect, an embodiment of this application provides a network device. The network device includes an obtaining unit and a sending unit. The obtaining unit is configured to obtain a first prompt rule and a first prompt message. The first prompt rule includes information about a condition on which a terminal recommends one or more applications to a user, and the first prompt message is used to prompt that there are one or more recommended applications in a scenario corresponding to scenario information that matches the first prompt rule. The sending unit is configured to send the first prompt message to the terminal. The sending unit is further configured to send the first prompt rule to the terminal, so that the terminal displays the first prompt message when the current scenario information matches the first prompt rule.

In a possible design manner of the fifth aspect, the network device further includes a storage unit, and the storage unit stores a first interface file and a first user interface UI element that are configured for the one or more applications; and the first UI element includes an interface element of a first recommendation interface, the first interface file is used to invoke the first UI element to display the first recommendation interface when being run, and the first recommendation interface includes recommendation items of the one or more applications. The sending unit is further configured to push the first interface file and the first UI element to the terminal. Alternatively, the network device further includes a receiving unit. The receiving unit is configured to receive a first obtaining request sent by the terminal. The sending unit is further configured to: in response to the first obtaining request, send the first interface file and the first UI element to the terminal based on the first obtaining request. The first obtaining request is sent by the terminal when the current scenario information matches the first prompt rule.

In another possible design manner of the fifth aspect, the receiving unit is further configured to: after the sending unit sends the first interface file and the first UI element to the terminal, receive a notification message sent by the terminal. The notification message is used to instruct the network device to modify the first interface file and the first UI element for a user account of the terminal. The network device further includes a modification unit. The modification unit is configured to modify the first interface file and the first UI element for the user account of the terminal in response to the notification message, so that a second recommendation interface is displayed when a modified first interface file is run to invoke a modified first UI element, and the modified first interface file and the modified first UI element are stored for the user account of the terminal. Compared with the first recommendation interface, recommendation items of one or more applications are added to or deducted from the second recommendation interface.

In another possible design manner of the fifth aspect, the network device further includes the receiving unit and the storage unit. The receiving unit is configured to: after the sending unit sends the first prompt rule to the terminal, receive a rule modification message sent by the terminal. The rule modification message includes a modified first prompt rule and the user account of the terminal. The storage unit is configured to store the modified first prompt rule for the user account in response to the rule modification message received by the receiving unit.

In another possible design manner of the fifth aspect, the network device further includes the receiving unit. The receiving unit is configured to receive a second obtaining request sent by the terminal. That a sending unit is configured to send the first prompt message to the terminal includes: The sending unit is configured to: in response to that the receiving unit receives a second obtaining request sent by the terminal, send the first prompt message to the terminal based on the second obtaining request.

According to a sixth aspect, an embodiment of this application provides a network device, including a receiving unit, a matching unit, and an instruction unit. The receiving unit is configured to receive current scenario information sent by a terminal. The matching unit is configured to match the current scenario information against one or more prompt rules. The instruction unit is configured to: when it is determined that the current scenario information matches a first prompt rule in the one or more prompt rules, send a first prompt message corresponding to the first prompt rule to the terminal, or instruct the terminal to display a first prompt message corresponding to the first prompt rule. The terminal stores the first prompt message. The first prompt message is used to prompt that there is a recommended application in a scenario corresponding to the current scenario information.

In a possible design manner of the sixth aspect, the network device further includes the receiving unit. The receiving unit is configured to: after the instruction unit sends the first prompt message corresponding to the first prompt rule to the terminal, or instructs the terminal to display the first prompt message corresponding to the first prompt rule, receive a first obtaining request sent by the terminal, and send a first interface file and a first user interface UI element to the terminal based on the first obtaining request. The first UI element includes an interface element of a first recommendation interface, the first interface file is used to invoke the first UI element to display the first recommendation interface when being run, and the recommendation interface includes a recommendation item of an application prompted by the first prompt message.

In another possible design manner of the sixth aspect, the network device further includes an input unit. The input unit is configured to: before the sending unit sends the first interface file and the first user interface UI element to the terminal in response to the first obtaining request, receive the first interface file and the first UI element that are configured by operation personnel.

According to a seventh aspect, an embodiment of this application provides a terminal. The terminal includes a processor, a memory, a display, and a communications interface. The memory, the display, and the communications interface are coupled to the processor. The display is configured to display an interface or a page. The communications interface is configured to communicate with a network device. The memory includes a non-volatile storage medium. The memory is configured to store computer program code. The computer program code includes a computer instruction. When the processor executes the computer instruction, the processor may be configured to: obtain current scenario information, and match the current scenario information against one or more prompt rules. The display is configured to: when the processor determines that the current scenario information matches a first prompt rule in the one or more prompt rules, display a first prompt message corresponding to the first prompt rule. The first prompt message is used to prompt that there is a recommended application in a scenario corresponding to the current scenario information. The processor is further configured to: receive a first operation performed by a user on the first prompt message, and control, in response to the first operation, the display to display a first recommendation interface corresponding to the first prompt message. The first recommendation interface includes recommendation items of one or more applications. The processor is further configured to: receive a selection operation performed by the user on a first recommendation item in the first recommendation interface, and control, in response to the selection operation performed by the user on the first recommendation item, the display to display an interface of a first application.

In a possible design manner of the seventh aspect, the processor is further configured to: before matching the current scenario information against the one or more prompt rules, obtain the one or more prompt rules from a network device. The one or more prompt rules include the first prompt rule.

In another possible design manner of the seventh aspect, the processor is further configured to obtain a first interface file and a first UI element from the network device in response to the first operation. The first UI element includes an interface element of the first recommendation interface. The processor may be further configured to run the first interface file to invoke the first UI element, to control the display to display the first recommendation interface.

In another possible design of the seventh aspect, the communications interface is configured to: before the display displays the first recommendation interface, receive a first interface file and a first UI element that are sent by the network device. The first UI element includes an interface element of the first recommendation interface. The memory is further configured to store the first interface file and the first UI element that are received by the communications interface. The processor is further configured to run, in response to the first operation, the first interface file to invoke the first UI element, to control the display to display the first recommendation interface.

In another possible design manner of the seventh aspect, the processor is further configured to obtain the first prompt message from the network device before the display displays the first prompt message.

In another possible design manner of the seventh aspect, the processor may be further configured to: after the first recommendation interface is displayed, receive a second operation performed by the user in the first recommendation interface, and control, in response to the second operation, the display to display a rule modification interface. The processor may be further configured to: receive a modification performed by the user on the first prompt rule in the rule modification interface displayed by the display, and store a modified first prompt rule in the memory.

In another possible design manner of the seventh aspect, the communications interface is further configured to send a rule modification message to the network device after the memory stores the modified first prompt rule. The rule modification message includes the modified first prompt rule and a user account of the terminal, and the rule modification message is used to instruct the network device to store the modified first prompt rule for the user account In another possible design manner of the seventh aspect, the processor is further configured to: after the display displays the first recommendation interface, receive a deletion operation performed by the user on a second recommendation item in the first recommendation interface, and delete, in response to the deletion operation performed by the user on the second recommendation item, the second recommendation item from the first recommendation interface displayed by the display, to control the display to display a second recommendation interface that does not include the second recommendation item.

In another possible design manner of the seventh aspect, the processor is further configured to: receive the deletion operation performed by the user on the second recommendation item in the first recommendation interface, and control, in response to the deletion operation performed by the user on the second recommendation item, the communications interface to send a first notification message to the network device. The first notification message is used to instruct the network device to: modify the first interface file and the first UI element for the user account of the terminal, so that a modified first interface file is run to invoke a modified first UI element to display the second recommendation interface; and store the modified first interface file and the modified first UI element for the user account of the terminal.

In another possible design manner of the seventh aspect, the processor is further configured to: receive a third operation performed by the user in the first recommendation interface, and control, in response to the third operation, the display to display a service addition interface. The service addition interface includes one or more recommendation items, and each of the one or more recommendation items corresponds to one application. The processor is further configured to: receive a selection operation performed by the user on the third recommendation item in the one or more recommendation items, and add the third recommendation item to the first recommendation interface in response to the selection operation performed by the user on the third recommendation item, to control the display to display a third recommendation interface that includes the third recommendation item.

In another possible design manner of the seventh aspect, the processor is further configured to: receive the selection operation performed by the user on the third recommendation item, and control, in response to the selection operation performed by the user on the third recommendation item, the communications interface to send a second notification message to the network device. The second notification message is used to instruct the network device to: modify the first interface file and the first UI element for the user account of the terminal, so that a modified first interface file is run to invoke a modified first UI element to display the third recommendation interface; and store the modified first interface file and the modified first UI element for the user account of the terminal.

In another possible design manner of the seventh aspect, the communications interface is further configured to receive the one or more prompt rules sent by the network device. Alternatively, the communications interface is further configured to: send a rule query message to the network device, where the rule query message includes a user account of the terminal; and receive a rule query response sent by the network device, where the rule query response includes the one or more prompt rules stored by the network device for the user account, and the network device stores, for each user account, a prompt rule reported by a terminal that is logged in to with the corresponding user account.

According to an eighth aspect, an embodiment of this application provides a network device. The network device includes a processor, a memory, and a communications interface. The memory and the communications interface are coupled to the processor. The communications interface is configured to communicate with another device. The memory includes a non-volatile storage medium. The memory is configured to store computer program code. The computer program code includes a computer instruction. When the processor executes the computer instruction, the processor may be configured to obtain a first prompt rule and a first prompt message. The first prompt rule includes information about a condition on which a terminal recommends one or more applications to a user, and the first prompt message is used to prompt that there are one or more recommended applications in a scenario corresponding to scenario information that matches the first prompt rule. The communications interface is configured to: send the first prompt message to the terminal, and send the first prompt rule to the terminal, so that the terminal displays the first prompt message when the current scenario information matches the first prompt rule. The communications interface communicates with another device under control of the processor.

In a possible design manner of the eighth aspect, the memory is further configured to store a first interface file and a first user interface UI element that are configured for the one or more applications. The first UI element includes an interface element of a first recommendation interface, the first interface file is used to invoke the first UI element to display the first recommendation interface when being run, and the first recommendation interface includes recommendation items of the one or more applications.

The communications interface is further configured to push the first interface file and the first UI element to the terminal. Alternatively, the communications interface is further configured to: receive a first obtaining request sent by the terminal, and send the first interface file and the first UI element to the terminal. The first obtaining request is sent by the terminal when the current scenario information matches the first prompt rule.

In another possible design manner of the eighth aspect, the communications interface is further configured to: after sending the first interface file and the first UI element to the terminal, receive a notification message sent by the terminal. The notification message is used to instruct the network device to modify the first interface file and the first UI element for a user account of the terminal. The processor is further configured to: modify the first interface file and the first UI element for the user account of the terminal in response to the notification message, so that a second recommendation interface is displayed when a modified first interface file is run to invoke a modified first UI element; and store the modified first interface file and the modified first UI element for the user account of the terminal. Compared with the first recommendation interface, recommendation items of one or more applications are added to or deducted from the second recommendation interface.

In another possible design manner of the eighth aspect, the communications interface is further configured to: after sending the first prompt rule to the terminal, receive a rule modification message sent by the terminal. The rule modification message includes a modified first prompt rule and the user account of the terminal. The processor is further configured to control, in response to the rule modification message, the memory to store the modified first prompt rule for the user account.

In another possible design manner of the eighth aspect, the communications interface is further configured to: receive a second obtaining request sent by the terminal, and send the first prompt message to the terminal. The second obtaining request is used to obtain the first prompt message.

According to a ninth aspect, an embodiment of this application provides a network device. The network device includes a processor, a memory, and a communications interface. The memory and the communications interface are coupled to the processor. The communications interface is configured to communicate with another device. The memory includes a non-volatile storage medium. The memory is configured to store computer program code. The computer program code includes a computer instruction. When the processor executes the computer instruction, the communications interface is configured to receive current scenario information sent by a terminal. The processor is configured to match the current scenario information received by the communications interface against one or more prompt rules. When determining that the current scenario information matches a first prompt rule in the one or more prompt rules, the processor controls the communications interface to send a first prompt message corresponding to the first prompt rule to the terminal, or the processor instructs the terminal to display a first prompt message corresponding to the first prompt rule. The terminal stores the first prompt message. The first prompt message is used to prompt that there is a recommended application in a scenario corresponding to the current scenario information.

In a possible design manner of the ninth aspect, the communications interface is further configured to: after the communications interface sends the first prompt message corresponding to the first prompt rule to the terminal, or the processor instructs the terminal to display the first prompt message corresponding to the first prompt rule, receive a first obtaining request sent by the terminal. The processor is further configured to control the communications interface to send a first interface file and a first user interface UI element to the terminal based on the first obtaining request received by the communications interface. The first UI element includes an interface element of a first recommendation interface, the first interface file is used to invoke the first UI element to display the first recommendation interface when being run, and the recommendation interface includes a recommendation item of an application prompted by the first prompt message.

In another possible design manner of the ninth aspect, the processor is further configured to: before the communications interface sends the first interface file and the first user interface UI element to the terminal, receive the first interface file and the first UI element that are configured by operation personnel.

According to a tenth aspect, an embodiment of this application provides a computer storage medium. The computer storage medium includes a computer instruction, and when the computer instruction is run on a terminal, the terminal is enabled to perform the method in the first aspect and any possible design manner of the first aspect.

According to an eleventh aspect, an embodiment of this application provides a computer storage medium. The computer storage medium includes a computer instruction, and when the computer instruction is run on a management device, the management device is enabled to perform the method in the second aspect and any possible design manner of the second aspect or the method in the third aspect and any possible design manner of the third aspect.

According to a twelfth aspect, an embodiment of this application provides a computer program product. When the computer program product is run on a computer, the computer is enabled to perform the method in the first aspect or any possible design manner of the first aspect, the method in the second aspect and any possible design manner of the second aspect, or the method in the third aspect and any possible design manner of the third aspect.

In addition, for technical effects brought by the fourth aspect and any design manner of the fourth aspect to the twelfth aspect and any design manner of the twelfth aspect, and technical effects brought by the seventh aspect, the eighth aspect, and the ninth aspect, refer to the technical effects brought by the first aspect, the second aspect, and different design manners of the first aspect and the second aspect. Details are not described herein again.

DETAILED DESCRIPTION OF ILLUSTRATIVE EMBODIMENTS

Figure 1:
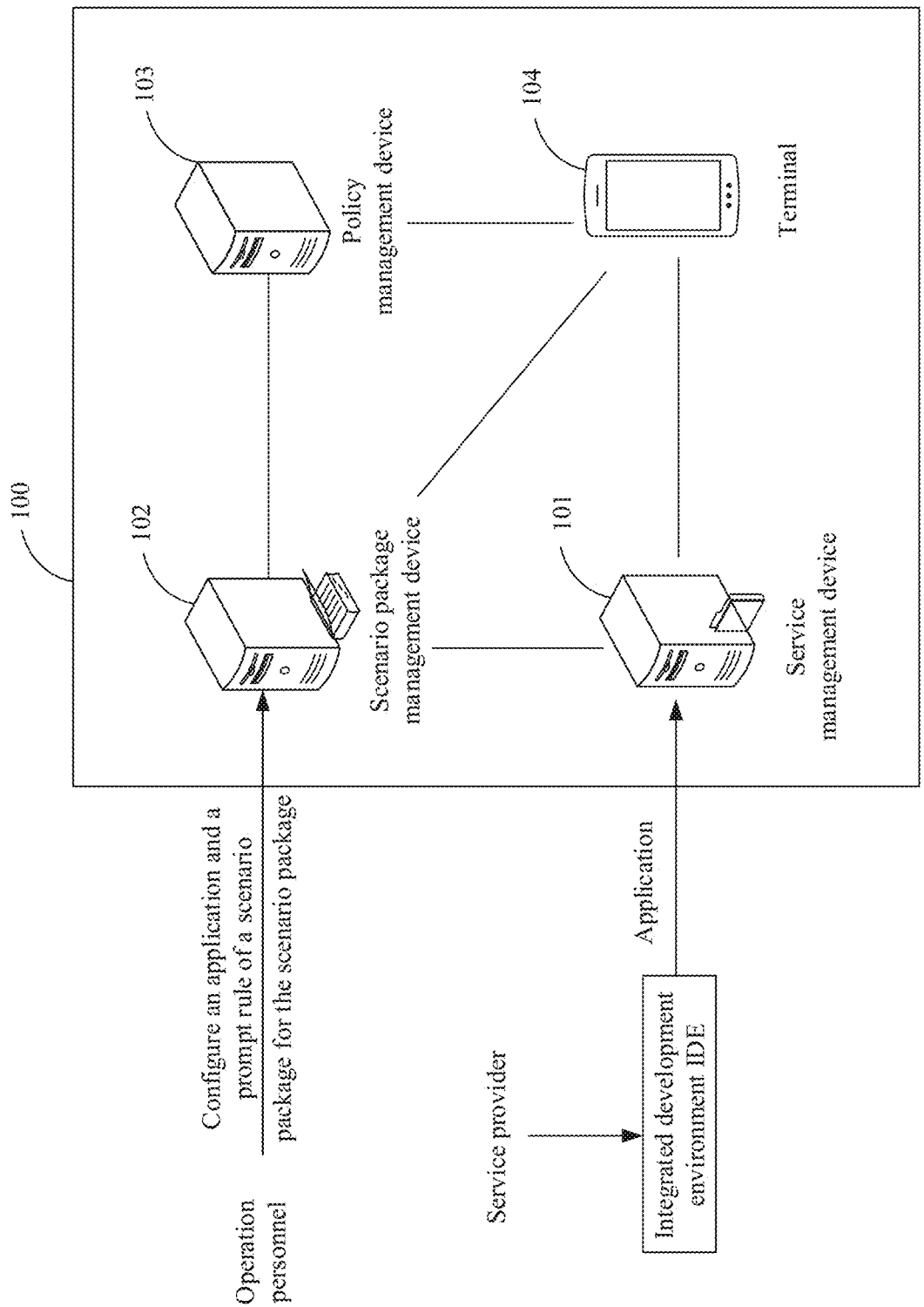
FIG. 1 is a schematic diagram of a system architecture of a recommendation system according to an embodiment of this application.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of this application, unless otherwise stated, "a plurality of" means two or more than two.

The embodiments of this application provide a scenario-based application recommendation method. An application recommended by a terminal to a user may be a web page-based application (referred to as a web page application for short) that is developed by a service provider in an integrated development environment (Integrated Development Environment, IDE) and that can be run on the terminal to provide a service for the user. In other words, an interface of the application is presented by the web page, and interaction between the application and the user is implemented through interaction between the user and the web page. The application recommended by the terminal to the user may alternatively be an application developed by the service provider in the IDE in JavaScript language (referred to as a JS application for short). The IDE is provided by an operator that provides the application recommendation solution in the embodiments of this application.

An application in the embodiments of this application may be a conventional APP, or may be an application that does not need to be installed and that can be used only by running or opening a file corresponding to the application (for example, the web page-application or the JS application). For the application, the terminal only needs to provide an entry of the application, to provide an out-of-the-box service experience for the user. The application that does not need to be installed can provide a direct service (Direct-Service) for the user, and may also be referred to as a direct service. For the direct service, refer to detailed descriptions of the direct service in the MIUI 8.5 stable version. Details are not described in the embodiments of this application. Without loss of generality, in the embodiments of this application, a direct application is used as an example for description.

In the embodiments of this application, a plurality of applications that match same scenario information may be included in a scenario package corresponding to the scenario information, and then recommended to the user. In other words, an application that provides the foregoing direct service may be recommended to the user in a form of a scenario package. To be specific, the scenario package is a service that provides a service set for the user based on current scenario information of the terminal, and the service set includes one or more applications that provide a direct service.

For example, scenario information in the embodiments of this application may include at least one of time information, address information, and address change information. The time information is used to indicate a current time. The address information is used to indicate a current location of the terminal, for example, a country, a province, a city, a county, and a street. The address change information may be "address information of the terminal changes from city A to city B".

In the embodiments of this application, statistic collection may be performed on a user requirement triggered by a change of scenario information (for example, time information and/or address information) in a daily life, work, and learning process of the user, to determine an application corresponding to the scenario information.

For example, user requirements on a travel may include air ticket booking, hotel booking, and view spot recommendation. Scenario information corresponding to these user requirements may be "address information of the terminal changes from city A to city B". In this case, applications corresponding to the scenario information may include applications used to provide services such as "air ticket booking", "hotel booking", and "view spot recommendation". In the embodiments of this application, the applications that provide the services such as "air ticket booking", "hotel booking", and "view spot recommendation" may be included in a scenario package (for example, a travel scenario package) corresponding to the scenario information, and then recommended to the user.

For another example, user requirements on the eve of the Spring Festival may include air ticket booking, special purchases for the Spring Festival, and Spring Festival dinner booking. It is assumed that the Spring Festival holiday of 2018 is Feb. 15 to February 21, and scenario information corresponding to these user requirements may be Feb. 1 to Feb. 14. Applications corresponding to the scenario information may include applications used to provide services such as "air ticket booking", "special purchases for the Spring Festival", and "Spring Festival dinner booking". In the embodiments of this application, the applications that provide the services such as "air ticket booking", "special purchases for the Spring Festival", and "Spring Festival dinner booking" may be included in a scenario package (for example, a scenario package for the Spring Festival) corresponding to the scenario information, and then recommended to the user.

In the embodiments of this application, recommending a scenario package to the user by the terminal specifically means that the terminal recommends an application in the scenario package to the user. The terminal may provide an entry of a plurality of applications for the user in a form of a scenario package.

FIG. 1 is a schematic diagram of a system architecture of a recommendation system according to an embodiment of this application. As shown in FIG. 1, the recommendation system 100 may include a service management device 101, a scenario package management device 102, a policy management device 103, and a terminal 104.

The devices in the foregoing recommendation system are described in this embodiment of this application.

The service management device 101 is configured to manage a plurality of applications (also referred to as direct services) provided by a service provider. Specifically, the service management device 101 may store application files (for example, JavaScript files or web page files) of the plurality of applications developed by the service provider. By running an application file of an application, the terminal 104 may display an interface of the application. The terminal 104 may interact with a server of the application in response to an operation performed by a user on the interface of the application, to provide a corresponding service for the user.

Figure 2:
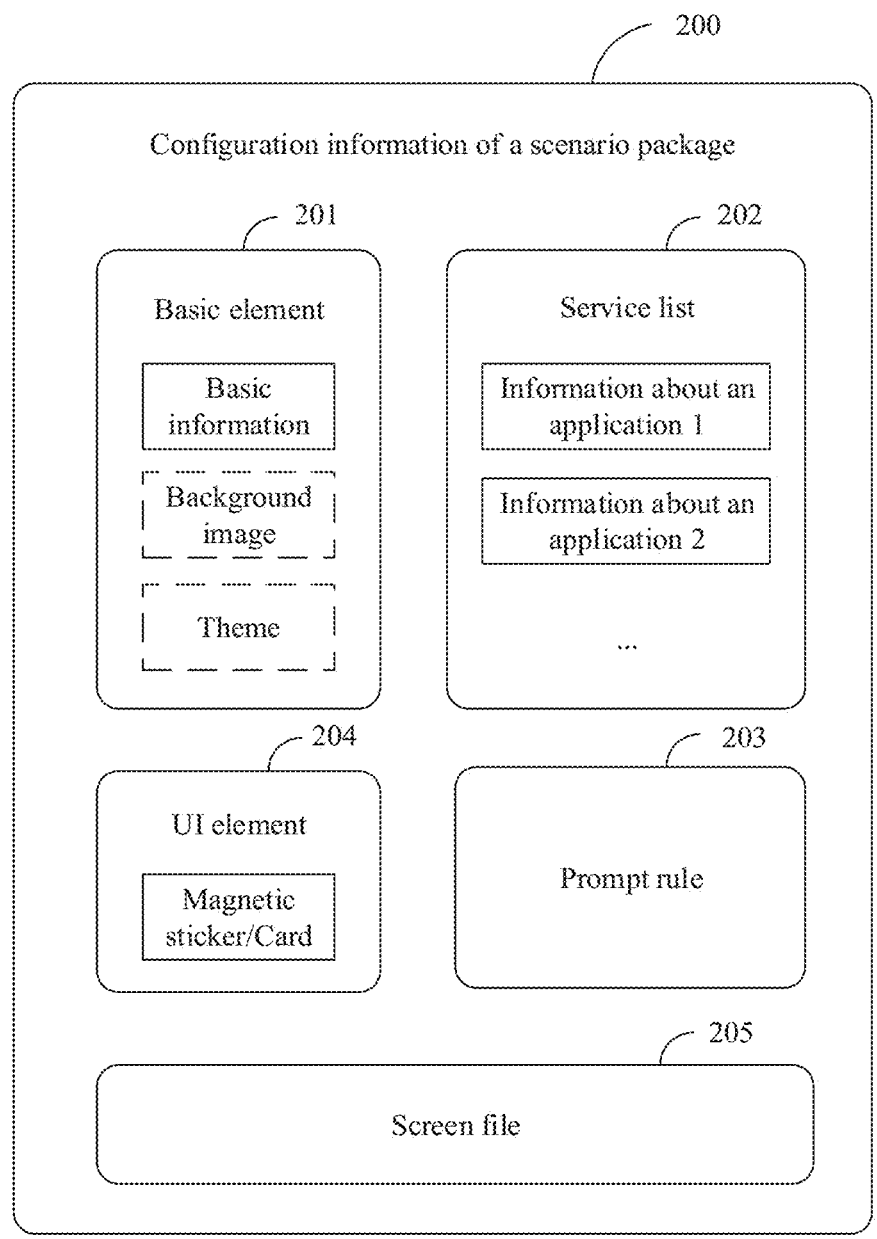
FIG. 2 is a schematic diagram of an instance of specific content of a scenario package according to an embodiment of this application.

The scenario package management device 102 is configured to manage a plurality of scenario packages. Specifically, the scenario package management device 102 is configured to manage configuration information of each of the plurality of scenario packages. FIG. 2 is a schematic diagram of an example of configuration information according to an embodiment of this application. As shown in FIG. 2, configuration information 200 of a scenario package may include a basic element 201 of the scenario package, a service list 202 of the scenario package, a prompt rule 203 of the scenario package, a UI element 204 of the scenario package, and an interface file 205 of the scenario package.

In this embodiment of the present invention, an interface file may be a web page file. When the terminal opens (or "runs") the web page file, the web page file invokes a UI element to present a related interface in a form of a page. An interface file may alternatively be a JS file. When the terminal runs the JS file, the JS file invokes a UI element to present a related interface. Certainly, an interface file may alternatively be an application file (for example, an apk file in an Android operating system) in the terminal that is used to implement a related interface display function. The apk file in the terminal is run to invoke a UI element to present a related interface, where apk is an Android package.

The basic element 201 of the scenario package is used to identify the scenario package. For example, as shown in FIG. 2, the basic element 201 of the scenario package may include basic information of the scenario package. The basic information of the scenario package includes an identifier of the scenario package (for example, a name of the scenario package). Optionally, the basic information of the scenario package may further include version information of the scenario package and the like.

Optionally, as shown in FIG. 2, the basic element 201 of the scenario package may further include a title and a background image of the scenario package. The title of the scenario package may be a brief introduction to a service provided by the scenario package (that is, a service provided by an application in the scenario package). For example, a title of a travel scenario package in Shanghai may be "You are currently in Shanghai, providing you with travel and life services in Shanghai". The background image of the scenario package may be used as a background image of the foregoing title. It may be understood that, although the identifier of the scenario package may be used to identify the scenario package, the title and the background image of the scenario package may visually improve user perception of the scenario package more intuitively, to identify the scenario package.

The service list 202 of the scenario package includes an identifier of each application in the scenario package. In other words, the service list 202 of the scenario package may be used to indicate a specific application that is included in the scenario package. Optionally, the service list 202 of the scenario package includes version information of each application in the scenario package and the like.

The prompt rule 203 of the scenario package is a condition on which the terminal 104 recommends the scenario package to the user. The terminal 104 may recommend the scenario package to the user when current scenario information matches the prompt rule 203 of the scenario package. In other words, the prompt rule 203 of the scenario package may be used to indicate, to the terminal 104, a specific condition that the current scenario information needs to meet to recommend the scenario package to the user.

In this embodiment of this application, statistic collection may be performed on a user requirement triggered by a change of scenario information in a daily life, work, and learning process of the user, to determine the prompt rule 203 of the scenario package corresponding to the scenario information. For example, user requirements on the eve of the Spring Festival may include air ticket booking, special purchases for the Spring Festival, and Spring Festival dinner booking. It is assumed that the Spring Festival holiday of 2018 is Feb. 15 to February 21. The prompt rule of the scenario package that provides services corresponding to the foregoing user requirements may be "a current time is between Feb. 1, 2018 and Feb. 14, 2018".

The UI element 204 of the scenario package includes an interface element such as a card or a magnetic sticker that is of each application in the service list 202 and that is presented in a recommendation interface of the scenario package. A card or a magnetic sticker of an application includes a theme text of the application or a theme text and a theme image of the application, and the card or the magnetic sticker of the application is used as an entry of the application. Specifically, the card or the magnetic sticker of each application in the recommendation interface of the scenario package is linked to a corresponding application, and the terminal 104 may display an interface of an application in the recommendation interface in response to an operation (for example, a tap operation) performed by the user on a card or a magnetic sticker of the application.

The terminal 104 may run the interface file 205 of the scenario package to invoke the UI element 204 of the scenario package to display a recommendation interface that includes an interface element (for example, a magnetic sticker or a card) of each application in the scenario.

The configuration information stored in the scenario package management device 102 is configured by operation personnel based on a market requirement. For example, before a new scenario package goes online, the scenario package management device 102 may receive a configuration operation performed by the operation personnel, configure one or more applications in the service management device 101 as applications in the scenario package, and configure configuration information for the scenario package.

For example, Table 1 is a schematic table of an example of a configuration information table provided in this embodiment of this application. The scenario package management device 102 may store the configuration information of each scenario package in a manner shown in Table 1. Certainly, a manner in which the scenario package management device 102 stores the configuration information includes but is not limited to the manner shown in Table 1. Other management manners are not described in this embodiment of this application.

TABLE 1

First information table

| Scenario package | Configuration information | | | | |
|---|---|---|---|---|---|
| Scenario package 1 | Basic element 1 | Service list 1 | UI element 1 | Prompt rule 1 | Interface file 1 |
| Scenario package 2 | Basic element 2 | Service list 2 | UI element 2 | Prompt rule 2 | Interface file 2 |
| ... | ... | ... | ... | ... | ... |
| Scenario package n | Basic element n | Service list n | UI element n | Prompt rule n | Interface file n |

Further, the scenario package management device 102 may further update configuration information of a configured scenario package in response to a modification operation performed by the operation personnel. For example, updating the configuration information may include: adding an identifier of a new application to the configuration information (in other words, adding a new application to the scenario package), or deleting identifiers of some applications from the configuration information (in other words, deleting some applications from the scenario package), or modifying a prompt rule 203 of the configured scenario package.

After configuring the prompt rule 203 for the scenario package in response to the configuration operation performed by the operation personnel, the scenario package management device 102 may send the prompt rule 203 of the scenario package to the policy management device 103. The policy management device 103 manages all prompt rules 203 of a plurality of scenario packages. Certainly, after the prompt rule 203 of the scenario package is modified, the scenario package management device 102 may send a modified prompt rule 203 of the scenario package to the policy management device 103. The policy management device 103 updates the prompt rule 203 of the scenario package with the modified prompt rule 203.

After receiving the prompt rule 203 of the scenario package, the policy management device 103 may send the prompt rule 203 of the scenario package to the terminal 104, so that the terminal 104 stores the prompt rule 203, and recommends the corresponding scenario package to the user when the current scenario information matches the prompt rule 203. For a specific method for recommending a scenario package to the user by the terminal 104, refer to detailed descriptions in subsequent embodiments. Details are not described in this embodiment of this application.

It should be noted that the policy management device 103, the service management device 101, and the scenario package management device 102 in this embodiment of this application may be three independent devices. In this case, the scenario package management device 102 is a network device in this embodiment of this application, and the policy management device 103 may be another network device in this embodiment of this application. Alternatively, functions of the policy management device 103 and the scenario package management device 102 may be integrated into one device (that is, a network device in this embodiment of this application) for implementation. Alternatively, functions of the policy management device 103, the service management device 101, and the scenario package management device 102 may be integrated into one device (that is, a network device in this embodiment of this application) for implementation.

In this embodiment of this application, a method according to an embodiment of this application is described only by using an example in which the policy management device 103, the service management device 101, and the scenario package management device 102 are three independent devices.

The terminal 104 may be a portable computer (a mobile phone 300 shown in FIG. 3), a notebook computer, a personal computer (Personal Computer, PC), a wearable electronic device (for example, a smartwatch), a tablet computer, an augmented reality (augmented reality, AR) device/a virtual reality (virtual reality, VR) device, a vehicle-mounted computer, or the like. A specific form of the terminal 104 is not particularly limited in the following embodiments.

Figure 3:
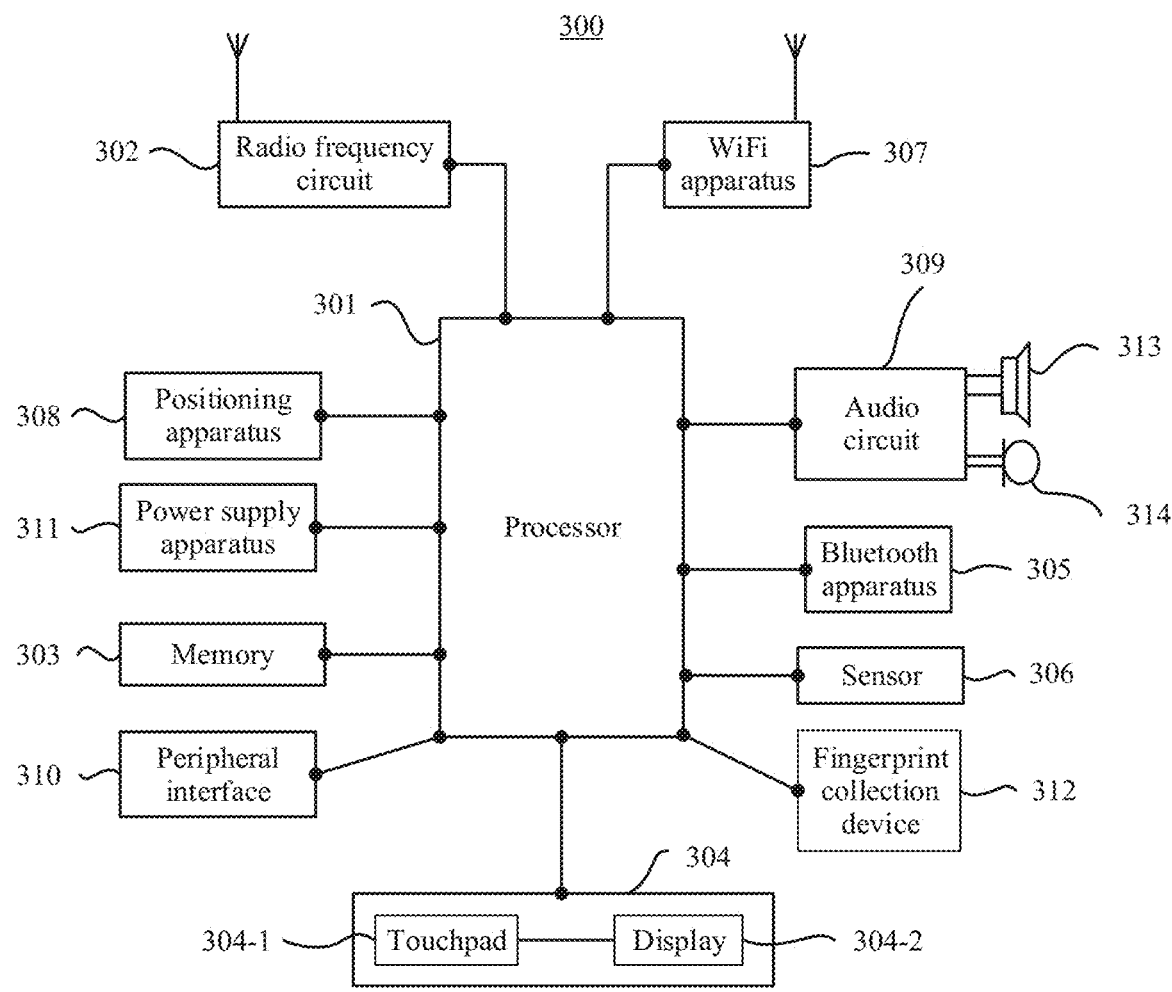
FIG. 3 is a schematic diagram of a hardware structure of a mobile phone according to an embodiment of this application.

As shown in FIG. 3, an example in which the mobile phone 300 is used as the terminal 104 is used. The mobile phone 300 may specifically include components such as a processor 301, a radio frequency (Radio Frequency, RF) circuit 302, a memory 303, a touchinterface 304, a Bluetooth apparatus 305, one or more sensors 306, a Wi-Fi apparatus 307, a positioning apparatus 308, an audio circuit 309, a peripheral interface 310, and a power supply apparatus 311. These components may communicate with each other by using one or more communications buses or signal lines (not shown in FIG. 3). A person skilled in the art may understand that a hardware structure shown in FIG. 3 does not constitute a limitation on the mobile phone, and the mobile phone 300 may include more or fewer components than those shown in the figure, or combine some components, or have different component arrangements.

The following specifically describes the components of the mobile phone 300 with reference to FIG. 3.

The processor 301 is a control center of the mobile phone 300. The processor 301 is connected to various parts of the mobile phone 300 by using various interfaces and cables, and performs various functions of the mobile phone 300 and processes data by running or executing an application program stored in the memory 303, and by invoking data stored in the memory 303. In some embodiments, the processor 301 may include one or more processing units. In some embodiments of this application, the processor 301 may further include a fingerprint verification chip, configured to verify a collected fingerprint.

The radio frequency circuit 302 may be configured to receive and send a radio signal. Particularly, after receiving downlink data from a base station, the radio frequency circuit 302 may send the downlink data to the processor 301 for processing, and sends related uplink data to the base station. The radio frequency circuit usually includes but is not limited to an antenna, at least one amplifier, a transceiver, a coupler, a low noise amplifier, a duplexer, and the like. In addition, the radio frequency circuit 302 may further communicate with another device through wireless communication. Any communications standard or protocol may be used for the wireless communication, and includes but is not limited to a global system for mobile communications, a general packet radio service, code division multiple access, wideband code division multiple access, long term evolution, and the like.

The memory 303 is configured to store an application program and data. The processor 301 performs various functions of the mobile phone 300 and processes data by running the application program and the data that are stored in the memory 303. The memory 303 mainly includes a program storage area and a data storage area. The program storage area may store an operating system, and an application program required by at least one function (for example, a sound playback function or an image playback function). The data storage area may store data (for example, audio data or a phone book) created when the mobile phone 300 is used. In addition, the memory 303 may include a high-speed random access memory (Random Access Memory, RAM), and may further include a non-volatile memory such as a magnetic disk storage device, a flash memory, or another volatile solid-state storage device. The memory 303 may store various operating systems. The memory 303 may be standalone, and is connected to the processor 301 by using the communications bus. Alternatively, the memory 303 may be integrated into the processor 301.

The touchinterface 304 may specifically include a touchpad 304-1 and a display 304-2.

The touchpad 304-1 may collect a touch event performed by the user on or near the mobile phone 300 (for example, an operation performed by the user on the touchpad 304-1 or near the touchpad 304-1 by using any proper object such as a finger or a stylus), and send collected touch information to another component (for example, the processor 301). The touch event performed by the user near the touchpad 304-1 may be referred to as floating touch control. The floating touch control may mean that the user does not need to directly touch the touchpad to select, move, or drag a target (for example, an icon), and the user only needs to be located near a device to implement a desired function. In addition, the touchpad 304-1 may be implemented in a plurality of manners such as a resistive manner, a capacitive manner, an infrared manner, and a surface acoustic wave manner.

The display (also referred to as a display interface) 304-2 may be configured to display information entered by the user or information provided for the user, and various menus of the mobile phone 300. The display 304-2 may be configured in a form such as a liquid crystal display or an organic light emitting diode. The touchpad 304-1 may cover the display 304-2. After detecting a touch event on or near the touchpad 304-1, the touchpad 304-1 transmits the touch event to the processor 301, to determine a type of the touch event. Then, the processor 301 may provide a corresponding visual output on the display 304-2 based on the type of the touch event.

It should be noted that, although the touchpad 304-1 and the display interface 304-2 are used as two independent components to implement input and output functions of the mobile phone 300 in FIG. 3, the touchpad 304-1 and the display interface 304-2 may be integrated to implement the input and output functions of the mobile phone 300 in some embodiments. It may be understood that the touchinterface 304 is formed by stacking a plurality of layers of materials. In this embodiment of this application, only the touchpad (layer) and the display interface (layer) are displayed, and another layer is not recorded. In addition, the touchpad 304-1 may be disposed on the front facet of the mobile phone 300 in a full panel form, and the display interface 304-2 may also be disposed on the front facet of the mobile phone 300 in a full panel form. In this way, a bezel-less structure on the front facet of the mobile phone can be implemented.

In addition, the mobile phone 300 may further have a fingerprint recognition function. For example, a fingerprint collection device (that is, a fingerprint recognizer) 312 may be disposed on the back facet of the mobile phone 300 (for example, below a rear-facing camera), or a fingerprint collection device 312 may be disposed on the front facet of the mobile phone 300 (for example, below the touchinterface 304). For another example, a fingerprint collection device 312 may be disposed on the touchinterface 304 to implement the fingerprint recognition function. In other words, the fingerprint collection device 312 and the touchinterface 304 may be integrated to implement the fingerprint recognition function of the mobile phone 300. In this case, the fingerprint collection device 312 is disposed on the touchinterface 304, and may be a part of the touchinterface 304. The fingerprint collection device 312 may alternatively be disposed on the touchinterface 304 in another manner. A main component of the fingerprint collection device 312 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, and the like.

The mobile phone 300 may further include the Bluetooth apparatus 305, configured to implement data exchange between the mobile phone 300 and another short-range device (for example, a mobile phone or a smartwatch). In this embodiment of this application, the Bluetooth apparatus may be an integrated circuit, a Bluetooth chip, or the like.

The one or more sensors 306 include a sensor configured to detect a press operation performed by the user on a side edge and a slide operation performed by the user on the side edge.

Certainly, the one or more sensors 306 include but are not limited to the foregoing sensor. For example, the one or more sensors 306 may further include an optical sensor, a motion sensor, and another sensor. Specifically, the optical sensor may include an ambient light sensor and a proximity sensor. The ambient light sensor may adjust luminance of the display of the touchinterface 304 based on ambient light luminance. The proximity sensor may power off the display when the mobile phone 300 approaches ears. As one of motion sensors, an accelerometer sensor may detect a magnitude of acceleration in each direction (usually, in three axes), may detect a magnitude and a direction of gravity when the accelerometer sensor is stationary, and may be used in an application for identifying a posture of the mobile phone (for example, interface switching between a landscape mode and a portrait mode, a related game, and magnetometer posture calibration), a vibration identification-related function (for example, a pedometer or a knock), and the like. Other sensors such as a gyroscope, a barometer, a hygrometer, a thermometer, and an infrared sensor may be further disposed on the mobile phone 300. Details are not described herein.

The WiFi apparatus 307 is configured to provide network access complying with a WiFi-related standard protocol for the mobile phone 300. The mobile phone 300 may access a WiFi hotspot by using the WiFi apparatus 307, to further help the user to receive and send an e-mail, browse a web page, access streaming media, and the like. The WiFi apparatus 307 provides wireless broadband internet access for the user. In some other embodiments, the WiFi apparatus 307 may also be used as a WiFi wireless access point, and may provide WiFi network access for another device.

The positioning apparatus 308 is configured to provide a geographic location for the mobile phone 300. It may be understood that the positioning apparatus 308 may be specifically a receiver of a positioning system such as a global positioning system (Global Positioning System, GPS), a BeiDou navigation satellite system, or a Russian GLONASS.

After receiving the geographic location sent by the foregoing positioning system, the positioning apparatus 308 sends the information to the processor 301 for processing, or sends the information to the memory 303 for storage. In some other embodiments, the positioning apparatus 308 may alternatively be a receiver of an assisted global positioning system (Assisted Global Positioning System, AGPS). The AGPS system serving as an assisted server assists the positioning apparatus 308 in completing ranging and positioning services. In this case, the assisted positioning server communicates with the positioning apparatus 308 (that is, the receiver of the GPS) of a device such as the mobile phone 300 by using a wireless communications network, to provide positioning assistance.

In some other embodiments, the positioning apparatus 308 may alternatively be a positioning technology based on a WiFi hotspot. Because each WiFi hotspot has a globally unique media access control (Media Access Control, MAC) address, a device may scan and collect broadcast signals from surrounding WiFi hotspots when WiFi is enabled, and therefore may obtain MAC addresses that are broadcast by the WiFi hotspots. The device sends data (for example, the MAC addresses) that can identify the WiFi hotspots to a location server by using a wireless communications network, and the location server obtains a geographic location of each WiFi hotspot through retrieval, obtains a geographic location of the device through calculation with reference to strength of the WiFi broadcast signals, and sends the geographic location to the positioning apparatus 308 of the device.

The audio circuit 309, a speaker 313, and a microphone 314 may provide an audio interface between the user and the mobile phone 300. The audio circuit 309 may convert received audio data into an electrical signal and transmit the electrical signal to the speaker 313, and the speaker 313 converts the electrical signal into a sound signal for output. In addition, the microphone 314 converts a collected sound signal into an electrical signal, and the audio circuit 309 receives the electrical signal, converts the electrical signal into audio data, and outputs the audio data to the RF circuit 302, to send the audio data to, for example, another mobile phone, or outputs the audio data to the memory 303 for further processing.

The peripheral interface 310 is configured to provide various interfaces for an external input/output device (for example, a keyboard, a mouse, an external display, an external memory, or a subscriber identity module card). For example, the mobile phone 300 is connected to the mouse by using a universal serial bus (Universal Serial Bus, USB) interface, and is connected to a subscriber identity module (Subscriber Identification Module, SIM) card provided by a telecommunications operator, by using a metal contact on a card slot of the subscriber identity module card. The peripheral interface 310 may be configured to couple the external input/output peripheral device to the processor 301 and the memory 303.

In this embodiment of the present invention, the mobile phone 300 may communicate with another device in a device group by using the peripheral interface 310, for example, may receive, by using the peripheral interface 310, to-be-displayed data sent by another device for display. This is not limited in this embodiment of the present invention.

The mobile phone 300 may further include the power supply apparatus 311 (for example, a battery or a power management chip) configured to supply power to the components. The battery may be logically connected to the processor 301 by using the power management chip, to implement functions such as charging and discharging management and power consumption management by using the power supply apparatus 311.

The mobile phone 300 may further include a camera (a front-facing camera and/or a rear-facing camera), a flash, a micro projection apparatus, a near field communication (Near Field Communication, NFC) apparatus, and the like, which are not shown in FIG. 3. Details are not described herein.

A method in the following embodiments may be implemented in the mobile phone 300 having the foregoing hardware structure.

Figure 4:
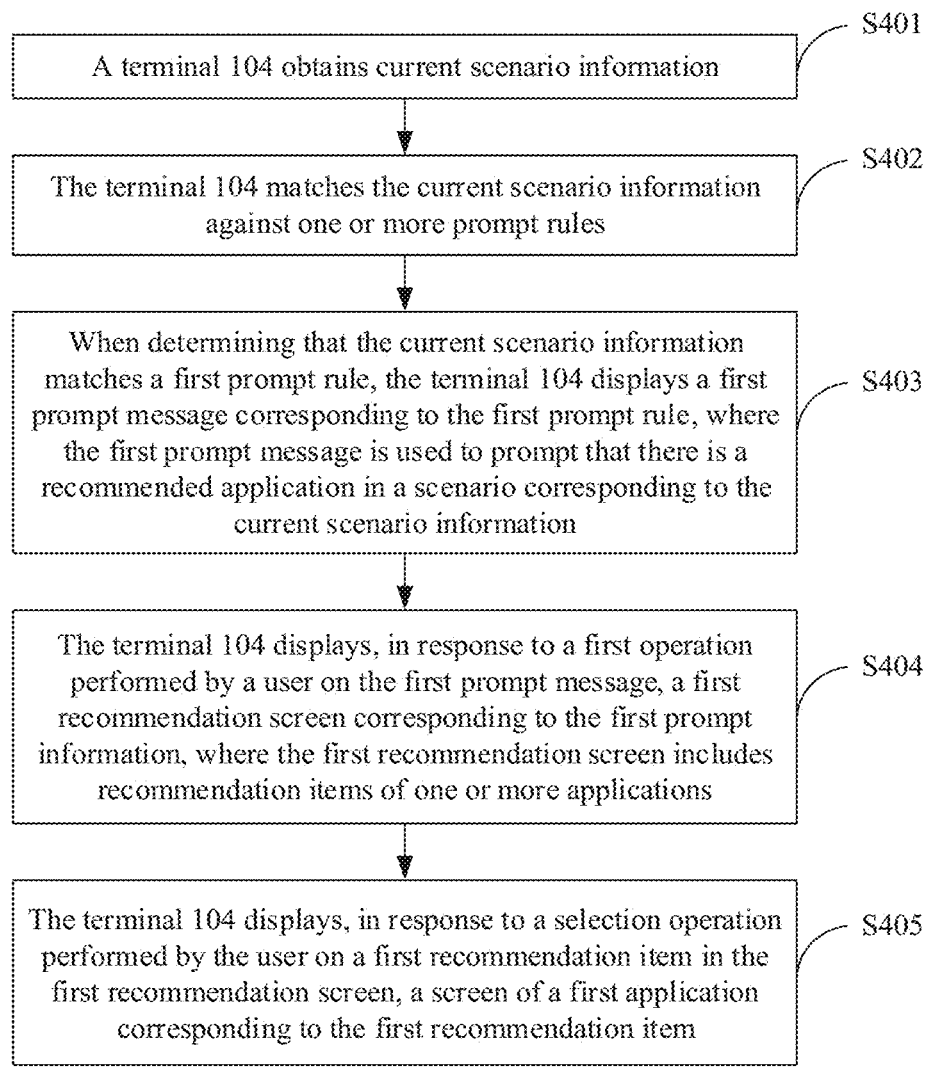
FIG. 4 is a flowchart 1 of a scenario-based application recommendation method according to an embodiment of this application.

An embodiment of this application provides a scenario-based application recommendation method. As shown in FIG. 4, the method includes S401 to S405.

S401. The terminal 104 obtains current scenario information.

The current scenario information includes at least one of time information, address information, and a change of the address information.

S402. The terminal 104 matches the current scenario information against one or more prompt rules.

The terminal 104 stores the one or more prompt rules 203, and each prompt rule corresponds to one scenario package. In other words, the terminal 104 stores prompt rules 203 of one or more scenario packages. The prompt rule 203 stored in the terminal 104 is sent by the scenario package management device 102 or the policy management device 103 (that is, the network device) to the terminal 104.

The prompt rule in this embodiment of this application is a condition on which the terminal 104 recommends a scenario package (that is, an application in the scenario package) to a user. The terminal 104 may obtain the current scenario information of the terminal 104 in real time, and match the current scenario information against the prompt rules 203 of the scenario packages that are stored in the terminal 104. When the current scenario information matches a prompt rule of a scenario package, the terminal 104 may recommend the scenario package to the user.

S403. When determining that the current scenario information matches a first prompt rule, the terminal 104 displays a first prompt message corresponding to the first prompt rule, where the first prompt message is used to prompt that there is a recommended application in a scenario corresponding to the current scenario information.

The first prompt rule is one of the one or more prompt rules. It may be understood that, because the first prompt rule matches the current scenario information, and the first prompt rule corresponds to the first prompt message, the first prompt message may be used to prompt that there is a recommended application in the scenario corresponding to the current scenario information that matches the first prompt rule. In subsequent descriptions of this embodiment of this application, the method in this embodiment of this application is described by using an example in which the first prompt rule is a prompt rule of a first scenario package, and the first prompt message is a prompt message of the first scenario package.

The terminal 104 may display the first prompt message in a preset manner. For example, the preset manner includes a manner such as displaying the first prompt message on a notification bar, displaying the first prompt message on the HiBoard, or displaying the first prompt message on a widget (Widget). Another manner in which the terminal 104 displays the first prompt message is not described in this embodiment of this application.

Figure 5A:
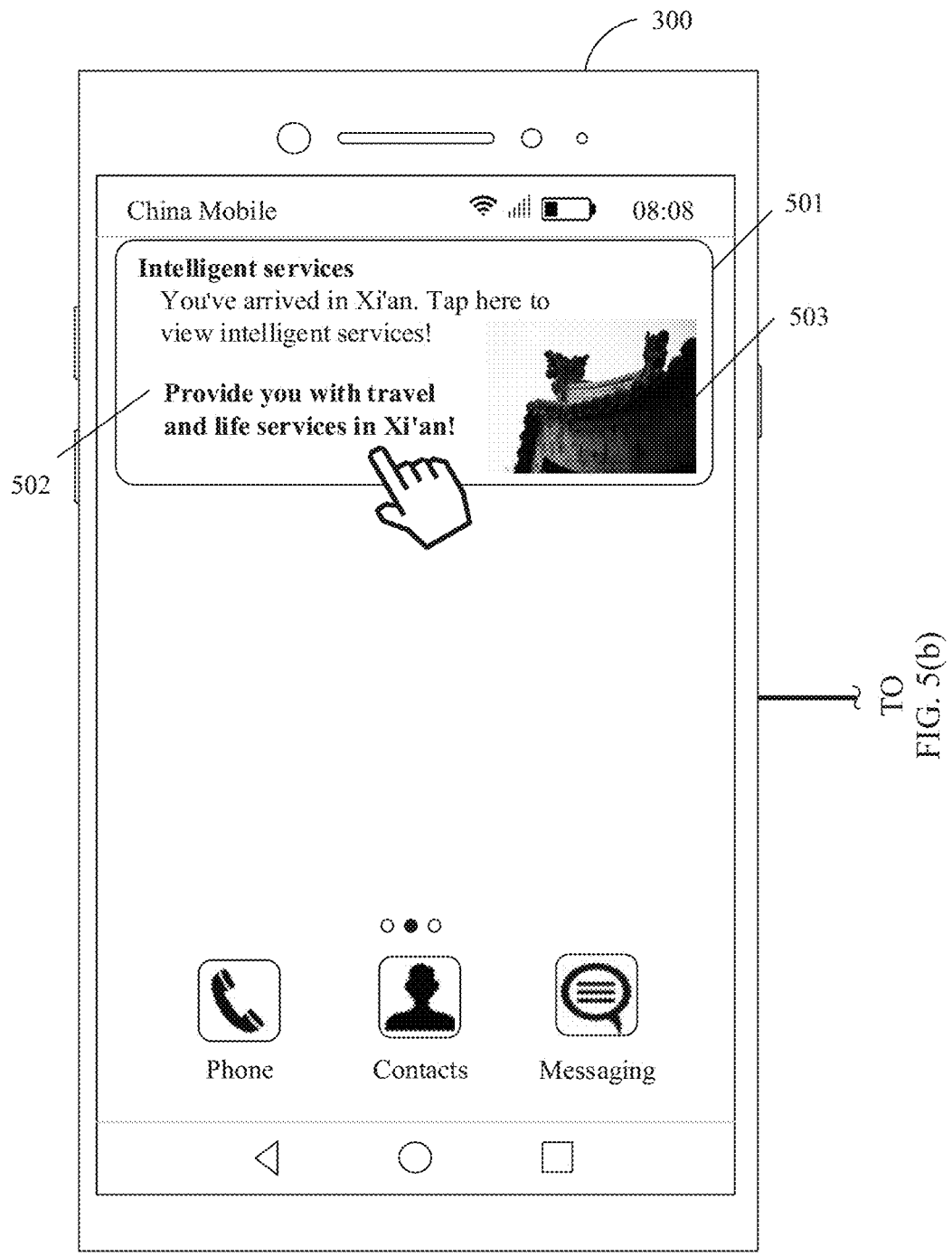
FIG. 5(a), FIG. 5(b), and FIG. 5(c) are a schematic diagram 1 of display interfaces of a terminal according to an embodiment of this application.
Figure 5B:
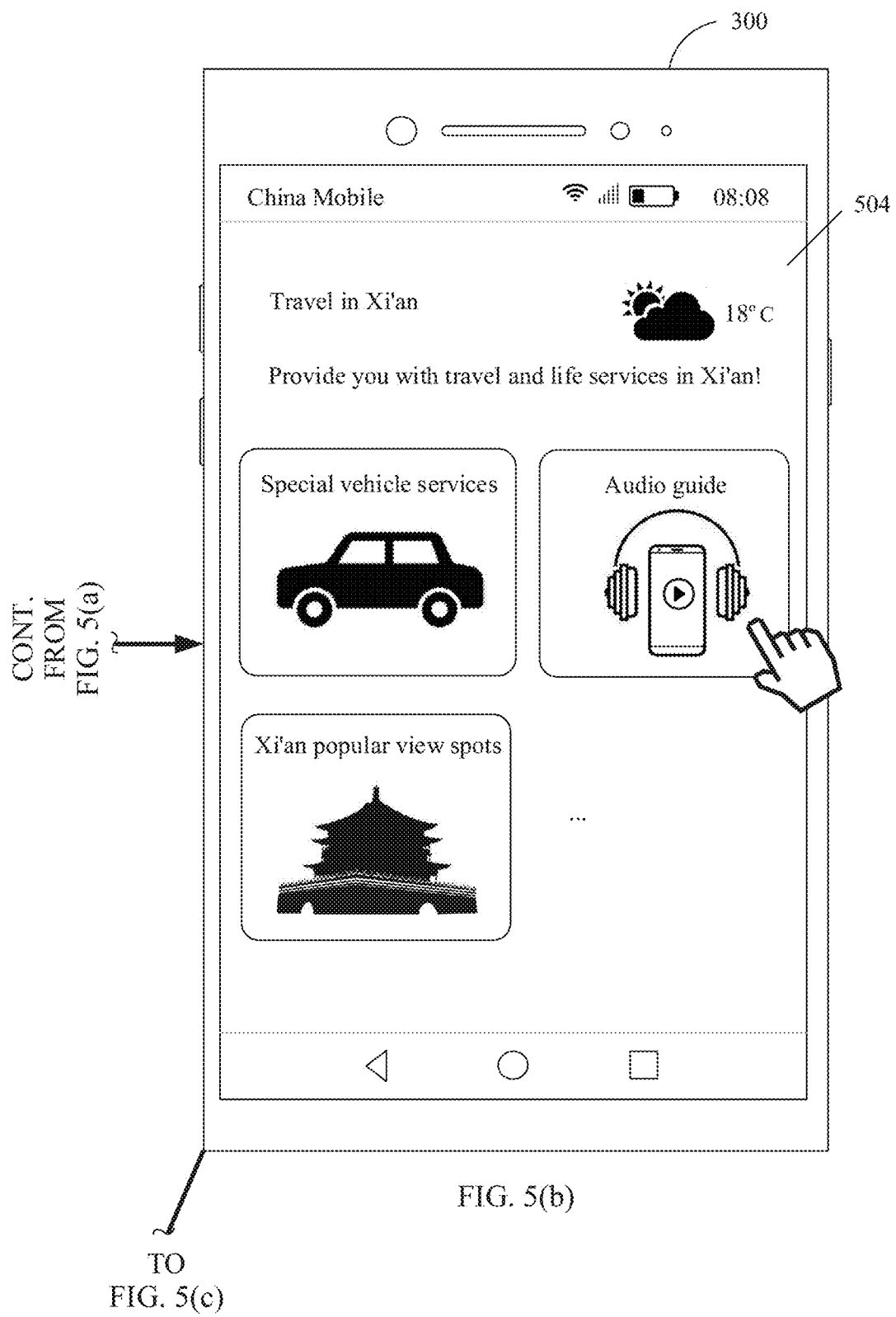
Figure 5C:
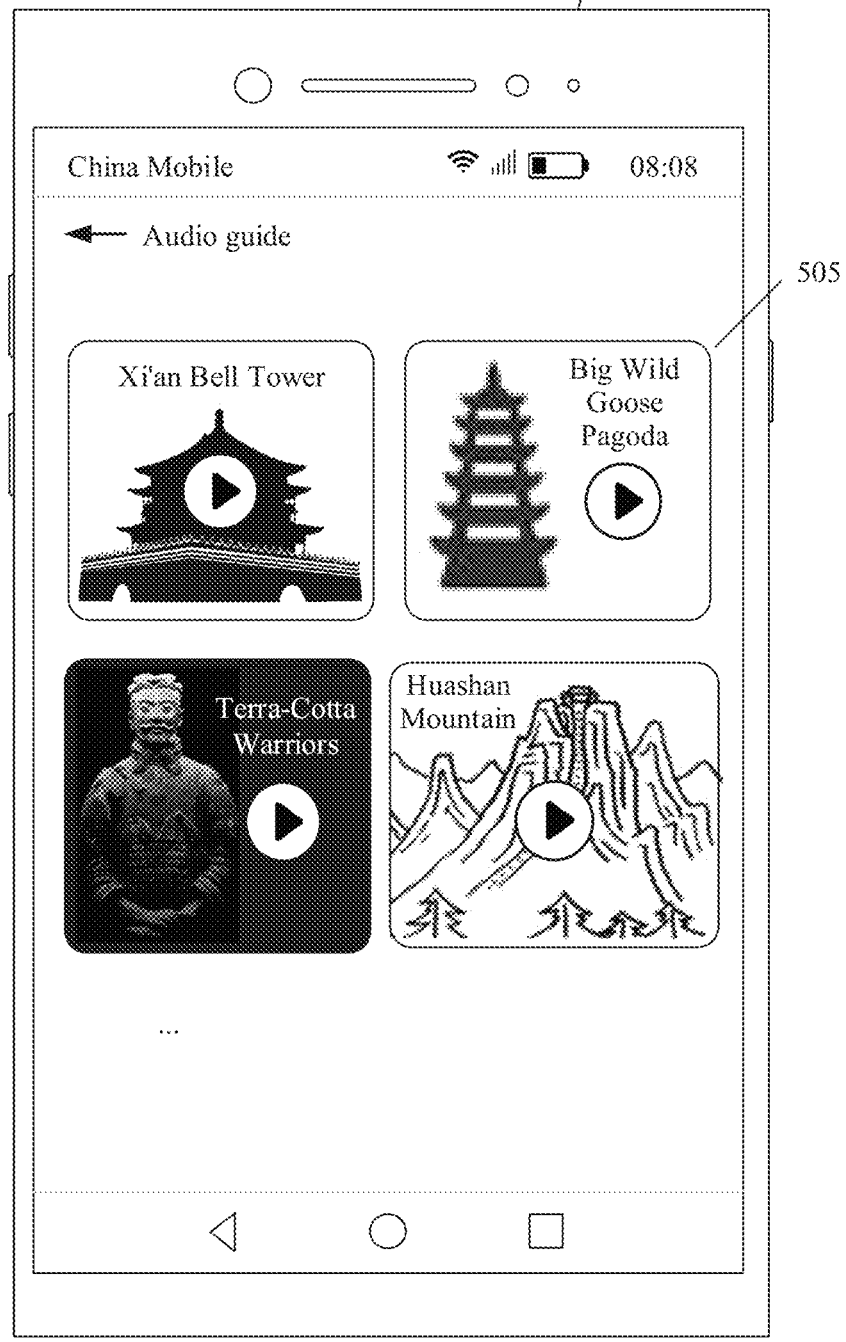

For example, an example in which the mobile phone 300 shown in FIG. 5(a), FIG. 5(b), and FIG. 5(c) is the terminal 104, and the preset manner is "displaying the first prompt message on a notification bar" is used. It is assumed that the current scenario information obtained by the mobile phone 300 is "address information of the mobile phone 300 changes from Shanghai to Xi'an". The first scenario package is a Xi'an travel scenario package, a prompt rule 203 of the Xi'an travel scenario package is "the user holding the terminal 104 moves to Xi'an from another province or city", and applications provided by the Xi'an travel scenario package include "audio guide services", "special vehicle services", "Xi'an popular view spots", and the like.

The current scenario information "address information of the mobile phone 300 changes from Shanghai to Xi'an" matches the prompt rule 203 "the terminal 104 moves Xi'an from another province or city" of the Xi'an travel scenario package. Therefore, as shown in FIG. 5(a), the mobile phone 300 may display a first prompt message 501 of the Xi'an travel scenario package on the notification bar.

In this embodiment of this application, that the first prompt message is used to prompt that there is a recommended application (that is, an application in the first scenario package) in a scenario corresponding to the current scenario information may be specifically: The first prompt message includes an identifier of the first scenario package, and the identifier of the first scenario package may be used to prompt the application in the first scenario package.

Optionally, the first prompt message may further include a title and/or a background image of the first scenario package. The title and/or the background image of the first scenario package may visually improve user perception of the first scenario package more intuitively, to prompt an application in the first scenario package. For example, as shown in FIG. 5(a), the first prompt message 501 of the Xi'an travel scenario package includes a title 502 of the Xi'an travel scenario package: "Provide you with travel and life services in Xi'an!". The first prompt message 501 of the Xi'an travel scenario package further includes a background image 503. In this embodiment of this application, a background image of a scenario package may be a background image related to a service provided by the scenario package. For example, the background image 503 of the Xi'an travel scenario package is an image of an ancient building with Xi'an characteristics.

In this embodiment of this application, a title and a background image of a scenario package, and basic information of the scenario package are collectively referred to as a basic element 201 of the scenario package. The basic information of the scenario package may include an identifier (for example, a name of the scenario package) and version information of the scenario package. The terminal 104 may store prompt rules 203 and basic elements 201 of a plurality of scenario packages, so that when the prompt rule 203 of the first scenario package matches the current scenario information, the prompt message of the first scenario package is displayed, to push the first scenario package. Optionally, the terminal 104 may store only prompt rules 203 of a plurality of scenario packages. A basic element 201 of the first scenario package is obtained by the terminal 104 from the scenario package management device 102 when the prompt rule 203 of the first scenario package matches the current scenario information.

S404. The terminal 104 displays, in response to a first operation performed by a user on the first prompt message, a first recommendation interface corresponding to the first prompt information, where the first recommendation interface includes recommendation items of one or more applications.

The first operation may be a tap (for example, single-tap, double-tap, or touch-and-hold) operation performed by the user on the prompt message. When the user performs the first operation on the first prompt message, it indicates that the user needs to view an application prompted by the first prompt message. In this case, the terminal 104 may display the first recommendation interface in response to the first operation. In this embodiment of this application, a recommendation item in a recommendation interface (for example, the first recommendation interface) is a magnetic sticker or a card.

Specifically, in this embodiment of this application, in response to the first operation, the terminal 104 may obtain a first UI element (that is, a UI element of the first scenario package) and a first interface file (that is, an interface file of the first scenario package) from the scenario package management device 102, and then run the first interface file to invoke the first UI element to display the first recommendation interface that includes a magnetic sticker or a card of the application prompted by the first prompt message. The application prompted by the first prompt message is an application in the first scenario package. Correspondingly, the first recommendation interface includes a recommendation item of the application in the first scenario package.

Referring to FIG. 5(a), FIG. 5(b), and FIG. 5(c), when the user taps the first prompt message 501 shown in FIG. 5(a), the mobile phone 300 displays, in response to the tap operation performed by the user on the first prompt message 501, a first recommendation interface 504 shown in FIG. 5(b). The first recommendation interface 504 shown in FIG. 5(b) includes recommendation items of the foregoing applications such as "audio guide services", "special vehicle services", and "Xi'an popular view spots".

It should be noted that a client of an APP corresponding to a service provided by the first scenario package does not need to be installed in the terminal 104 (for example, the mobile phone 300) in this embodiment of this application. For example, clients of APPs corresponding to "audio guide services", "special vehicle services", and "Xi'an popular view spots" are not installed in the mobile phone 300.

In this embodiment of this application, a recommendation item of an application may not only be used to identify the application, but also may be used as an entry of the application. The terminal 104 may provide, for the user in response to an operation performed by the user on the recommendation item of the application, a service corresponding to the application.

S405. The terminal 104 displays, in response to a selection operation performed by the user on a first recommendation item in the first recommendation interface, an interface of a first application corresponding to the first recommendation item.

In response to the selection operation performed by the user on the first recommendation item in the first recommendation interface, the terminal 104 may run an application file of the first application to display the interface of the first application. When the first application is a web page application, the application file of the first application is a web page file such as a hypertext markup language (Hyper Text Markup Language, HTML) file. When the first application is a JS application, the application file of the first application is a JavaScript file. The terminal 104 may obtain the application file of the first application from the service management device 101 in response to the selection operation performed by the user on the first recommendation item. The service management device 101 may store application files of a plurality of applications.

Optionally, in response to the selection operation performed by the user on the first recommendation item, the terminal 104 may determine whether the terminal 104 stores the application file of the first application. When the terminal 104 does not store the application file of the first application, the terminal 104 obtains the application file of the first application from the service management device 101. When the terminal 104 stores the application file of the first application, the terminal 104 may directly run the application file of the first application that is stored in the terminal 104. The application file of the first application that is stored in the terminal 104 is obtained by the terminal 104 from the service management device 101.

Referring to FIG. 5(a), FIG. 5(b), and FIG. 5(c), when the user taps the first recommendation item "audio guide" shown in FIG. 5(b), the mobile phone 300 displays, in response to the selection operation performed by the user on the first recommendation item "audio guide", an interface 505 of the application "audio guide" that is shown in FIG. 5(c). The interface 505 of "audio guide" includes audio guide service items of a plurality of tourist view spots (for example, "Xi'an Bell Tower", "Big Wild Goose Pagoda", "Terra-Cotta Warriors", and "Huashan Mountain") in Xi'an.

Figure 6A:
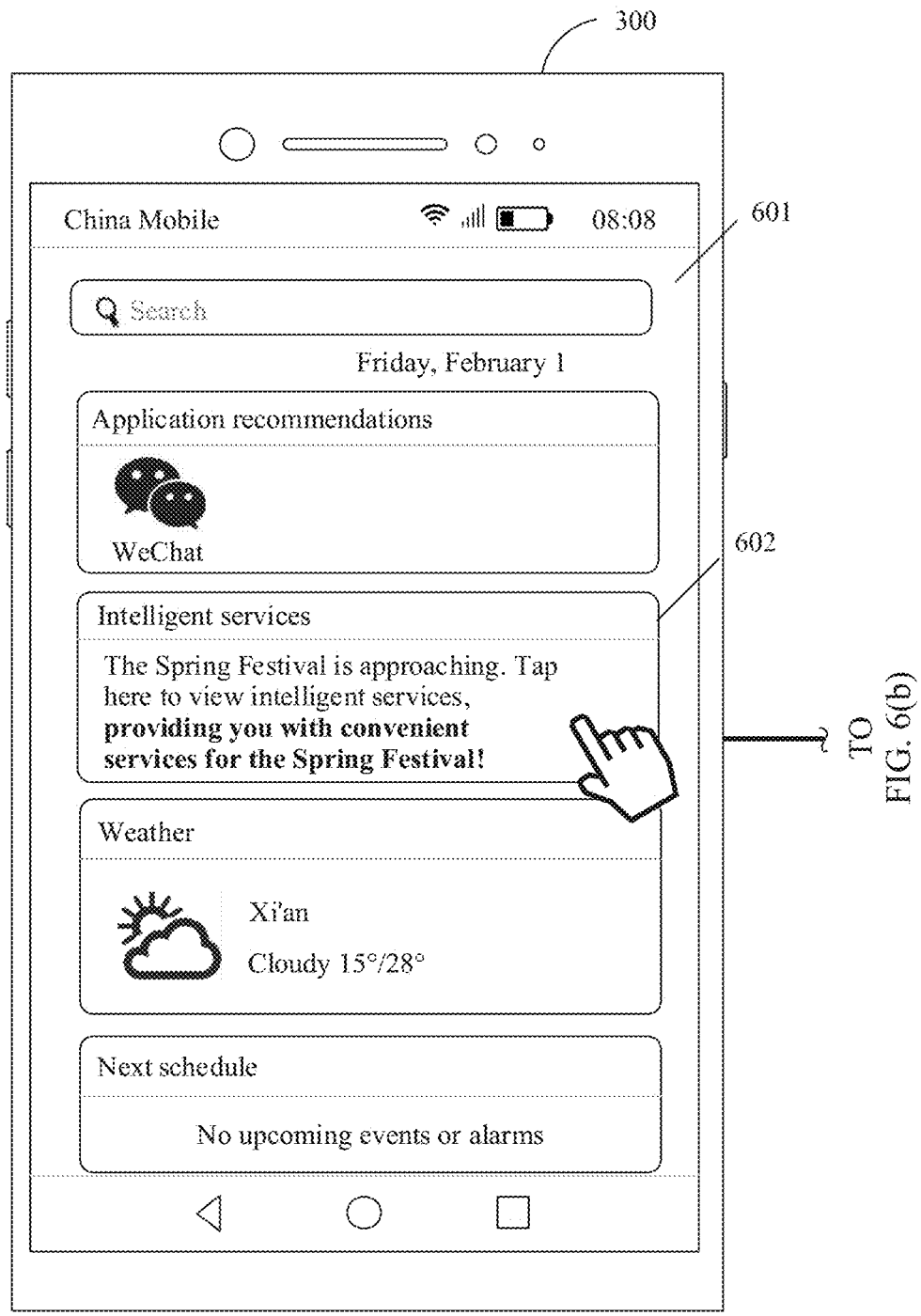
FIG. 6(a), FIG. 6(b), and FIG. 6(c) are a schematic diagram 2 of display interfaces of a terminal according to an embodiment of this application.
Figure 6B:
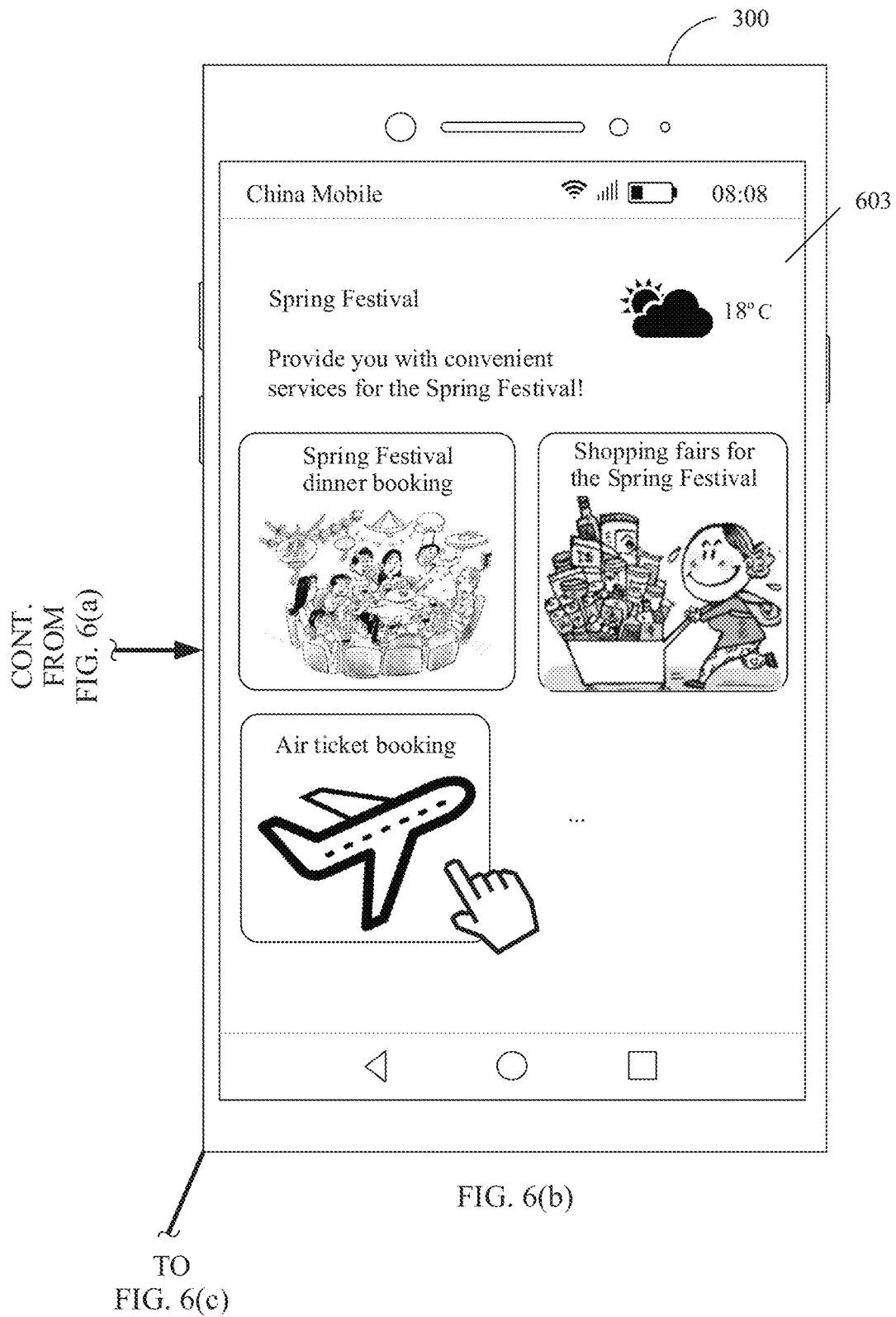
Figure 6C:
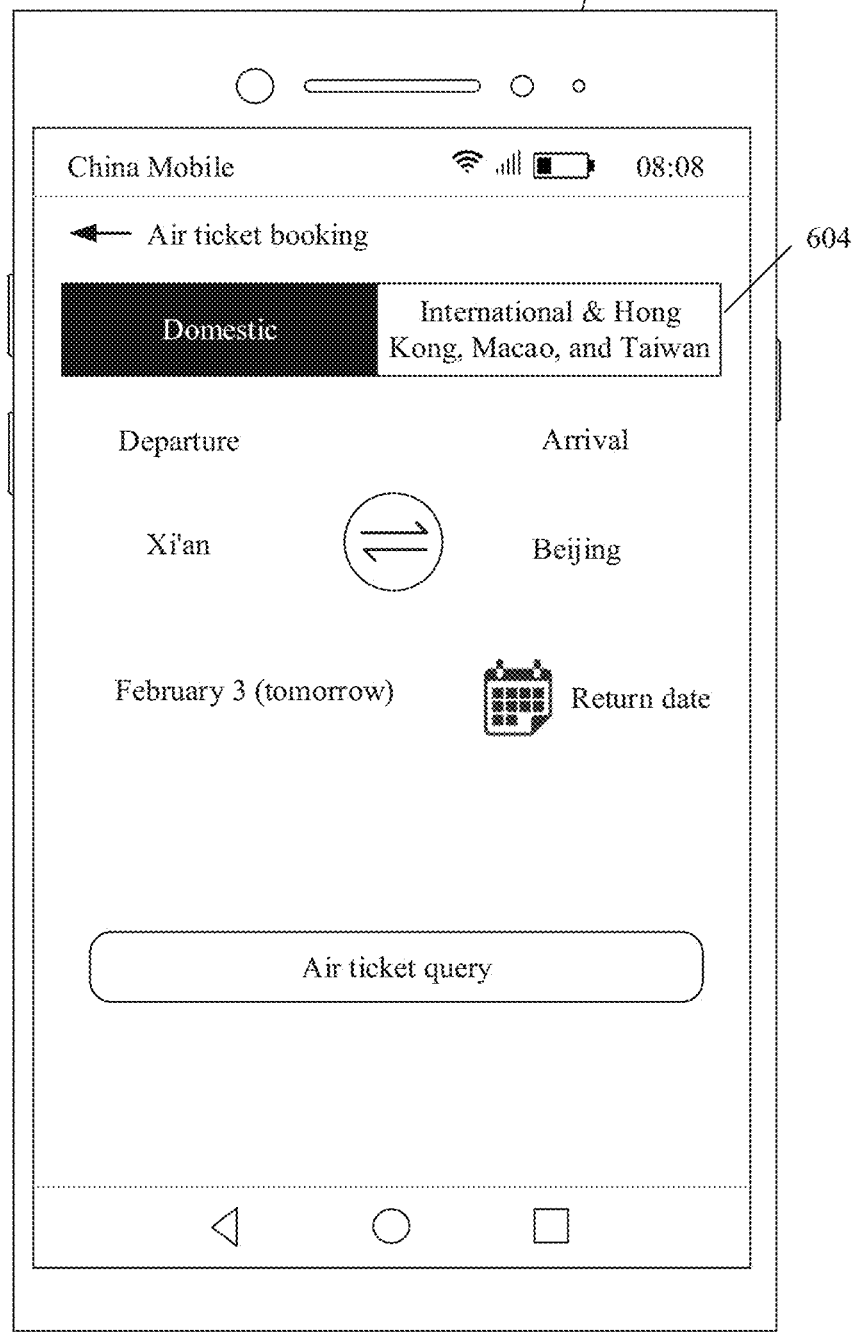

For example, an example in which the mobile phone 300 shown in FIG. 6(a), FIG. 6(b), and FIG. 6(c) is the terminal 104, and the preset manner is "displaying the first prompt message on the HiBoard" is used. It is assumed that the current scenario information obtained by the mobile phone 300 is "Feb. 1, 2018". The first scenario package is a Spring Festival scenario package, the first prompt rule is "Feb. 1 to Feb. 14", and applications provided by the Spring Festival scenario package include "Spring Festival dinner booking", "shopping fairs for the Spring Festival", "air ticket booking", and the like.

The current scenario information "Feb. 1, 2018" matches the first prompt rule 203 "Feb. 1 to Feb. 14". Therefore, as shown in FIG. 6(a), the mobile phone 300 may display a first prompt message 602 of the Spring Festival scenario package on the HiBoard 601. The first prompt message 602 includes a title of the Spring Festival scenario package "Provide you with convenient services for the Spring Festival!".

When the user taps the first prompt message 602 shown in FIG. 6(a), the mobile phone 300 displays, in response to the tap operation performed by the user on the first prompt message 602, a first recommendation interface 603 shown in FIG. 6(b). The first recommendation interface 603 shown in FIG. 6(b) includes recommendation items of the foregoing applications such as "Spring Festival dinner booking", "shopping fairs for the Spring Festival", and "air ticket booking". When the user taps the recommendation item "air ticket booking" shown in FIG. 6(b), the mobile phone 300 displays, in response to the selection operation performed by the user on the first recommendation item "air ticket booking", an interface 604 of "air ticket booking" that is shown in FIG. 6(c). Clients of APPs corresponding to "Spring Festival dinner booking", "shopping fairs for the Spring Festival", and "air ticket booking" are not installed in the mobile phone 300.

According to the scenario-based application recommendation method provided in this embodiment of this application, the terminal 104 may obtain the current scenario information, and when the first prompt rule matches the current scenario information, display the first prompt message corresponding to the first prompt rule, to prompt that there is a recommended application in the scenario corresponding to the current scenario information. Because the current scenario information may reflect a current status of the user, it is prompted that the application recommended in the scenario corresponding to the current scenario information may meet a current requirement of the user. It can be learned that, by using the method in this embodiment of this application, a degree of matching between a service recommended by the terminal to the user and a user requirement can be improved.

In addition, in response to the selection operation performed by the user on the first recommendation item in the first recommendation interface, the terminal 104 may directly display the interface of the first application corresponding to the first recommendation item. In other words, an application recommended by the terminal 104 may provide a tap-to-use direct service for the user, and there is no need to download and install a client of the APP for the terminal 104. Therefore, according to the method in this embodiment of this application, a user operation in a process of providing a service for the user by the terminal 104 can be simplified, and a case in which memory of the terminal 104 is occupied when the client of the APP is downloaded for the terminal 104 can be avoided. In conclusion, according to the method in this embodiment of this application, human-computer interaction performance of the terminal 104 can be improved, so as to improve user experience.

Figure 7A:
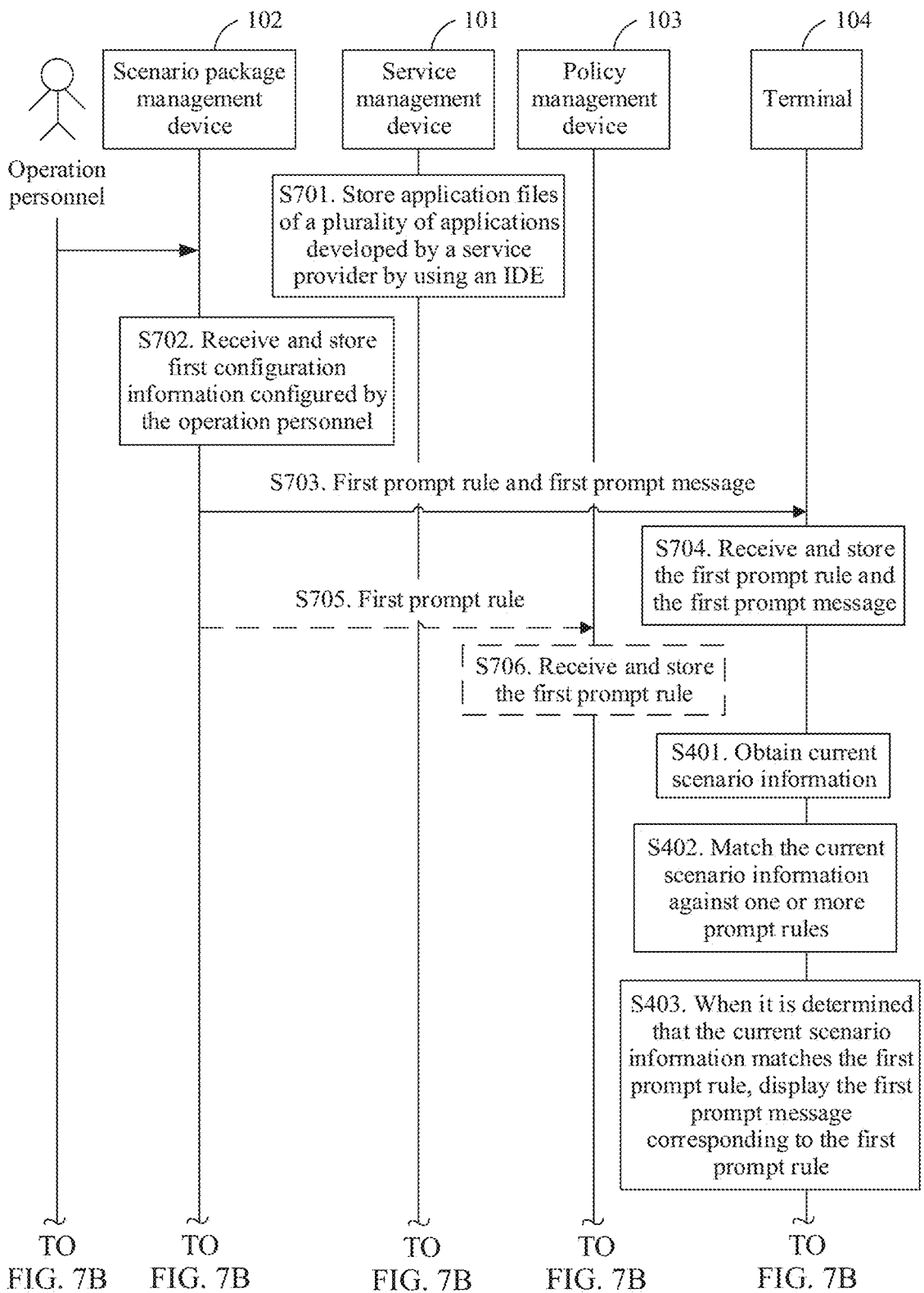
FIG. 7A and FIG. 7B are a flowchart 2 of a scenario-based application recommendation method according to an embodiment of this application.
Figure 7B:
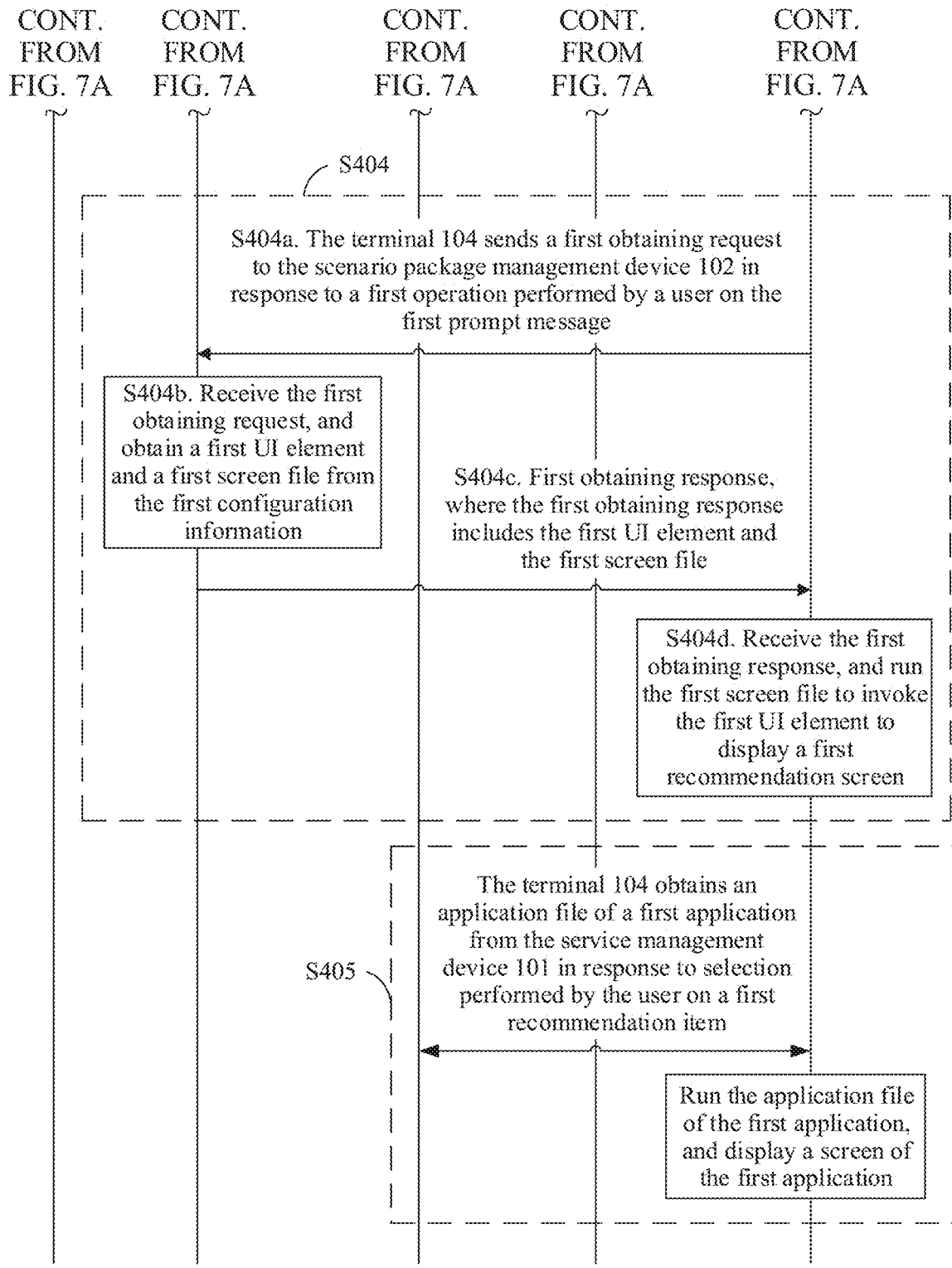

It may be understood that, to help the terminal 104 perform S401 to S405 to recommend a scenario package to the user, the scenario package management device 102 may pre-receive configuration information configured by operation personnel for the first scenario package, and the service management device 101 may pre-store application files of a plurality of applications developed by a service provider by using an IDE. Specifically, as shown in FIG. 7A and FIG. 7B, before S401 to S405, the method in this embodiment of this application may further include S701 to S704.

S701. The service management device 101 stores application files of a plurality of applications developed by a service provider by using an IDE.

The service management device 101 may provide one IDE for service providers, so that all the service providers can develop applications in the IDE. The plurality of applications include an application in a first scenario package.

S702. The scenario package management device 102 receives and stores first configuration information configured by operation personnel.

The first configuration information is configuration information of the first scenario package. For example, the first configuration information includes a first prompt rule, a first interface file, and a first UI element. Before the first scenario package goes online, the scenario package management device 102 may receive and store, in response to a configuration operation performed by the operation personnel, the configuration information of the first scenario package that is entered by the operation personnel.

As shown in FIG. 2, configuration information 200 of a scenario package may include a basic element 201 of the scenario package, a service list 202 of the scenario package, a prompt rule 203 of the scenario package, a UI element 204 of the scenario package, and an interface file 205 of the scenario package. For specific content and functions of each piece of information in the configuration information of the scenario package, refer to the descriptions of FIG. 2 in the embodiments of this application. Details are not described again in this embodiment of this application.

A basic element 201 and a prompt rule 203 of the first scenario package may be set by the operation personnel. A service list 202 of the first scenario package may be actively generated by the scenario package management device 102 in response to a selection operation performed by a user on an application in the service management device 101. A UI element 204 of the first scenario package is obtained by the scenario package management device 102 from the service management device 101, and the UI element 204 includes an interface element such as a card or a magnetic sticker of a recommendation item of an application selected by the user. A card or a magnetic sticker of an application includes a theme image and/or a theme text of the application. An interface file 205 of the first scenario package may be a program file developed by development personnel in advance, and the interface file 2055 is used to invoke the UI element 204 to present a recommendation interface. The recommendation interface includes a recommendation item (for example, a magnetic sticker or a card) of each application in a first scenario.

S703. The scenario package management device 102 sends a first prompt rule and a first prompt message to the terminal 104.

That the scenario package management device 102 sends a first prompt message to the terminal 104 may be specifically: The scenario package management device 102 sends the basic element 201 of the first scenario package to the terminal 104. It can be learned from the foregoing embodiment that the first prompt message displayed by the terminal 104 includes the basic element 201 of the first scenario package.

S704. The terminal 104 receives and stores the first prompt rule and the first prompt message that are sent by the scenario package management device 102.

After receiving the configuration information of the first scenario package that is entered by the operation personnel, the scenario package management device 102 may send the prompt rule 203 and the basic element 201 of the first scenario package to the terminal 104, so that the terminal 104 can recommend the first scenario package to the user when the first prompt rule matches current scenario information. In an embodiment of this application, that the terminal 104 recommends the first scenario package to the user is specifically: The terminal 104 displays the first prompt message.

Optionally, after S702, the scenario package management device 102 may send the first prompt rule, that is, the prompt rule of the first scenario package, to the policy management device 103, so that the policy management device 103 can manage all prompt rules of a plurality of scenario packages. As shown in FIG. 7A and FIG. 7B, after S702, the method in this embodiment of this application may further include S705 and S706.

S705. The scenario package management device 102 sends the first prompt rule to the policy management device 103.

S706. The policy management device 103 receives and stores the first prompt rule sent by the scenario package management device 102.

When sending the first prompt rule to the policy management device 103, the scenario package management device 102 may further send an identifier of the first scenario package to the policy management device 103, so that the policy management device 103 stores a prompt rule of a scenario package based on an identifier of the scenario package.

In this embodiment of this application, the policy management device 103 may store the identifier of the first scenario package and the first prompt rule in a first rule set. The first rule set is used to store a prompt rule of a scenario package based on an identifier of the scenario package. The prompt rule stored in the first rule set is received by the policy management device 103 from the scenario package management device 102.

For example, Table 2 is a table of an example of the first rule set provided in this embodiment of this application.

TABLE 2

| First rule set | |
|---|---|
| Identifier of a scenario package | Prompt rule |
| Identifier of a scenario package 1 | Prompt rule 1 |
| Identifier of a scenario package 2 | Prompt rule 2 |
| ... | ... |
| Identifier of a scenario package n | Prompt rule n |

Optionally, in this embodiment of this application, the scenario package management device 102 may send only the first prompt message or the basic element 201 of the first scenario package to the terminal 104, and the policy management device 103 sends the first prompt rule to the terminal 104 after S706.

Further, the scenario package management device 102 may receive a modification performed by the operation personnel on configuration information of a scenario package, and store modified configuration information of the first scenario package. When a prompt rule 203 of the scenario package is modified, the scenario package management device 102 may send a modified prompt rule to the policy management device 103, and the policy management device 103 updates, with the modified prompt rule, a prompt rule that is in the first rule set and that corresponds to an identifier of a modified scenario package.

Optionally, after S702, the scenario package management device 102 may send both the prompt rule 203 and the basic element 201 of the first scenario package, and a UI element (that is, the first UI element) and an interface file (that is, the first interface file) of the first scenario package to the terminal 104, so that the terminal 104 can directly display, in response to a first operation performed by the user on the first prompt message, a recommendation interface (that is, a first recommendation interface) of the first scenario package based on the first UI element and the first interface file.

However, after the terminal 104 displays the first prompt message, the user does not necessarily perform the first operation on the first prompt message, in other words, the user does not necessarily view the application in the first scenario package. In this case, even if the terminal 104 receives and stores the first UI element and the first interface file that are sent by the scenario package management device 102, the first UI element and the first interface file are not used, but memory of the terminal 104 is occupied instead. Based on this, when receiving the first operation performed by the user on the first prompt message, the terminal 104 may obtain the first UI element and the first interface file from the scenario package management device 102. Specifically, as shown in FIG. 7A and FIG. 7B, S404 may include S404a to S404d.

S404a. The terminal 104 sends a first obtaining request to the scenario package management device 102 in response to the first operation performed by the user on the first prompt message, where the first obtaining request is used to obtain the first interface file and the first UI element.

The first obtaining request may carry the identifier of the first scenario package and first instruction information, and the first instruction information is used to instruct the scenario package management device 102 to send, to the terminal 104, the first UI element and the first interface file of the scenario package corresponding to the identifier carried in the first obtaining request.

S404b. The scenario package management device 102 receives the first obtaining request sent by the terminal 104, and obtains the first UI element and the first interface file from the first configuration information.

S404c. The scenario package management device 102 sends a first obtaining response to the terminal 104, where the first obtaining response includes the first UI element and the first interface file.

Optionally, the scenario package management device 102 may further obtain the service list of the first scenario package from the first configuration information, where the service list includes an identifier of the application in the first scenario package, and identifiers in the service list are in a one-to-one correspondence with interface elements in the first UI element. In other words, each identifier (an identifier of an application) in the service list corresponds to an interface element of the application that is included in the first UI element. Correspondingly, the first obtaining response may further include the service list of the first scenario package.

S404d. The terminal 104 receives the first obtaining response sent by the scenario package management device 102, and runs the first interface file to invoke the first UI element to display the first recommendation interface.

The first recommendation interface includes a recommendation item (for example, a magnetic sticker or a card) of an application prompted by the first prompt message.

It may be understood that the terminal 104 may determine, in response to the first operation, whether the terminal 104 stores the first UI element and the first interface file. When the terminal 104 does not store the first UI element and the first interface file, the terminal 104 sends the first obtaining request to the scenario package management device 102. When the terminal 104 stores the first UI element and the first interface file, the terminal 104 directly runs the first interface file to invoke the first UI element to display the first recommendation interface that includes a magnetic sticker or a card of each application prompted by the first prompt message.

In this embodiment of this application, the terminal 104 obtains the first UI element and the first interface file from the scenario package management device 102 only when receiving the first operation performed by the user on the first prompt message. In this way, the first UI element and the first interface file can be prevented from occupying memory of the terminal 104 when the user does not necessarily view the application prompted by the first prompt message, but the first UI element and the first interface file are prestored.

Figure 8:
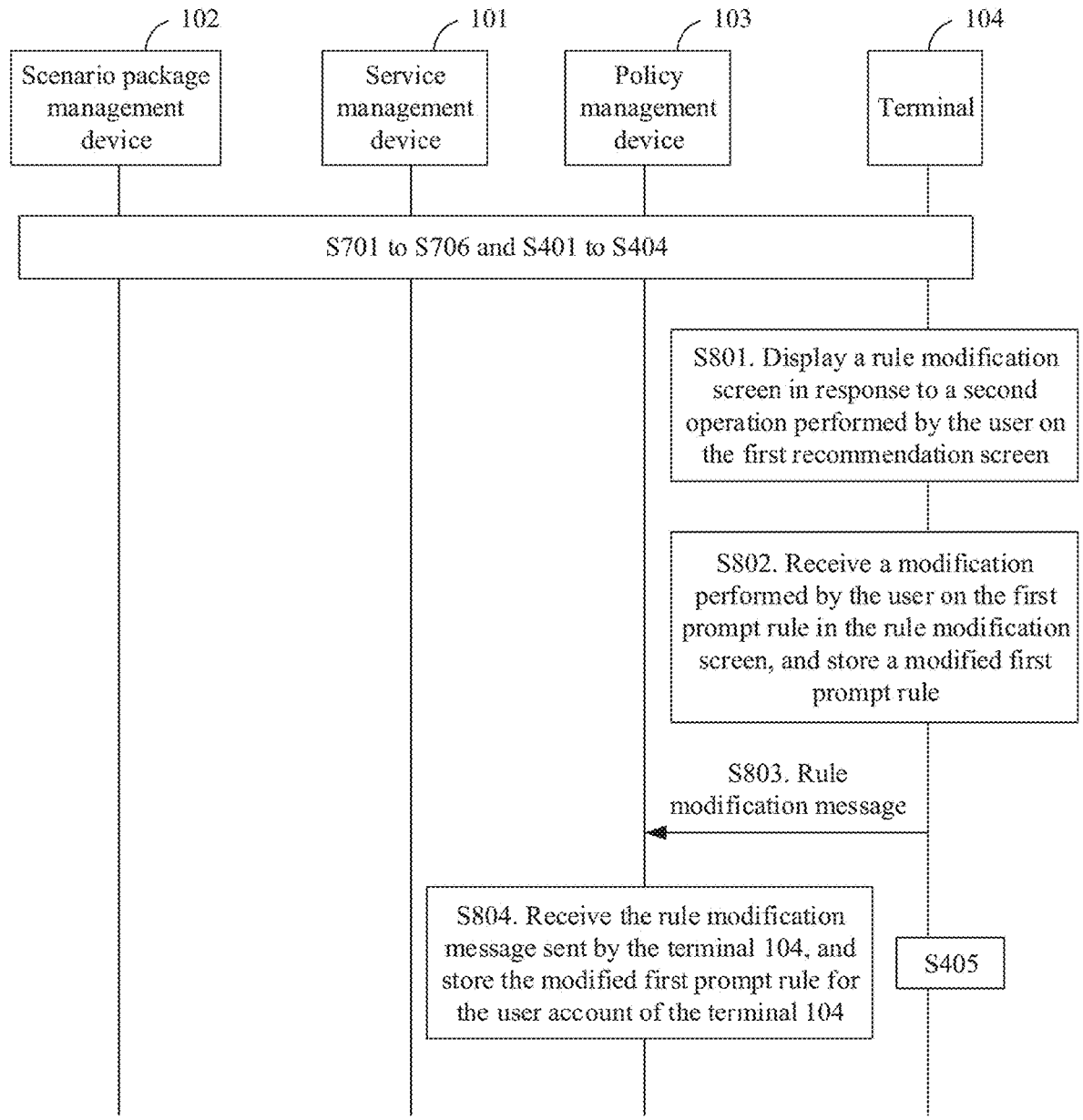
FIG. 8 is a flowchart 3 of a scenario-based application recommendation method according to an embodiment of this application.

Further, after displaying the first recommendation interface (in other words, performing S404), the terminal 104 may further receive a modification performed by the user on the first prompt rule, so that the first scenario package can be recommended to the user based on a modified first prompt rule, thereby improving a degree of matching between an occasion on which the terminal 104 recommends the first scenario package to the user and a user requirement. As shown in FIG. 8, after S404, the method in this embodiment of this application may further include S801 and S802.

S801. The terminal 104 displays a rule modification interface in response to a second operation performed by the user on the first recommendation interface, where the rule modification interface includes the first prompt rule.

Figures 9A, 9C:
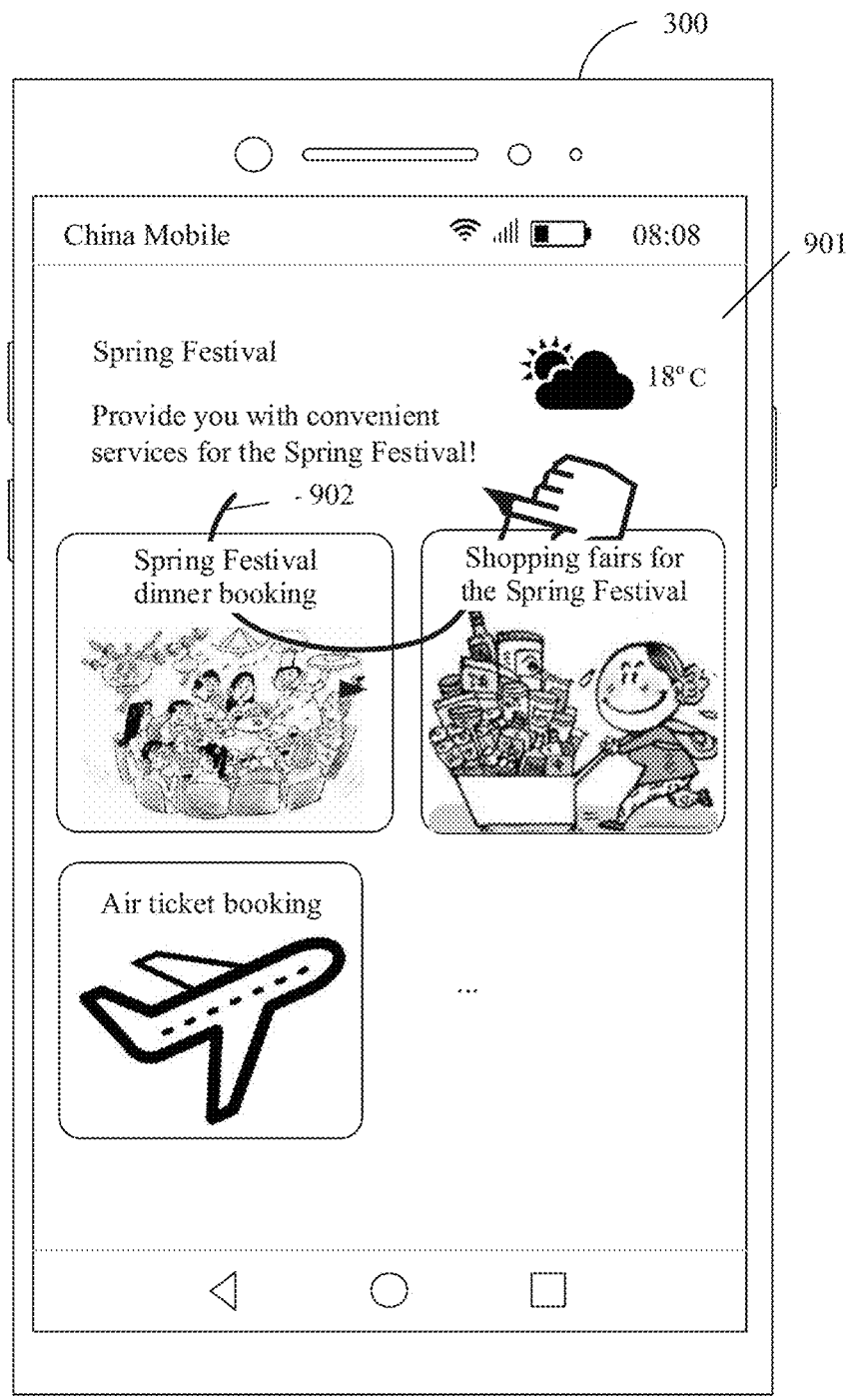
FIG. 9(a), FIG. 9(b), and FIG. 9(c) are a schematic diagram 3 of display interfaces of a terminal according to an embodiment of this application.
Figures 9B, 9C:
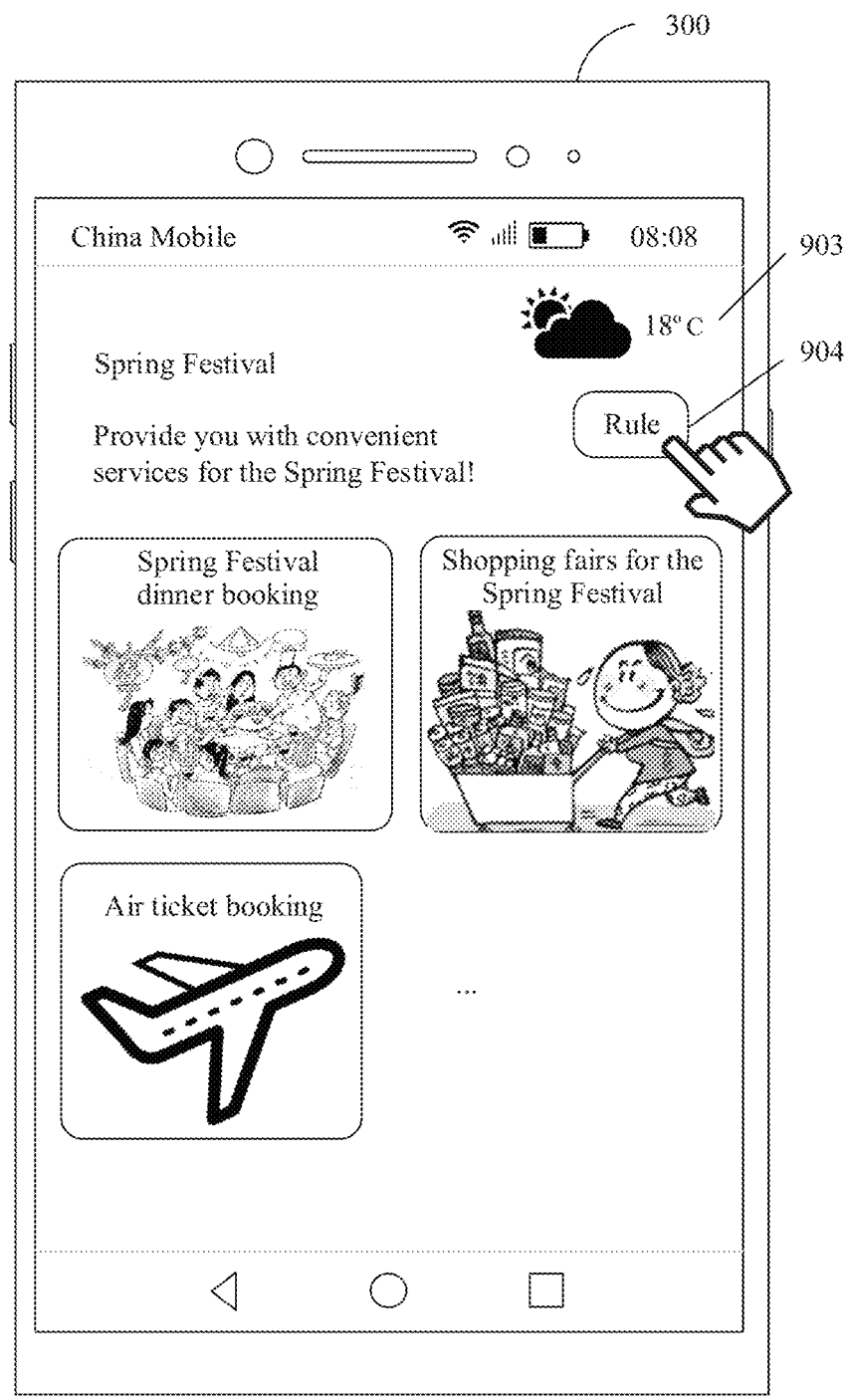
Figure 9C:
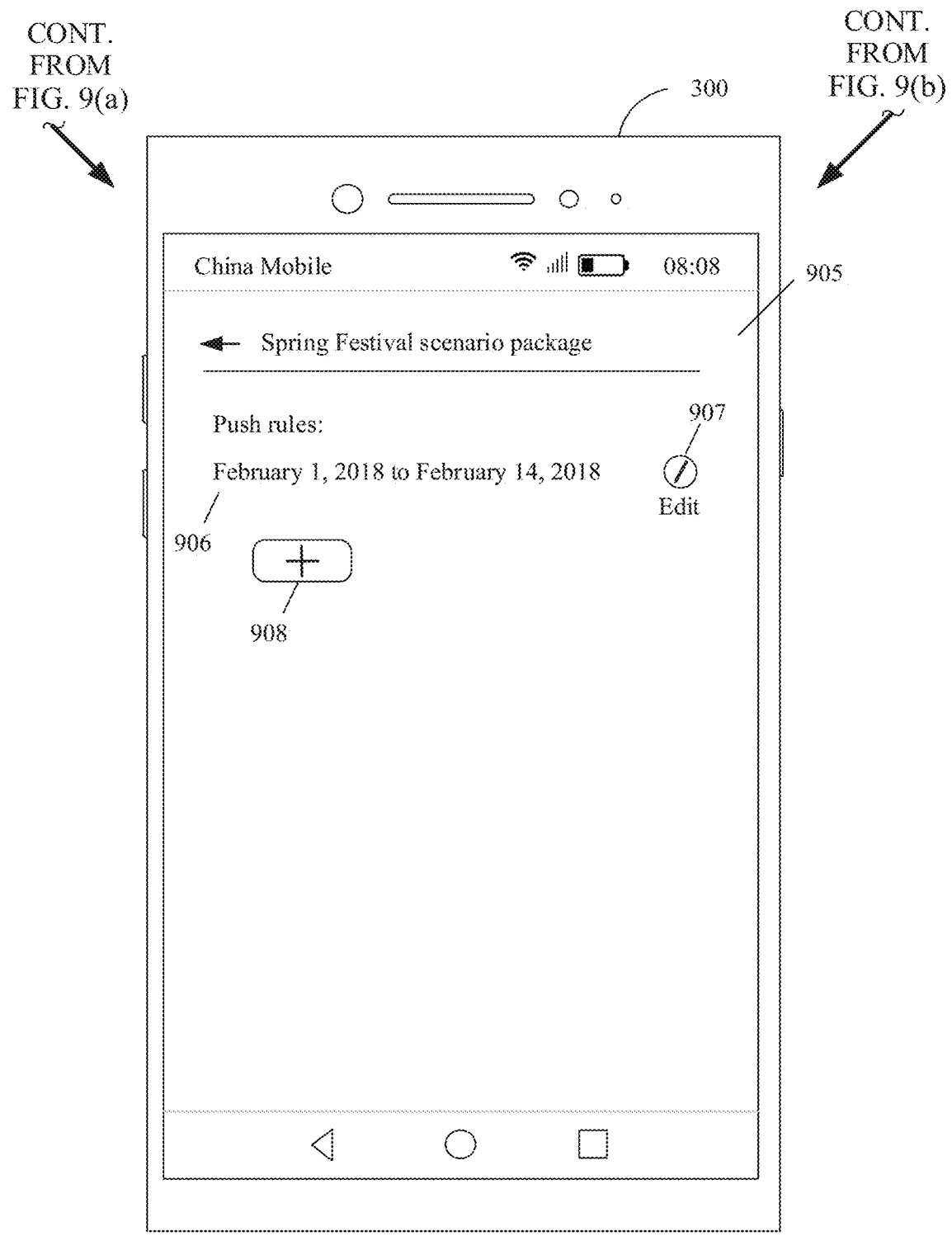

For example, the second operation in this embodiment of this application may be a preset gesture entered by the user in the first recommendation interface. Alternatively, the first recommendation interface includes a rule management item, and the second operation may be a tap (for example, single-tap or double-tap) operation performed by the user on the rule management item. For example, as shown in FIG. 9(a), the second operation may be a semi-circle gesture 902 entered by the user in a first recommendation interface 901 displayed by the mobile phone 300. Alternatively, as shown in FIG. 9(b), the second operation may be a tap operation performed by the user on a rule management item 904 in a first recommendation interface 903.

When the mobile phone 300 receives the semi-circle gesture 902 entered by the user in the first recommendation interface 901 shown in FIG. 9(a), or when the mobile phone 300 receives the tap operation performed by the user on the rule management item 904 in the first recommendation interface 903, the mobile phone 300 may display, in response to the second operation, a rule modification interface 905 shown in FIG. 9(c). It is assumed that the first prompt rule 203 is "Feb. 1, 2018 to Feb. 14, 2018". As shown in FIG. 9(c), the rule modification interface 905 includes a first prompt rule 906 "Feb. 1, 2018 to Feb. 14, 2018", a prompt rule edition button 907, and a prompt rule addition button 908. The prompt rule edition button 907 is used to modify and delete an existing prompt rule, and the prompt rule addition button 908 is used to add a new prompt rule.

S802. The terminal 104 receives a modification performed by the user on the first prompt rule in the rule modification interface, and stores a modified first prompt rule.

For example, the mobile phone 300 may receive a tap operation performed by the user on the addition button 908 shown in FIG. 9(c), to add a new prompt rule "Xi'an" for the Spring Festival scenario package. The mobile phone 300 may update the prompt rule of the Spring Festival scenario package that time information meets "Feb. 1, 2018 to Feb. 14, 2018" to a prompt rule that time information meets "Feb. 1, 2018 to Feb. 14, 2018" and address information meets "Xi'an", or to a prompt rule that time information meets "Feb. 1, 2018 to Feb. 14, 2018" or address information meets "Xi'an".

Both "Feb. 1, 2018 to Feb. 14, 2018" and "Xi'an" are conditions that the current scenario information needs to meet. In other words, the first prompt rule may include a plurality of conditions. When determining whether the current scenario information matches the first prompt rule, the terminal 104 may determine that the current scenario information matches the first prompt rule only when the current scenario information meets all conditions in the first prompt rule. For example, it is assumed that the first prompt rule is "Feb. 1, 2018 to Feb. 14, 2018" and "Xi'an". When the time information meets "Feb. 1, 2018 to Feb. 14, 2018", and the address information meets "Xi'an", the terminal 104 may determine that the current scenario information matches the first prompt rule.

Alternatively, when determining whether the current scenario information matches the first prompt rule, the terminal 104 may determine that the current scenario information matches the first prompt rule when the current scenario information meets any condition in the first prompt rule, even if the current scenario information does not meet another condition in the first prompt rule. For example, it is assumed that the first prompt rule is "Feb. 1, 2018 to Feb. $_{14, 2018}$" and "Xi'an". When the time information meets "Feb. 1, 2018 to Feb. 14, 2018", the terminal 104 may determine that the current scenario information matches the first prompt rule.

In this embodiment of this application, in response to an operation performed by the user, the terminal 104 may not only add a condition to the first prompt rule, but also may modify a condition in the first prompt rule. For example, the terminal 104 may update "Feb. 1, 2018 to Feb. 14, 2018" to "Feb. 1, 2018 to Feb. 10, 2018" in response to the operation performed by the user.

Further, after receiving the modification performed by the user on the first prompt rule in the rule modification interface, the terminal 104 may further send the modified first prompt rule to the policy management device 103, so that the policy management device 103 can also update the first prompt rule. Specifically, after S802, the method in this embodiment of this application may further include S803 and S804.

S803. The terminal 104 sends a rule modification message to the policy management device 103.

The rule modification message is used to instruct the policy management device 103 to store the modified first prompt rule for a user account of the terminal 104.

S804. The policy management device 103 receives the rule modification message sent by the terminal 104, and stores the modified first prompt rule for the user account of the terminal 104.

It may be understood that the policy management device 103 may store the modified first prompt rule, that is, a prompt rule after the first scenario package is modified, for the current user account (for example, a first user account) of the terminal 104. The user account may be a mobile phone number of the terminal 104 or a manufacturer account used by the user to log in to the terminal 104. For example, the manufacturer account may be a Huawei account or a Xiaomi account.

The policy management device 103 may store the prompt rule 203 from the terminal 104 in a second rule set. For example, Table 3 is a table of an example of a second rule set provided in this embodiment of this application.

TABLE 3

| Second rule set | | |
|---|---|---|
| User account | Identifier of a scenario package | Prompt rule |
| User account 1 | Identifier of a scenario package 1 | Prompt rule a |
| User account 2 | Identifier of a scenario package 1 | Prompt rule c |
|  | Identifier of a scenario package 2 | Prompt rule x |
| ... | ... | ... |
| User account 3 | Identifier of a scenario package n | Prompt rule x |

It can be learned from Table 2 that a prompt rule configured by the operation personnel for the scenario package 1 in the scenario package management device 102 is the prompt rule 1. The terminal 104 corresponding to the user account 1 may modify the prompt rule 1 of the scenario package 1 to the prompt rule a, and send the rule modification message that includes the identifier of the scenario package 1 and the prompt rule a to the policy management device 103. After receiving the rule modification message, as shown in Table 3, the policy management device 103 may store the modified prompt rule a of the scenario package 1 in the second rule set for the account 1.

Each user may modify a prompt rule of a scenario package in the terminal 104, and different users may modify a prompt rule of a same scenario package to different prompt rules. For example, as shown in Table 3, a prompt rule of the scenario package 1 that is stored in the second rule set for the account 1 is the prompt rule a, and a prompt rule of the scenario package 1 that is stored in the second rule set for the account 2 is the prompt rule c.

Figure 10A:
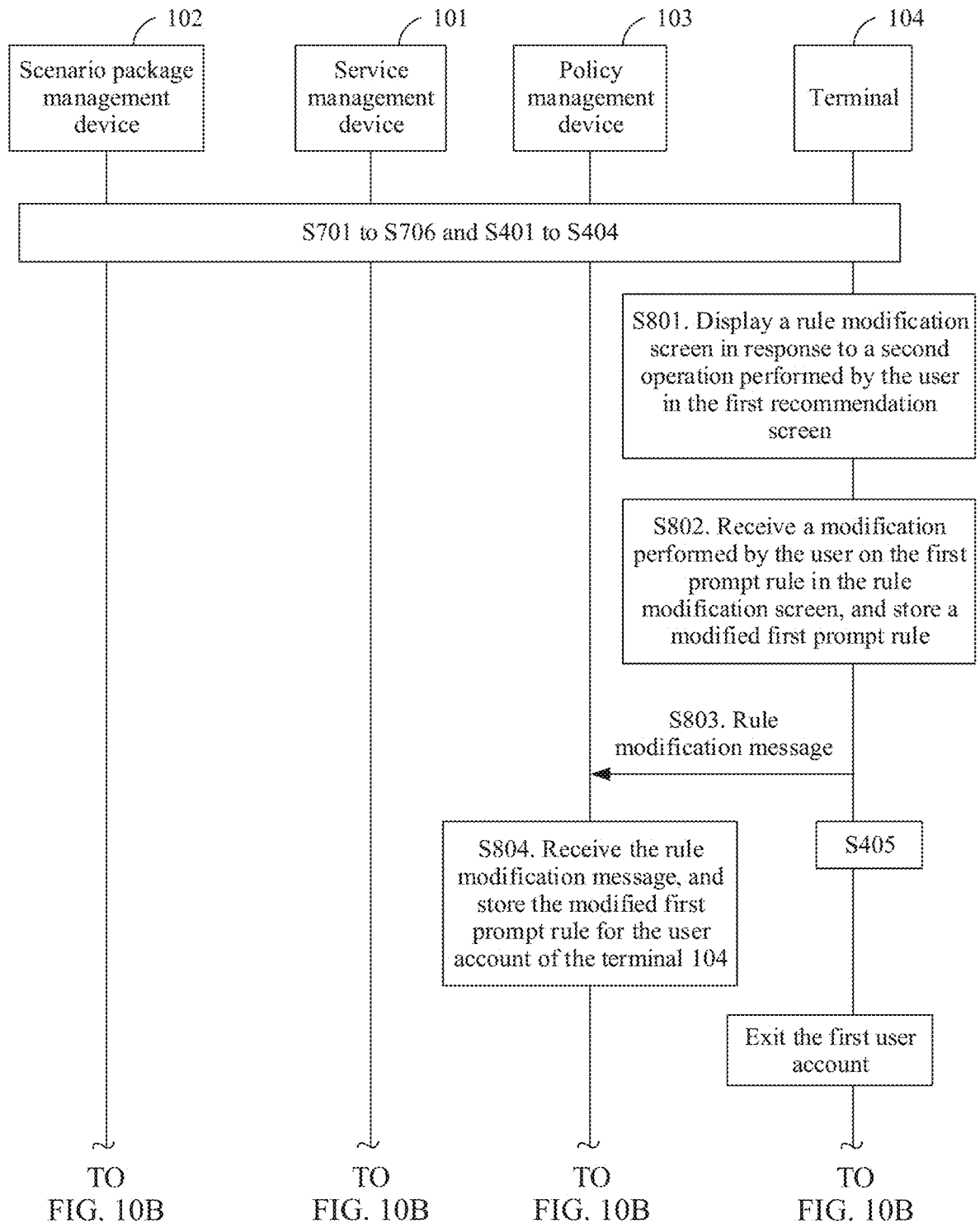
FIG. 10A and FIG. 10B are a flowchart 4 of a scenario-based application recommendation method according to an embodiment of this application.
Figure 10B:
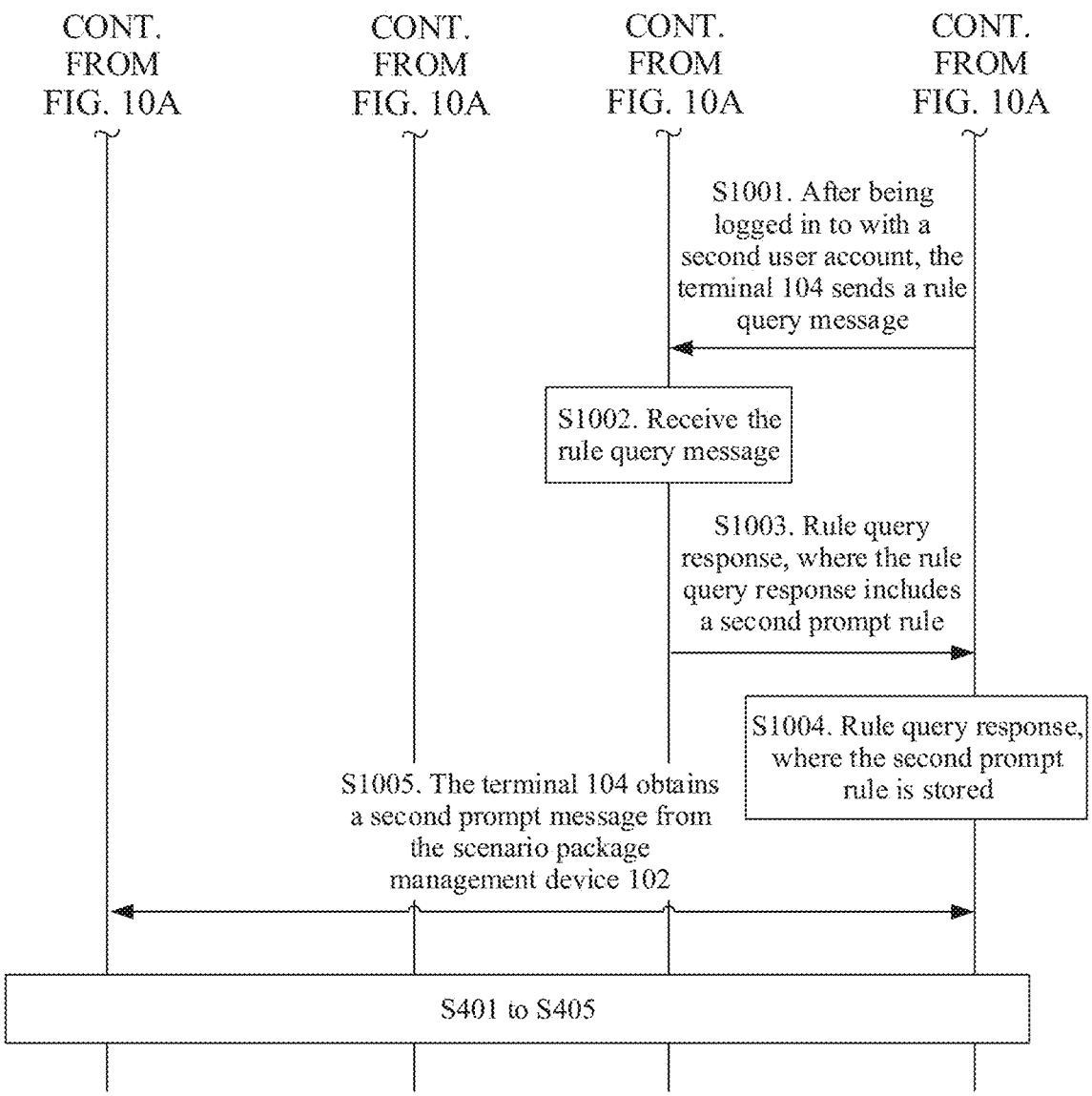

It may be understood that the terminal 104 reports the modified first prompt rule to the policy management device 103 after modifying the first prompt rule, and the policy management device 103 stores the modified first prompt rule for the first user account. Therefore, when the user logs in to another terminal with the first user account, the another terminal may obtain, from the policy management device 103, the modified first prompt rule stored for the first user account, so that a scenario package can be recommended to the user based on the modified first prompt rule. Specifically, as shown in FIG. 10A and FIG. 10B, the method in this embodiment of this application may further include S1001 to S1005.

S1001. After being logged in to with a second user account, the terminal 104 sends a rule query message to the policy management device 103, where the rule query message includes the second user account.

After being logged in to with the second user account instead of the first user account, the terminal 104 may send the rule query message to the policy management device 103, to obtain a prompt rule stored by the policy management device 103 for the second user account.

S1002. The policy management device 103 receives the rule query message sent by the terminal 104.

S1003. The policy management device 103 sends a rule query response to the terminal 104, where the rule query response includes a second prompt rule.

The second prompt rule is a prompt rule stored in the second rule set for the second user account. Optionally, the rule query response further includes an identifier of a second scenario package corresponding to the second prompt rule.

S1004. The terminal 104 receives the rule query response sent by the policy management device 103, and stores the second prompt rule.

S1005. The terminal 104 obtains a second prompt message from the scenario package management device 102.

Specifically, the second prompt message includes a basic element of the second scenario package, and the terminal 104 may obtain the basic element of the second scenario package from the scenario package management device 102.

After S1001 to S1005, the method in this embodiment of this application may further include S401 to S405.

In this embodiment of this application, the terminal 104 may report the modified first prompt rule to the policy management device 103 after the user modifies the first prompt rule, and the policy management device 103 stores the modified first prompt rule for the user account. In this way, another terminal that is logged in to with a same user account may obtain the modified first prompt rule from the policy management device 103. In other words, by using this solution, prompt rules 203 of different terminals that are logged in to with a same user account can be synchronized.

Figure 11A:
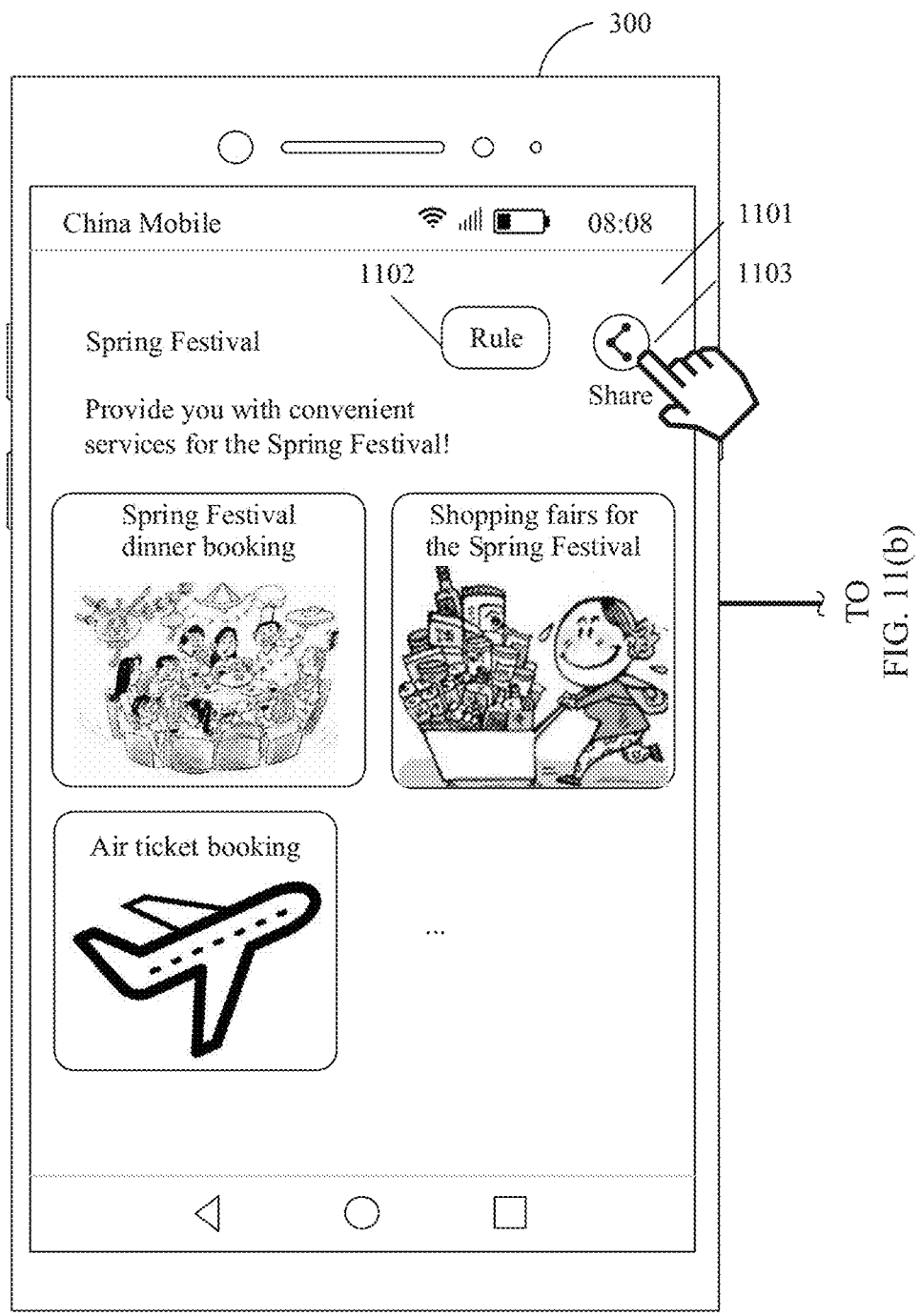
FIG. 11(a), FIG. 11(b), and FIG. 11(c) are a schematic diagram 4 of display interfaces of a terminal according to an embodiment of this application.
Figures 11B, 11C:
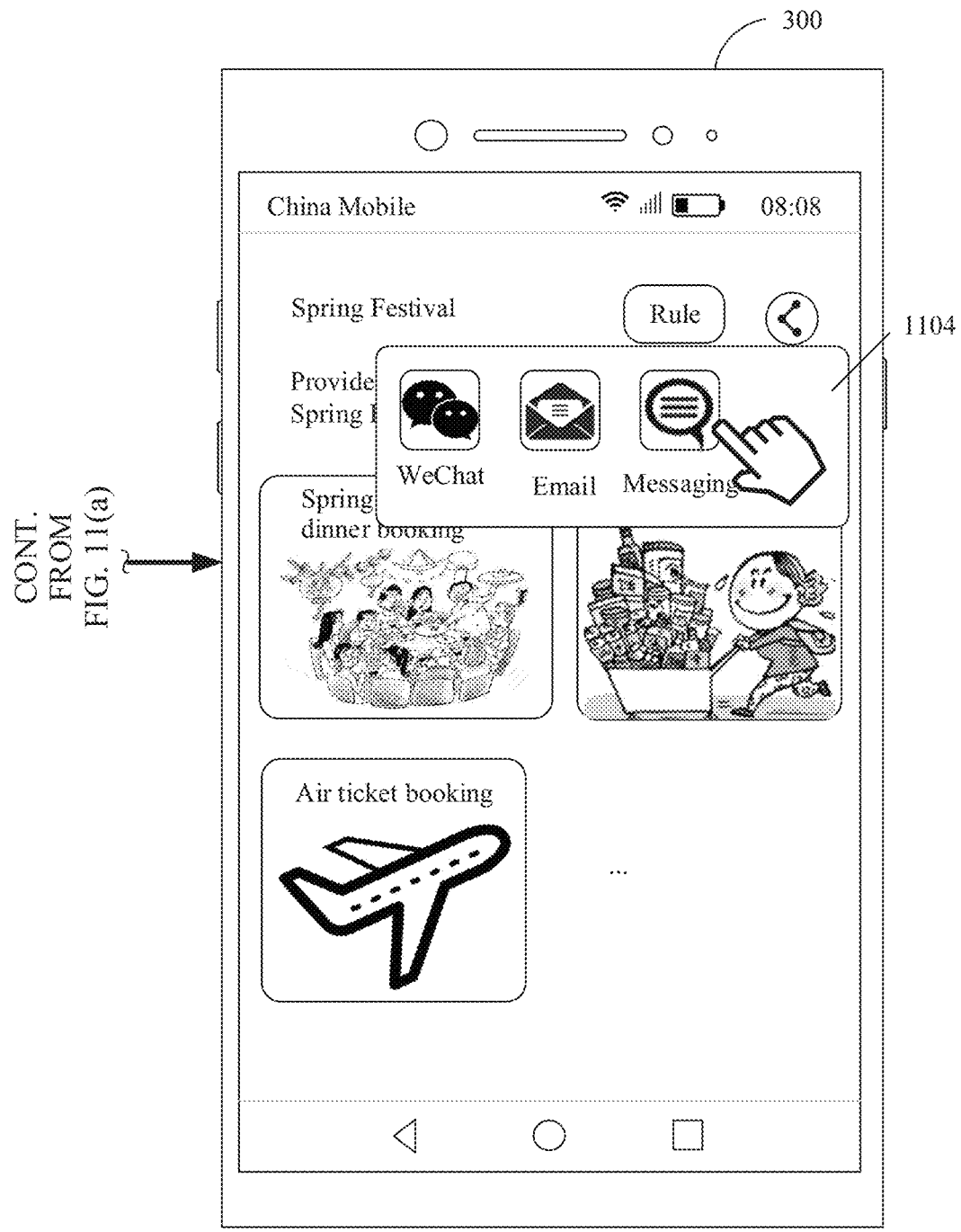
Figure 11C:
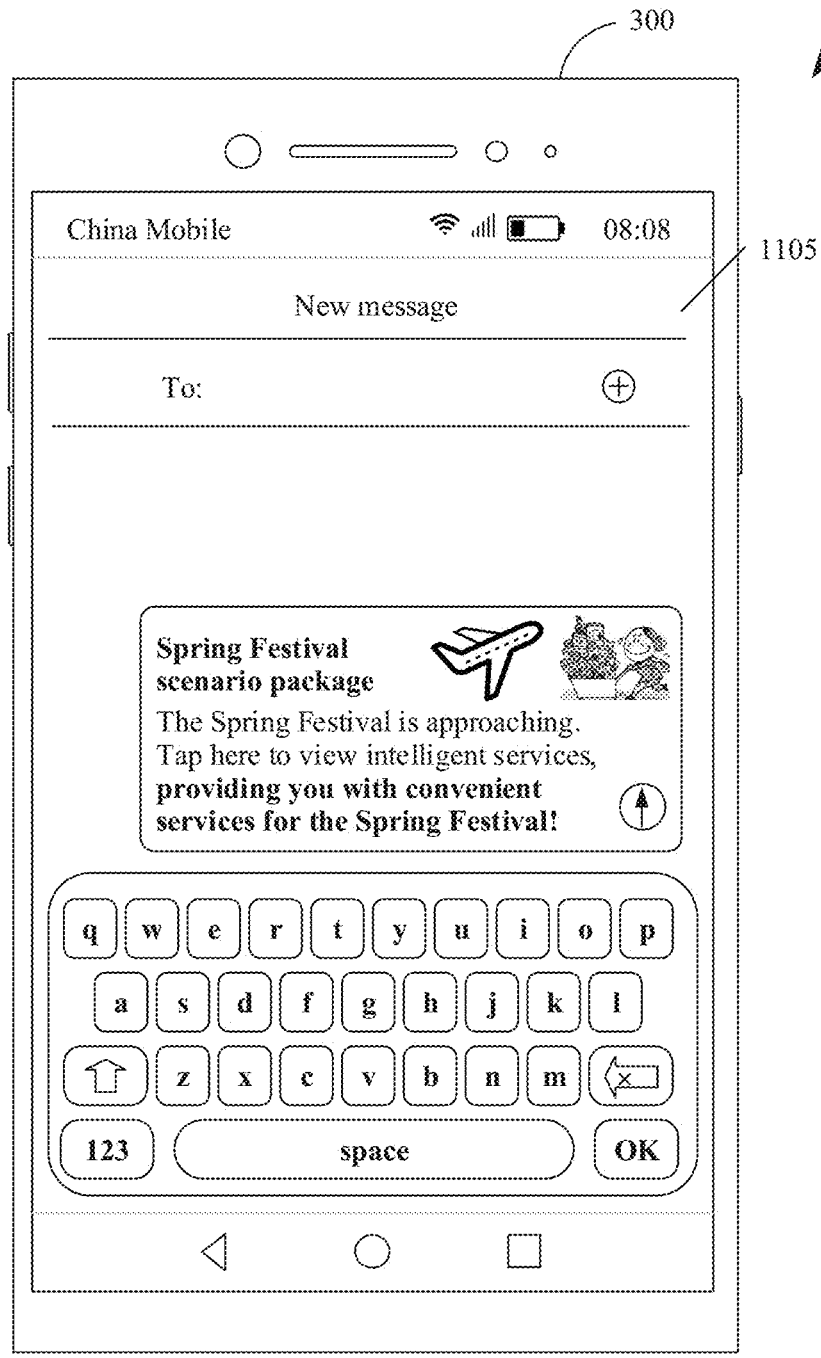

Further, the terminal 104 may further share the first scenario package with another terminal. For example, as shown in FIG. 11(a), a recommendation interface 1101 of the Spring Festival scenario package may include both a rule management item 1102 and a share button 1103. When the mobile phone 300 displays the recommendation interface 1101 shown in FIG. 11(a), the user may want to share the Spring Festival scenario package with a friend. In this case, the user may tap the share button 1103. In response to the tap operation performed by the user on the share button 1103, the mobile phone 300 may display, in the recommendation interface 1101, a communication selection window 1104 shown in FIG. 11(b). The communication selection window 1104 includes icons of communication applications that may be used to send information, for example, WeChat, e-mails, and SMS messages. When the user taps the icon of the SMS message application shown in FIG. 11(b), the mobile phone 300 displays, in response to the tap operation performed by the user on the icon of the SMS message application, an SMS message interface 1105 shown in FIG. 11(c). The SMS message interface 1105 includes a to-be-sent SMS message, and an attachment of the to-be-sent SMS message is the Spring Festival scenario package. Specifically, the attachment of the to-be-sent SMS message may include a basic element 201, a UI element 204, and an interface file 205 of the Spring Festival scenario package. In this way, the terminal 104 receiving the SMS message may display the recommendation interface of the Spring Festival scenario package based on the basic element 201, the UI element 204, and the interface file 205 of the Spring Festival scenario package that are carried in the SMS message.

Figure 12:
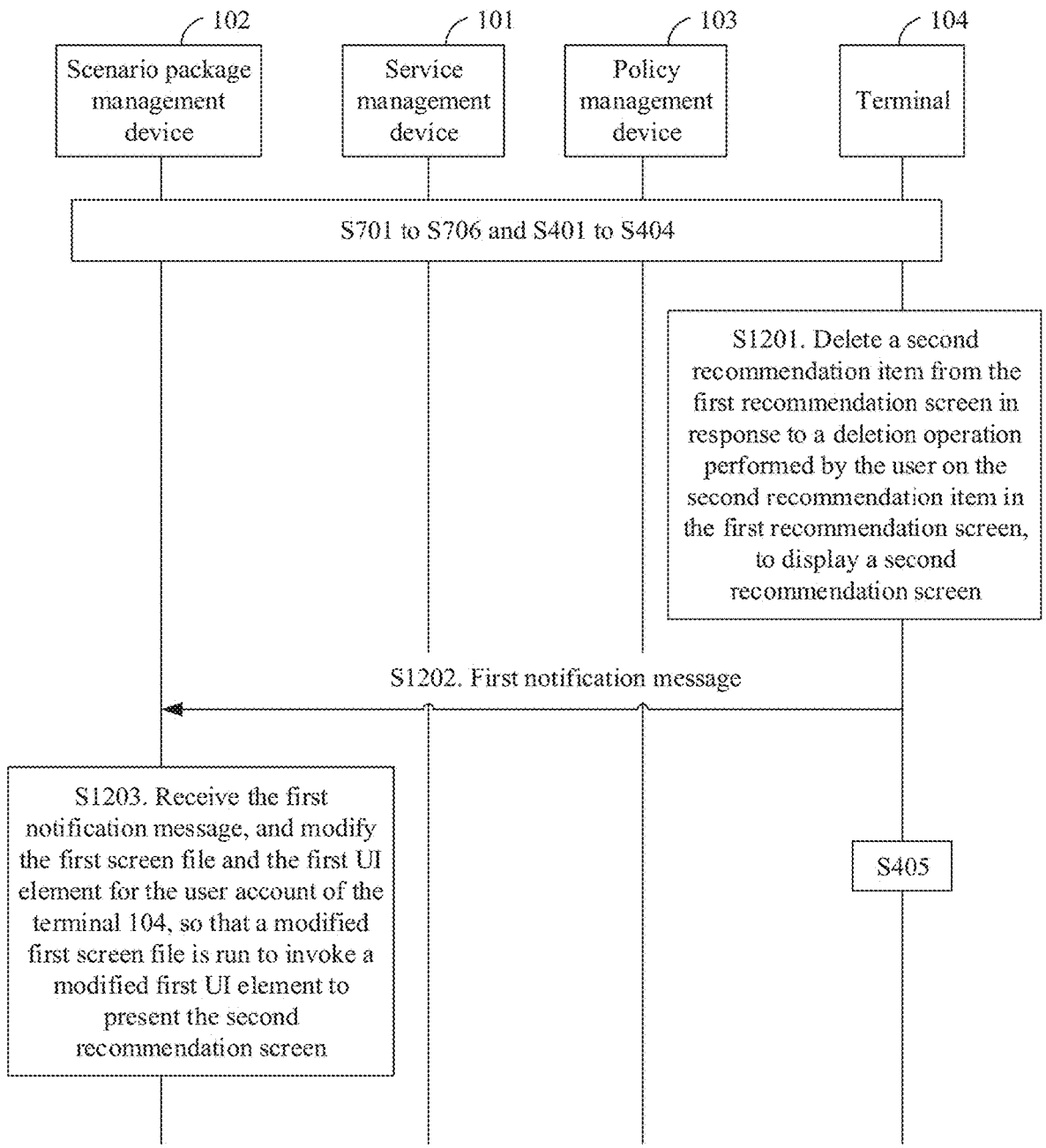
FIG. 12 is a flowchart 5 of a scenario-based application recommendation method according to an embodiment of this application.

Further, after displaying the first recommendation interface (in other words, performing S404), the terminal 104 may further receive an addition operation or a deletion operation that is performed by the user on an application prompted by the first prompt message, so that the first prompt message can prompt an application that better meets a user requirement. As shown in FIG. 12, after S404, the method in this embodiment of this application may further include S1201.

S1201. The terminal 104 deletes a second recommendation item from the first recommendation interface in response to a deletion operation performed by the user on the second recommendation item in the first recommendation interface, to display a second recommendation interface.

Figure 13A:
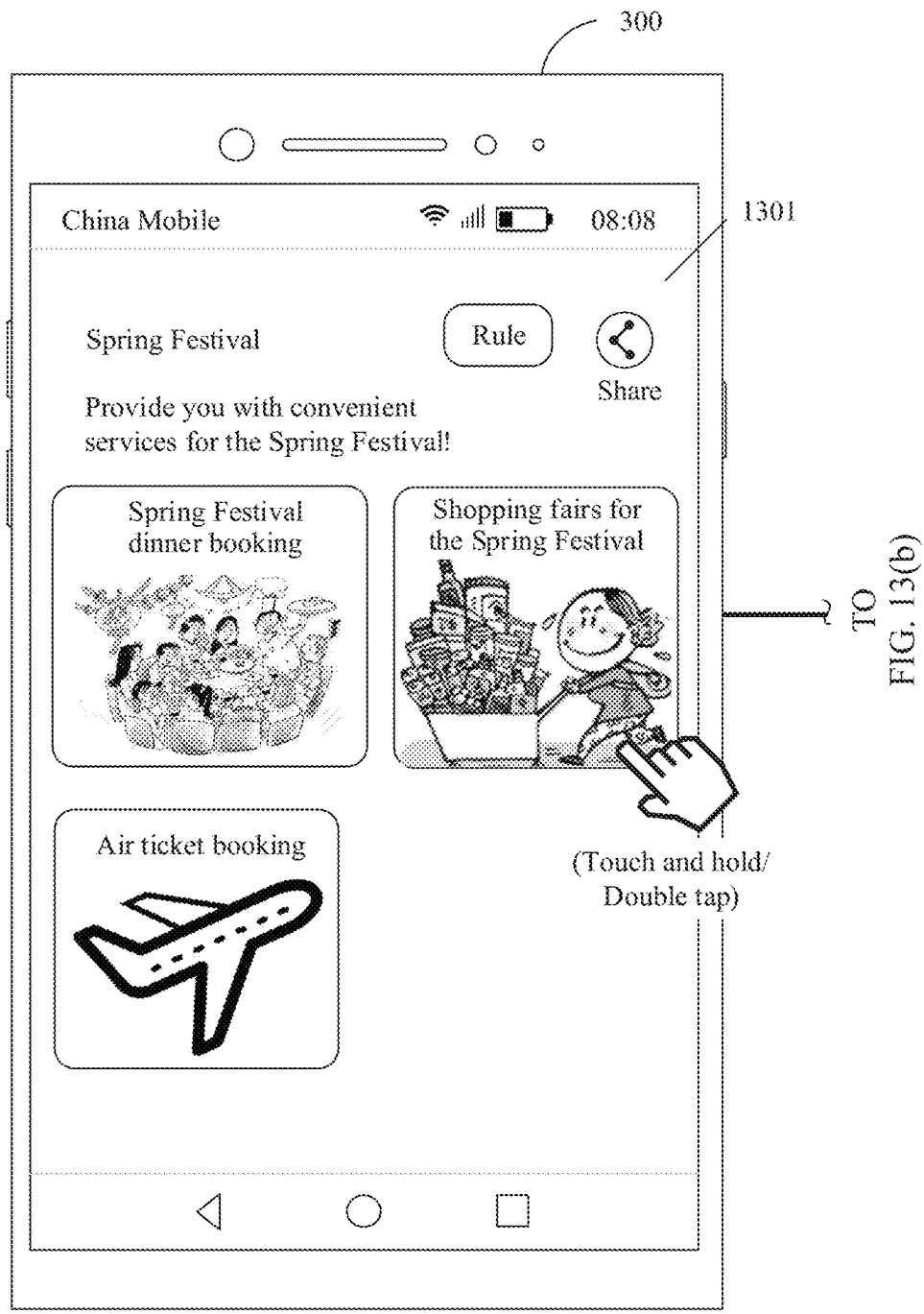
FIG. 13(a), FIG. 13(b), and FIG. 13(c) are a schematic diagram 5 of display interfaces of a terminal according to an embodiment of this application.
Figure 13B:
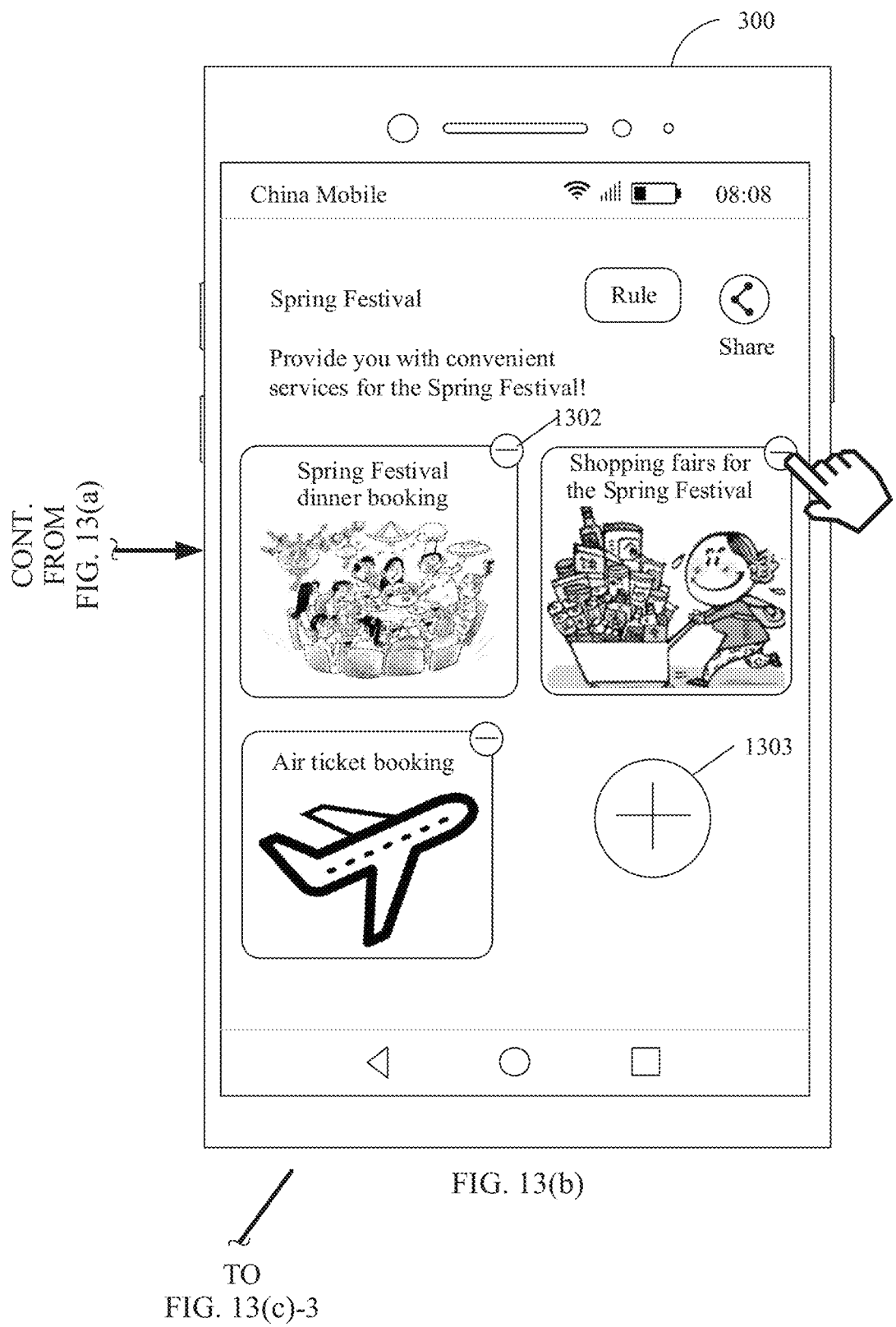
Figure 13C:
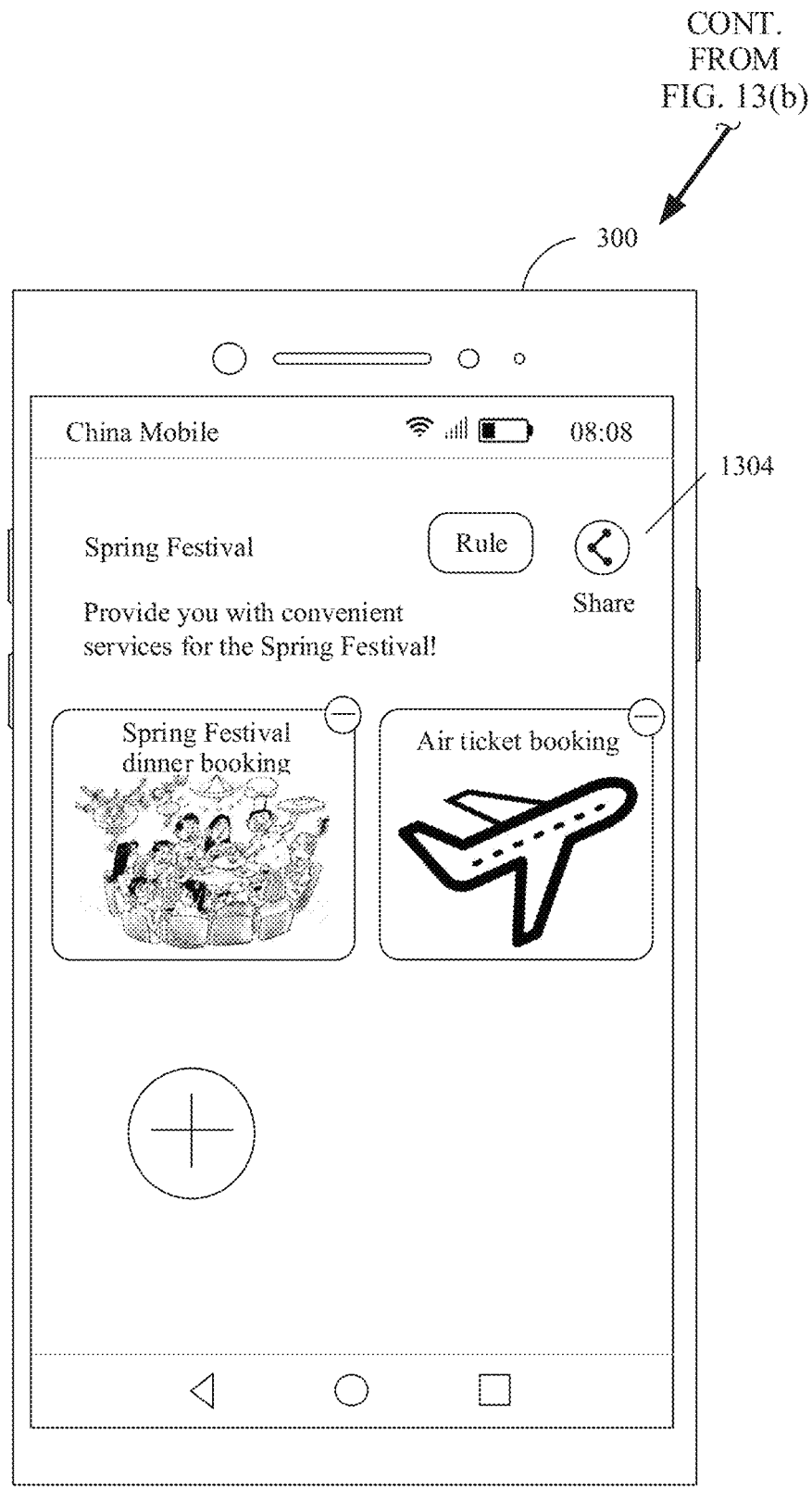

For example, the deletion operation performed by the user on the second recommendation item in the first recommendation interface may be a preset gesture entered by the user for the second recommendation item. Alternatively, the deletion operation performed by the user on the second recommendation item may include a touch-and-hold or double-tap operation (different from the first operation) performed by the user on the second recommendation item, and a tap operation performed by the user on a deletion button on the second recommendation item after the user touches and holds or double taps the second recommendation item. For example, when the user touches and holds or double taps a recommendation item of "shopping fairs for the Spring Festival" (that is, the second recommendation item) shown in FIG. 13(a), the mobile phone 300 displays, in response to the touch-and-hold or double-tap operation performed by the user on the recommendation item of "shopping fairs for the Spring Festival", the first recommendation interface shown in FIG. 13(b). In the first recommendation interface shown in FIG. 13(b), a deletion button is displayed in an upper right corner of a recommendation item of each application. For example, a deletion button 1302 is displayed in an upper right corner of a recommendation item of an application "Spring Festival dinner booking" shown in FIG. 13(b). In response to a tap operation performed by the user on a deletion button in an upper right corner of a recommendation item of "shopping fairs for the Spring Festival" shown in FIG. 13(b), the mobile phone 300 may delete the application "shopping fairs for the Spring Festival" from the Spring Festival scenario package, to display the second recommendation interface shown in FIG. 13(c). Compared with the first recommendation interface shown in FIG. 13(a), the second recommendation interface shown in FIG. 13(c) does not include the recommendation item of "shopping fairs for the Spring Festival" (that is, the second recommendation item). In response to a tap operation performed by the user at any location in the second recommendation interface shown in FIG. 13(c), a deletion button in an upper right corner of a recommendation item of each application may disappear.

Further, after receiving the deletion operation performed by the user on the second recommendation item in the first recommendation interface, the terminal 104 may further send a first notification message to the scenario package management device 102, to instruct the scenario package management device 102 to delete, from the first scenario package for the user account of the terminal 104, an application corresponding to the second recommendation item, and store a modified first interface file and a modified first UI element for the user account of the terminal 104. Specifically, as shown in FIG. 12, after S1201, the method in this embodiment of this application further includes S1202 and S1203.

S1202. The terminal 104 sends a first notification message to the scenario package management device 102, where the first notification message is used to instruct the scenario package management device 102 to modify the first interface file and the first UI element for the user account of the terminal 104, so that a modified first interface file is run to invoke a modified first UI element to present the second recommendation interface.

The first notification message may include the identifier of the first scenario package and an identifier of the application corresponding to the second recommendation item.

S1203. The scenario package management device 102 receives the first notification message sent by the terminal 104, and modifies the first interface file and the first UI element for the user account of the terminal 104, so that a modified first interface file is run to invoke a modified first UI element to present the second recommendation interface.

After receiving the first notification message, the scenario package management device 102 searches the first information table shown in Table 1 for the first configuration information by using the identifier of the first scenario package, and then by using the identifier of the application (referred to as an application a for short) corresponding to the second recommendation item, deletes related information of the application a from the found first configuration information, to obtain second configuration information. The information about the application a includes an identifier of the application a, a UI element of the application a, and the like. The second configuration information is configuration information of the first scenario package that is obtained after the application corresponding to the second recommendation item is deleted from the first scenario package.

It should be noted that the first information table shown in Table 1 is used to store configuration information configured by the operation personnel for each scenario package. The scenario package management device 102 may store, in a second information table for each user account, configuration information sent by the terminal 104 that is logged in to with the user account. FIG. 4 shows an example of a second information table provided in this embodiment of this application.

TABLE 4

Second information table

| User account | Scenario package | Configuration information |
|---|---|---|
| User account 1 | Scenario package 1 | Configuration information a |
| User account 2 | Scenario package 1 | Configuration information c |
|  | Scenario package 3 | Configuration information x |
| ... | ... | ... |
| User account n | Scenario package n | Configuration information x |

It can be learned from Table 1 that configuration information configured by the operation personnel for the scenario package 1 in the scenario package management device 102 is the configuration information 1. The terminal 104 corresponding to the user account 1 may delete the application a from the scenario package 1, and send the first notification message that includes the identifier of the scenario package 1 and the identifier of the application a to the scenario package management device 102. After receiving the first notification message, the scenario package management device 102 may delete the related information of the application a from the configuration information of the scenario package 1, to obtain the configuration information a. As shown in Table 4, the scenario package management device 102 may store the configuration information a of the scenario package 1 in the second information table for the user account 1.

Each user may delete an application in a scenario package from the terminal 104, and different users delete different applications from a same scenario package. For example, as shown in Table 4, configuration information of the scenario package 1 that is stored in the second information table for the user account 1 is the configuration information a, and configuration information of the scenario package 1 that is stored in the second information table for the user account 2 is the configuration information c.

Figure 15:
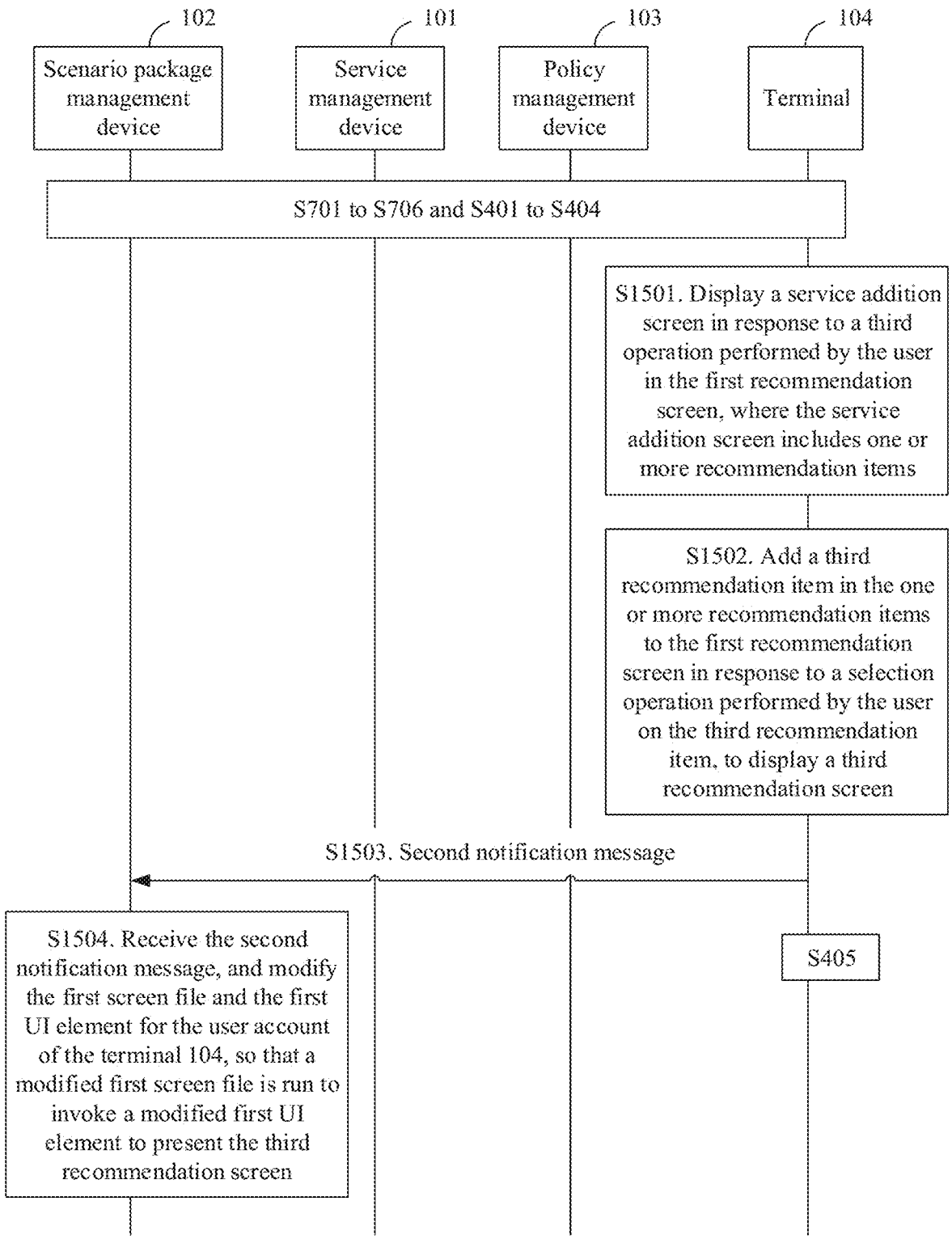
FIG. 15 is a flowchart 6 of a scenario-based application recommendation method according to an embodiment of this application.

Further, the modification performed by the user on the application in the first scenario package may further include: adding a new application to the first scenario package. Specifically, as shown in FIG. 15, after S404 shown in FIG. 4, the method in this embodiment of this application may further include S1501 and S1502.

S1501. The terminal 104 displays a service addition interface in response to a third operation performed by the user in the first recommendation interface, where the service addition interface includes one or more recommendation items, and each of the one or more recommendation items corresponds to one application.

Figure 14A:
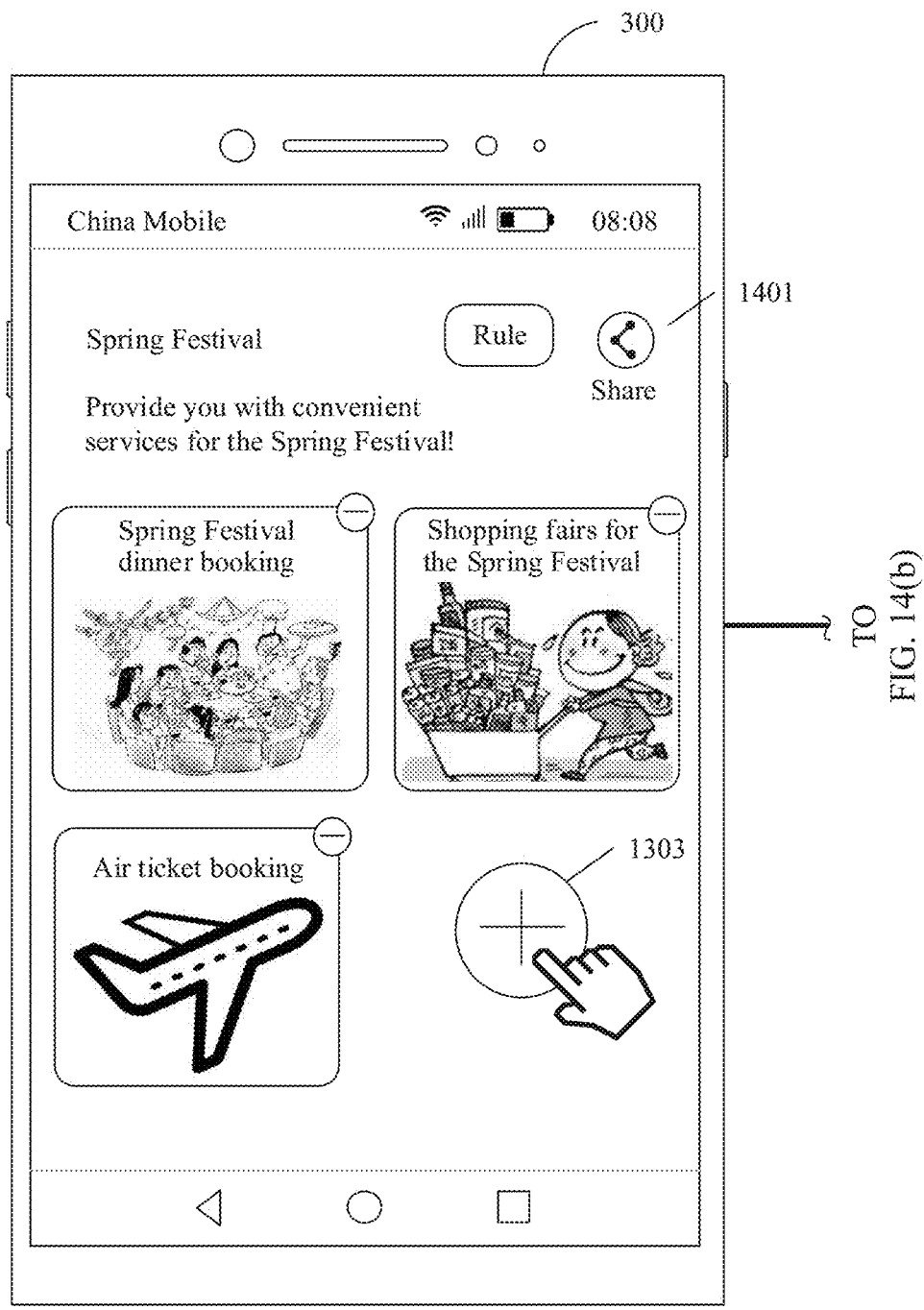
FIG. 14(a), FIG. 14(b), and FIG. 14(c) are a schematic diagram 6 of display interfaces of a terminal according to an embodiment of this application.
Figure 14B:
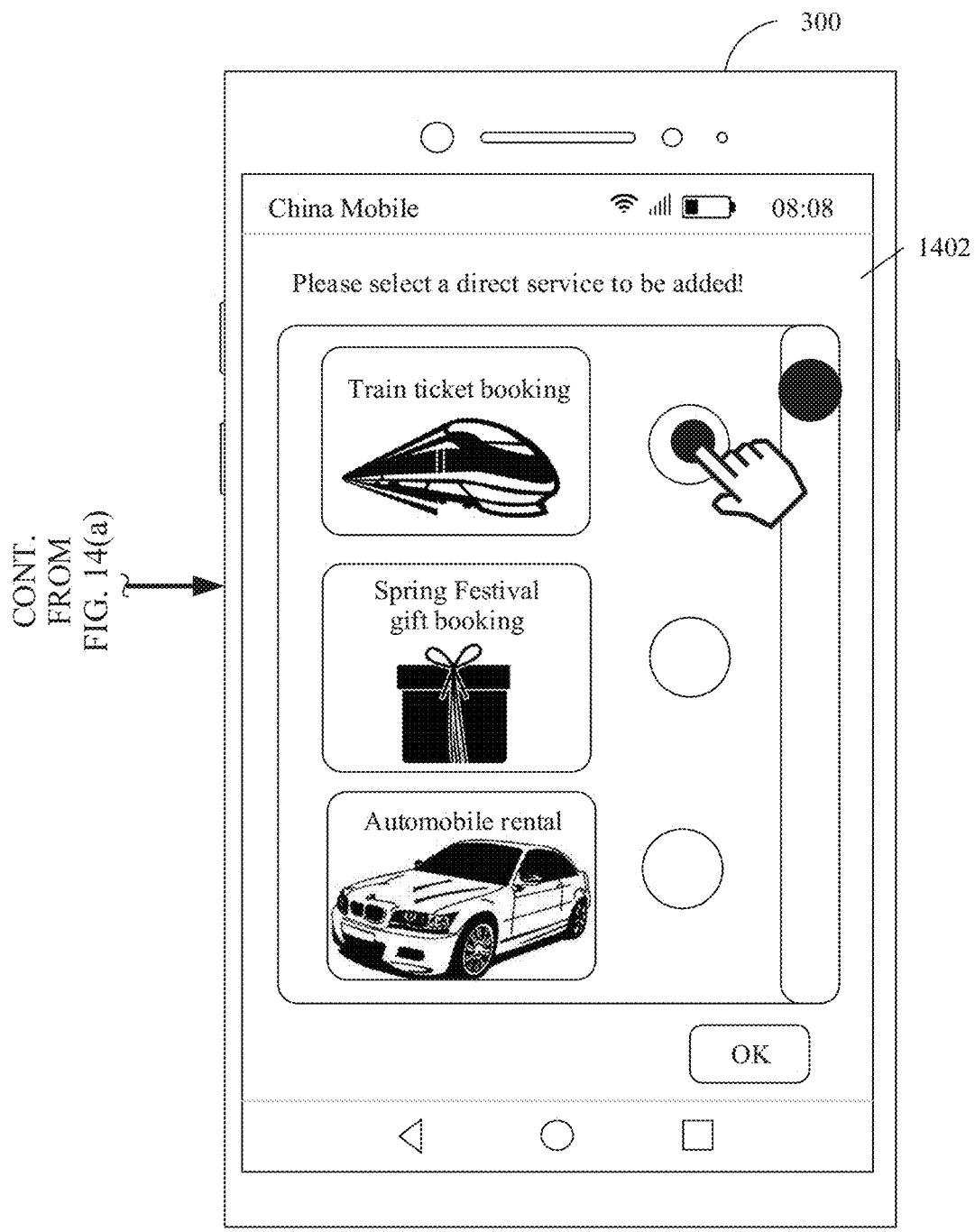

For example, the third operation performed by the user in the first recommendation interface may be a preset gesture entered by the user in the first recommendation interface. Alternatively, the third operation performed by the user in the first recommendation interface may include a touch-and-hold or double-tap operation (different from the first operation) performed by the user on any recommendation item in the first recommendation interface, and a tap operation performed by the user on a service addition button after the user touches and holds or double taps any recommendation item in the first recommendation interface, where the service addition button is displayed by the terminal 104. For example, when the user touches and holds or double taps a recommendation item of an application "shopping fairs for the Spring Festival" shown in FIG. 13(a), the mobile phone 300 displays, in response to the touch-and-hold or double-tap operation performed by the user on the recommendation item of "shopping fairs for the Spring Festival", a recommendation interface shown in FIG. 13(b). The recommendation interface shown in FIG. 13(b) includes a service addition button 1303. The mobile phone 300 displays, in response to a tap operation performed by the user on an addition button 1303 in a recommendation interface 1401 shown in FIG. 14(a), a service addition interface 1402 shown in FIG. 14(b). The service addition interface 1402 includes a recommendation item of an application "train ticket booking", a recommendation item of "Spring Festival gift booking", a recommendation item of "automobile rental", and the like. The recommendation item in the service addition interface is a recommendation item of an application that is related to a title of the first scenario package and that is selected by the scenario package management device 102 from a plurality of applications managed by the service management device 101.

S1502. The terminal 104 adds a third recommendation item in the one or more recommendation items to the first recommendation interface in response to a selection operation performed by the user on the third recommendation item, to display a third recommendation interface.

Figure 14C:
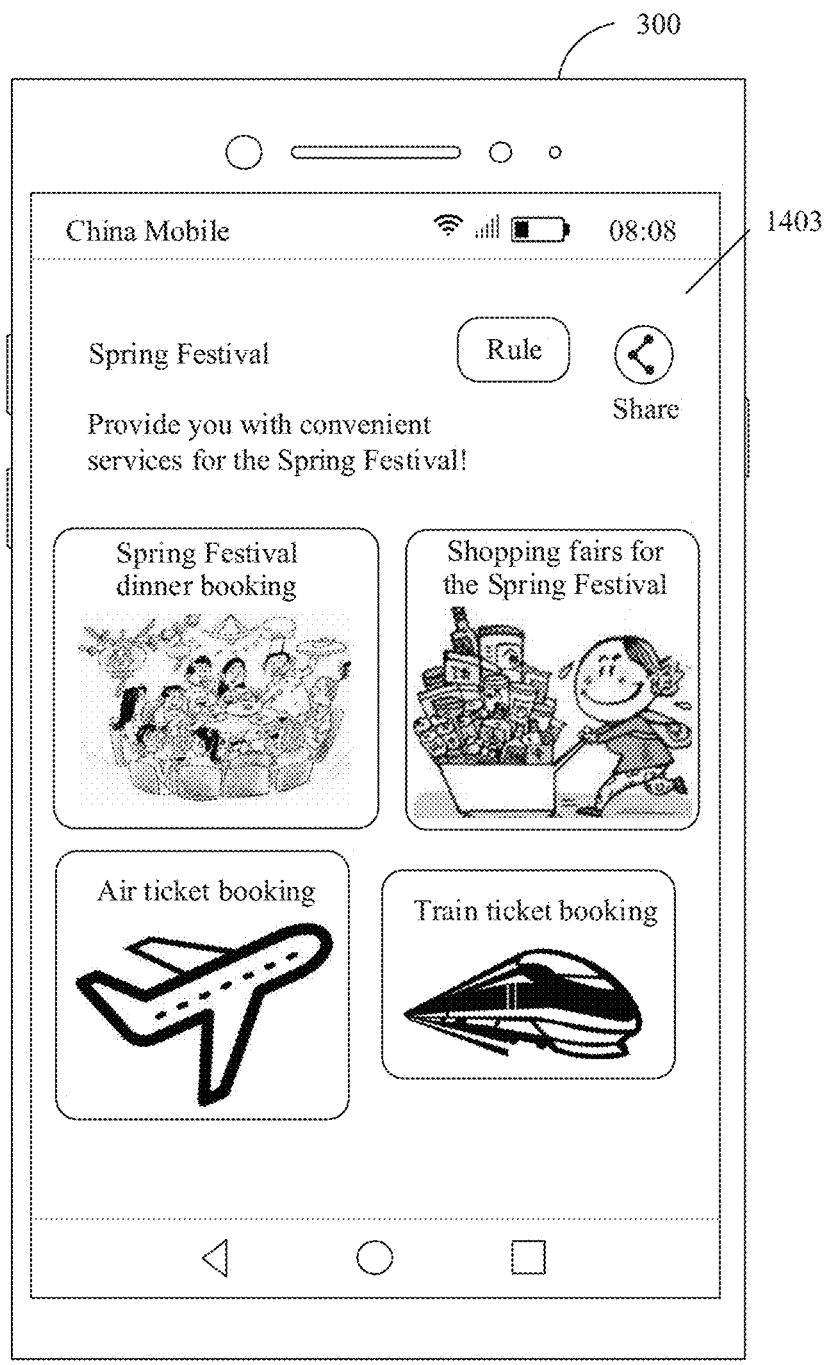

The selection operation performed by the user on the third recommendation item may be a tap operation performed by the user on the third recommendation item. For example, after the user taps an "OK" button in FIG. 14(b), the mobile phone 300 may display, in response to the tap operation performed by the user on the recommendation item of "train ticket booking" shown in FIG. 14(b), the third recommendation interface that is shown in FIG. 14(c) and that includes the recommendation item of "train ticket booking" (that is, the third recommendation item) selected by the user.

Further, after receiving the selection operation performed by the user on the third recommendation item, the terminal 104 may further send a second notification message to the scenario package management device 102, to instruct the scenario package management device 102 to add an application corresponding to the third recommendation item to the first scenario package. Specifically, as shown in FIG. 15, after S1502, the method in this embodiment of this application further includes S1503 and S1504.

S1503. The terminal 104 sends a second notification message to the scenario package management device 102, where the second notification message is used to instruct the scenario package management device 102 to modify the first interface file and the first UI element for the user account of the terminal 104, so that a modified first interface file is run to invoke a modified first UI element to present the third recommendation interface.

The second notification message may include the identifier of the first scenario package and an identifier of the application corresponding to the third recommendation item.

S1504. The scenario package management device 102 receives the second notification message sent by the terminal 104, and modifies the first interface file and the first UI element for the user account of the terminal 104, so that a modified first interface file is run to invoke a modified first UI element to present the third recommendation interface.

After receiving the second notification message, the scenario package management device 102 searches the first information table shown in Table 1 for the corresponding first configuration information by using the identifier of the first scenario package, and then, by using the identifier of the application (referred to as an application b for short) corresponding to the third recommendation item, adds information about the application b to the found first configuration information, to obtain third configuration information. The information about the application b includes an identifier of the application b, a UI element of the application b, and the like. The third configuration information is configuration information of the first scenario package that is obtained after the application corresponding to the third recommendation item is added to the first scenario package.

It may be understood that, after adding an application to the scenario package or deleting an application from the scenario package, the terminal 104 that is logged in to with the first user account sends the first notification message or the second notification message to the scenario package management device 102, so that the scenario package management device 102 updates the configuration information of the first scenario package. Therefore, when the user logs in to another terminal with the first user account, the another terminal may obtain, from the scenario package management device 102, the configuration information of the scenario package that is stored for the first user account, in other words, the another terminal may obtain updated configuration information of the scenario package that is stored for the user account. By using this solution, configuration information of a scenario package on different terminals that are logged in to with a same user account can be synchronized.

In another embodiment of this application, the network device (for example, the scenario package management device 102) may match the current scenario information against the one or more prompt rules, and when determining that the current scenario information matches the first prompt rule, instruct the terminal to display the first prompt message corresponding to the first prompt rule. Then, the terminal 104 may display the first prompt message corresponding to the first prompt rule, and then perform S404 and S405.

In this embodiment, the network device may not send the one or more prompt rules to the terminal 104, but the terminal 104 reports the current scenario information of the terminal 104 to the network device. After receiving the current scenario information reported by the terminal 104, the network device may match the current scenario information against the one or more prompt rules. The terminal 104 may report the current scenario information of the terminal 104 to the network device in real time. Alternatively, the terminal 104 may report the current scenario information of the terminal 104 to the network device when a preset change occurs on the address information of the terminal 104. The preset change may be that an address change of the terminal 104 is greater than a preset threshold.

It should be noted that, in this embodiment, after the terminal 104 displays the first recommendation interface, the method in this embodiment of this application may further include S801 to S804, S1001 to S1005, S1201 and S1202, and S1501 and S1502. For specific methods for performing S404 and S405, S801 to S804, S1001 to S1005, S1201 and S1202, and S1501 and S1502 by the terminal, refer to the detailed descriptions in the foregoing embodiments. Details are not described again in this embodiment of this application.

According to the scenario-based application recommendation method provided in this embodiment of this application, the network device may receive the current scenario information reported by the terminal 104, and when the first prompt rule matches the current scenario information, instruct the terminal 104 to display the first prompt message corresponding to the first prompt rule or send the first prompt message to the terminal 104, to prompt that there is a recommended application in the scenario corresponding to the current scenario information. Because the current scenario information may reflect a current status of the user, it is prompted that the application recommended in the scenario corresponding to the current scenario information may meet a current requirement of the user. It can be learned that, by using the method in this embodiment of this application, a degree of matching between a service recommended by the terminal to the user and a user requirement can be improved.

In addition, in response to the selection operation performed by the user on the first recommendation item in the first recommendation interface, the terminal 104 may directly display the interface of the first application corresponding to the first recommendation item. In other words, an application recommended by the terminal 104 may provide a tap-to-use direct service for the user, and there is no need to download and install a client of the APP for the terminal 104. Therefore, according to the method in this embodiment of this application, a user operation of providing a service for the user by the terminal 104 can be simplified, and a case in which memory of the terminal 104 is occupied when the client of the APP is downloaded and installed for the terminal 104 can be avoided. In conclusion, according to the method in this embodiment of this application, human-computer interaction performance of the terminal 104 can be improved, so as to improve user experience.

It may be understood that to implement the foregoing functions, the foregoing terminal and the foregoing management device include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal and the management device may be divided into function modules based on the foregoing method examples. For example, various function modules corresponding to various functions may be obtained through division, or two or more functions may be integrated into one processing module. The integrated module may be implemented in a form of hardware, or may be implemented in a form of a software function module. It should be noted that, in this embodiment of this application, module division is an example, and is merely a logical function division. In actual implementation, another division manner may be used.

Figure 16:
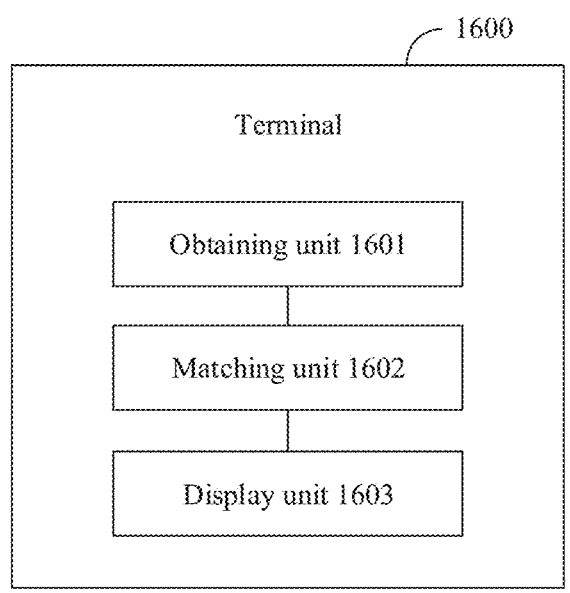
FIG. 16 is a schematic structural diagram 1 of composition of a terminal according to an embodiment of this application.

When each function module is obtained through division based on each corresponding function, as shown in FIG. 16, an embodiment of this application provides a terminal 1600. The terminal 1600 includes an obtaining unit 1601, a matching unit 1602, and a display unit 1603.

The obtaining unit 1601 is configured to support the terminal 1600 in performing S401 and S1005 in the foregoing method embodiment, and/or another process of the technology described in this specification. The matching unit 1602 is configured to support the terminal 1600 in performing S402 in the foregoing method embodiment, and/or another process of the technology described in this specification. The display unit 1603 is configured to support the terminal 1600 in performing S403, S404, S405, S801, S1201, S1501, and S1502 in the foregoing method embodiment, and/or another process of the technology described in this specification.

Figure 17:
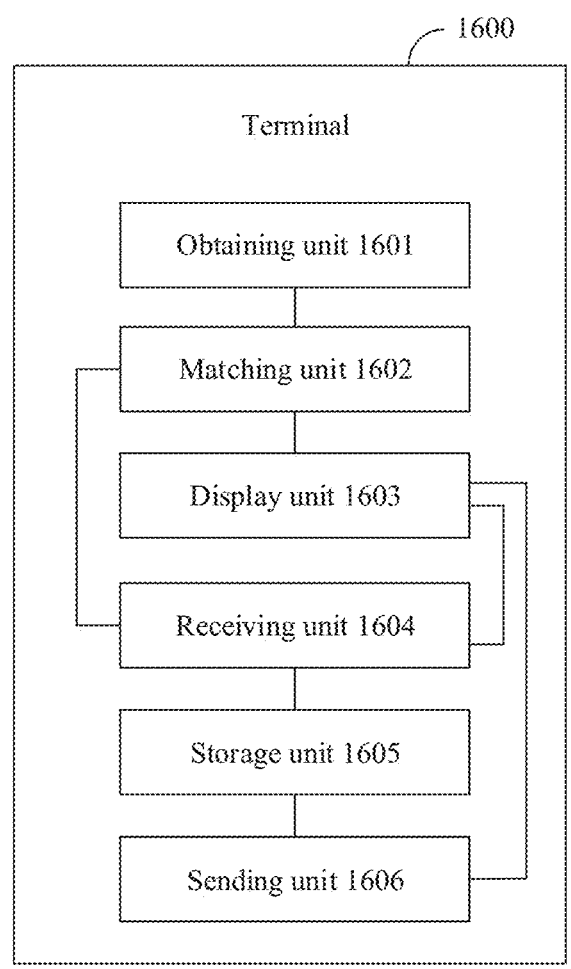
FIG. 17 is a schematic structural diagram 2 of composition of a terminal according to an embodiment of this application.

Further, as shown in FIG. 17, the terminal 1600 may further include a receiving unit 1604, a storage unit 1605, and a sending unit 1606. The receiving unit 1604 is configured to support the terminal 1600 in performing the receiving action in S704 and S404*d* in the foregoing method embodiment, and/or another process of the technology described in this specification. The storage unit 1605 is configured to support the terminal 1600 in performing the storage action in S704 and S802 in the foregoing method embodiment, and/or another process of the technology described in this specification. The sending unit 1606 is configured to support the terminal 1600 in performing S404*a*, S803, S1001, S1004, S1202, and S1503 in the foregoing method embodiment, and/or another process of the technology described in this specification.

When an integrated unit is used, the obtaining unit 1601, the matching unit 1602, and the like may be integrated into one processing module for implementation. The receiving unit 1604 and the sending unit 1606 each may be an RF circuit, a WiFi module, or a Bluetooth module of the terminal 1600. The storage unit 1605 may be a storage module of the terminal 1600. The display unit 1603 may be a display module such as a display (a touchinterface).

Figure 18:
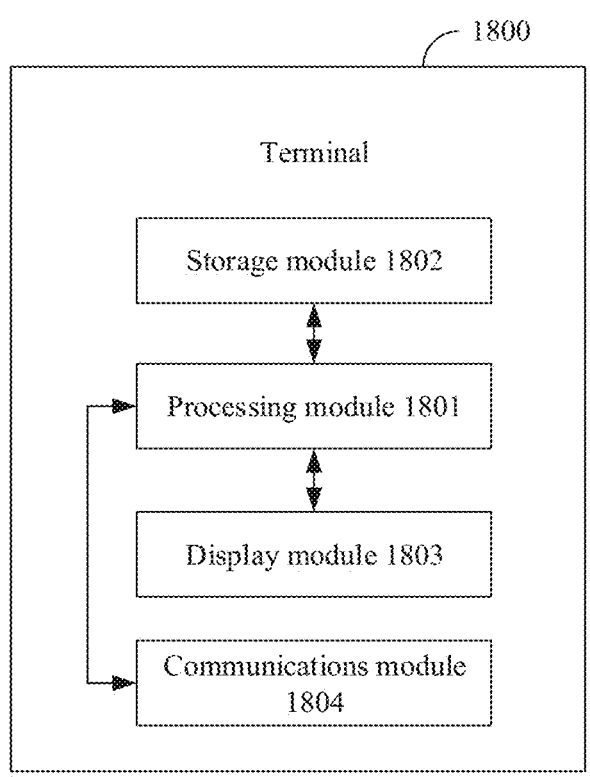
FIG. 18 is a schematic structural diagram 3 of composition of a terminal according to an embodiment of this application.

FIG. 18 is a possible schematic structural diagram of the terminal in the foregoing embodiment. The terminal 1800 includes a processing module 1801, a storage module 1802, a display module 1803, and a communications module 1804.

The processing module 1801 is configured to control and manage the terminal 1800. The display module 1803 is configured to display an image. The storage module 1802 is configured to store program code and data of the terminal 1800, and a plurality of sensitive features and sensitivity levels of the sensitive features. The communications module 1804 is configured to communicate with another device. For example, the communications module is configured to receive a message or an image file from the another device or send a message or an image file to the another device.

The processing module 1801 may be a processor or a controller, for example, may include a CPU, a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 1804 may be a transceiver, a transceiver circuit, a communications interface, or the like. The storage module 1802 may be a memory.

When the processing module 1801 is a processor (the processor 301 shown in FIG. 3), the communications module is a radio frequency circuit (the radio frequency circuit 302 shown in FIG. 3), the storage module 1802 is a memory (the memory 303 shown in FIG. 3), and the display module 3403 is a display such as a touchinterface (including the touchpad 304-1 and the display panel 304-2 that are shown in FIG. 3), the device provided in this application may be the mobile phone 300 shown in FIG. 3. The communications module 1804 may include both a radio frequency circuit, and a WiFi module and a Bluetooth module. Communications modules such as the radio frequency circuit, the WiFi module, and the Bluetooth module may be collectively referred to as a communications interface. The processor, the communications interface, the touchinterface, and the memory may be coupled by using a bus.

Figure 19:
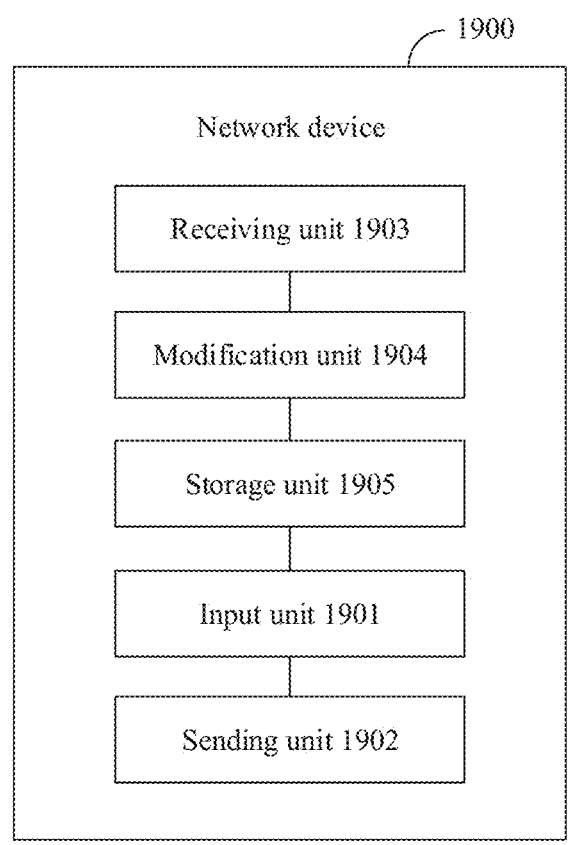
FIG. 19 is a schematic structural diagram 1 of composition of a network device according to an embodiment of this application.

When each function module is obtained through division based on each corresponding function, as shown in FIG. 19, an embodiment of this application provides a network device 1900. The network device 1900 is the network device in the embodiments of this application, that is, the scenario packet management device 102 shown in FIG. 1. The network device 1900 includes an input unit 1901 and a sending unit 1902.

The obtaining unit 1901 is configured to obtain first prompt information and a first prompt rule, and/or is configured to perform another process of the technology described in this specification. The sending unit 1902 is configured to support the network device 1900 in performing S703, S705, and S404c in the foregoing method embodiment, and/or is configured to perform another process of the technology described in this specification.

Further, as shown in FIG. 19, the network device 1900 may further include the input unit. The input unit is configured to support the network device 1900 in performing S702 in the foregoing method embodiment, and/or is configured to perform another process of the technology described in this specification.

Further, as shown in FIG. 19, the network device 1900 may further include a receiving unit 1903, a modification unit 1904, and a storage unit 1905. The receiving unit 1903 is configured to support the network device 1900 in performing S404b, the action of receiving the first notification message in S1203, and the action of receiving the second notification message in S1504 in the foregoing method embodiment, and/or is configured to perform another process of the technology described in this specification. The modification unit 1904 is configured to support the network device 1900 in performing the action of modifying the first interface file and the first UI element in S1203 and the action of modifying the first interface file and the first UI element in S1504 in the foregoing method embodiment, and/or is configured to perform another process of the technology described in this specification. The storage unit 1905 is configured to: store configuration information configured by a user for a scenario package, and store information obtained by the modification unit through modification, and/or is configured to perform another process of the technology described in this specification.

Further, the network device 1900 may further include a display unit. The display unit is configured to display a configuration interface. The configuration interface is used to enter configuration information of a scenario package. For example, the input unit 1901 may receive configuration information of a scenario package that is entered by the user in the configuration interface displayed by the display unit.

When an integrated unit is used, the input unit 1901, the modification unit, and the like may be integrated into one processing module for implementation. The sending unit 1902 and the receiving unit each may be an RF circuit, a WiFi module, or a Bluetooth module of the network device 1900. The storage unit may be a storage module of the network device 1900. The display unit may be a display module such as a display (a touchinterface).

Figure 20:
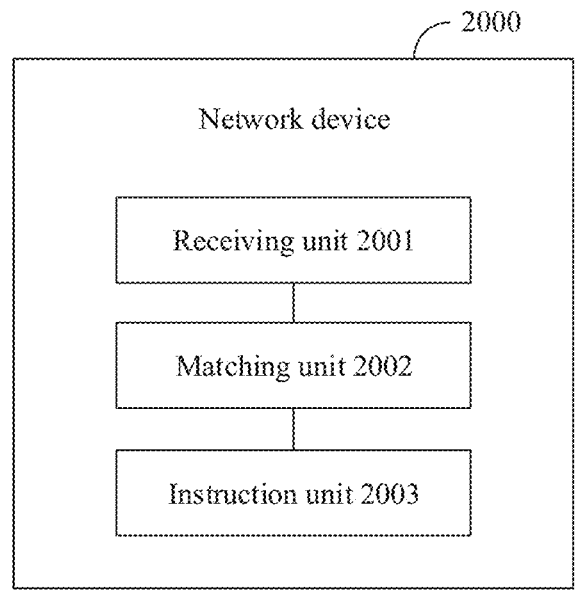
FIG. 20 is a schematic structural diagram 2 of composition of a network device according to an embodiment of this application.

When each function module is obtained through division based on each corresponding function, as shown in FIG. 20, an embodiment of this application provides a network device 2000. The network device 2000 is the network device in the embodiments of this application, that is, the scenario packet management device 102 shown in FIG. 1. The network device 2000 includes a receiving unit 2001, a matching unit 2002, and an instruction unit 2003.

The receiving unit 2001 is configured to receive current scenario information reported by the terminal 104, and/or is configured to perform another process of the technology described in this specification. The matching unit 2002 is configured to determine whether a first prompt rule matches the current scenario information, and/or is configured to perform another process of the technology described in this specification. The instruction unit 2003 is configured to: when it is determined that the current scenario information matches the first prompt rule in one or more prompt rules, send a first prompt message corresponding to the first prompt rule to the terminal 104, or instruct the terminal 104 to display a first prompt message corresponding to the first prompt rule, and/or is configured to perform another process of the technology described in this specification.

Further, the network device 2000 may further include a storage unit and a display unit. The display unit is configured to display a configuration interface, and the configuration interface is used to enter configuration information of a scenario package. The storage unit is configured to store the configuration information of the scenario package.

When an integrated unit is used, the matching unit 2002, the instruction unit 2003, and the like may be integrated into one processing module for implementation. The sending unit 2001 and the receiving unit each may be an RF circuit, a WiFi module, or a Bluetooth module of the network device 2000. The storage unit may be a storage module of the network device 2000. The display unit may be a display module such as a display (a touchinterface).

Figure 21:
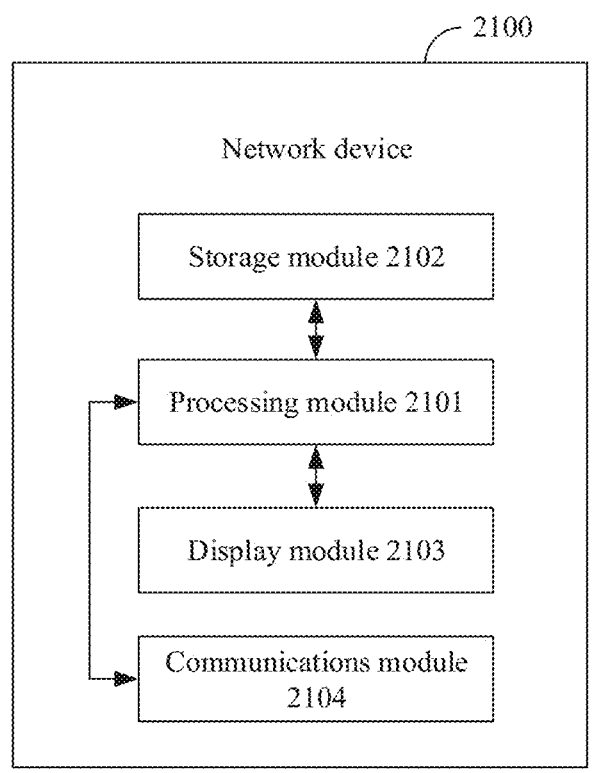
FIG. 21 is a schematic structural diagram 3 of composition of a network device according to an embodiment of this application.

FIG. 21 is a possible schematic structural diagram of the management device in the foregoing embodiment. The management device 2100 includes a processing module 2101, a storage module 2102, a display module 2103, and a communications module 2104.

The processing module 2101 is configured to control and manage the management device 2100. The display module 2103 is configured to display an image. The storage module 2102 is configured to store program code and data of the management device 2100, and a plurality of sensitive features and sensitivity levels of the sensitive features. The communications module is configured to communicate with another device. For example, the communications module 2104 is configured to receive a message or an image file from the another device or send a message or an image file to the another device.

The processing module 2101 may be a processor or a controller, for example, may include a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2104 may be a transceiver, a transceiver circuit, a communications interface, or the like. The storage module 2102 may be a memory. The display module 2103 may be a display. The communications module 2104 may include both a radio frequency circuit, and a WiFi module and a Bluetooth module. Communications modules such as the radio frequency circuit, the WiFi module, and the Bluetooth module may be collectively referred to as a communications interface. The processor, the communications interface, the touchinterface, and the memory may be coupled by using a bus.

An embodiment of this application further provides a computer storage medium. The computer storage medium stores computer program code. When the foregoing processor executes the computer program code, a device performs related method steps in any one of FIG. 4, FIG. 7A and FIG. 7B, FIG. 8, FIG. 10A and FIG. 10B, FIG. 12, and FIG. 15 to implement the method in the foregoing embodiment.

An embodiment of this application further provides a computer program product. When the computer program product is run on a computer, the computer is enabled to perform related method steps in any one of FIG. 4, FIG. 7A and FIG. 7B, FIG. 8, FIG. 10A and FIG. 10B, FIG. 12, and FIG. 15 to implement the method in the foregoing embodiment.

The terminal 1600, the terminal 1800, the computer storage medium, and the computer program product that are provided in this application are all configured to perform the corresponding method provided above. Therefore, for beneficial effects that can be achieved by the terminal 1800, the terminal 1900, the computer storage medium, and the computer program product, refer to the beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

receiving, by a network device, current scenario information sent by a terminal;

matching, by the network device, the current scenario information against one or more prompt rules, each of the one or more prompt rules comprising a condition triggering recommendation of one or more applications to a user of the terminal;

when determining that the current scenario information matches a first prompt rule in the one or more prompt rules, performing:

sending, by the network device, a first prompt message corresponding to the first prompt rule to the terminal; or instructing the terminal to display the first prompt message corresponding to the first prompt rule, wherein the terminal stores the first prompt message; and wherein the first prompt message comprises information indicating a scenario corresponding to the current scenario information and prompts that there is a recommended application corresponding to the scenario; and wherein after sending the first prompt message corresponding to the first prompt rule to the terminal, or after instructing the terminal to display the first prompt message corresponding to the first prompt rule, the method further comprises:

receiving, by the network device, a first obtaining request sent by the terminal, the first obtaining request comprising an identifier; and sending, by the network device, a first interface file and a first user interface (UI) element to the terminal based on the first obtaining request, wherein the first interface file and the first UI correspond to the identifier, the first UI element comprises an interface element of a first recommendation interface, the first interface file, when being run, invokes the first UI element to display the first recommendation interface when being run, and the first recommendation interface comprises a recommendation item of an application prompted by the first prompt message.

2. The method according to claim 1, wherein before sending, by the network device, the first interface file and the first user interface (UI) element to the terminal based on the first obtaining request, the method further comprises:

receiving, by the network device, the first interface file and the first UI element that are configured by operation personnel.

3. A network device, comprising:

at least one processor; and a non-transitory computer readable storage medium storing a program that is executable by the at least one processor, the program including instructions for:

receiving current scenario information sent by a terminal;

matching the current scenario information against one or more prompt rules, each of the one or more prompt rules comprising a condition triggering recommendation of one or more applications to a user of the terminal;

when determining that the current scenario information matches a first prompt rule in the one or more prompt rules, performing:

sending a first prompt message corresponding to the first prompt rule to the terminal; or instructing the terminal to display the first prompt message corresponding to the first prompt rule, wherein the terminal stores the first prompt message; and wherein the first prompt message comprises information indicating a scenario corresponding to the current scenario information and prompts that there is a recommended application corresponding to the scenario; and wherein the program further includes instructions for:

after sending the first prompt message corresponding to the first prompt rule to the terminal, or after instructing the terminal to display the first prompt message corresponding to the first prompt rule, receiving a first obtaining request sent by the terminal, the first obtaining request comprising an identifier; and sending a first interface file and a first user interface (UI) element to the terminal based on the first obtaining request, wherein the first interface file and the first UI correspond to the identifier, the first UI element comprises an interface element of a first recommendation interface, the first interface file, when being run, invokes the first UI element to display the first recommendation interface when being run, and the first recommendation interface comprises a recommendation item of an application prompted by the first prompt message.

4. The network device according to claim 3, wherein the program further includes instructions for:

before sending the first interface file and the first user interface (UI) element to the terminal based on the first obtaining request, receiving the first interface file and the first UI element that are configured by operation personnel.

5. A non-transitory computer readable storage medium storing a program that is executable by at least one processor, the program including instructions for:

receiving current scenario information sent by a terminal;

matching the current scenario information against one or more prompt rules, each of the one or more prompt rules comprising a condition triggering recommendation of one or more applications to a user of the terminal;

when determining that the current scenario information matches a first prompt rule in the one or more prompt rules, performing:

sending a first prompt message corresponding to the first prompt rule to the terminal; or instructing the terminal to display the first prompt message corresponding to the first prompt rule, wherein the terminal stores the first prompt message; and wherein the first prompt message comprises information indicating a scenario corresponding to the current scenario information and prompts that there is a recommended application corresponding to the scenario; and wherein the program further includes instructions for:

after sending the first prompt message corresponding to the first prompt rule to the terminal, or after instructing the terminal to display the first prompt message corresponding to the first prompt rule, receiving a first obtaining request sent by the terminal, the first obtaining request comprising an identifier; and sending a first interface file and a first user interface (UI) element to the terminal based on the first obtaining request, wherein the first interface file and the first UI correspond to the identifier, the first UI element comprises an interface element of a first recommendation interface, the first interface file, when being run, invokes the first UI element to display the first recommendation interface when being run, and the first recommendation interface comprises a recommendation item of an application prompted by the first prompt message.

6. The non-transitory computer readable storage medium according to claim 5, wherein the program further includes instructions for:

before sending the first interface file and the first user interface (UI) element to the terminal based on the first obtaining request, receiving the first interface file and the first UI element that are configured by operation personnel.

* * * * *